United States Patent [19]

Togai et al.

[11] Patent Number: 5,625,558
[45] Date of Patent: Apr. 29, 1997

[54] DRIVE-BY-WIRE VEHICLE ENGINE OUTPUT CONTROL SYSTEM

[75] Inventors: Kazuhide Togai, Takatsuki; Yoshiaki Danno; Masato Yoshida, both of Kyoto; Makoto Shimada, Okazaki; Katsunori Ueda, Kyoto, all of Japan

[73] Assignee: Mitsubishi Jidosha Kogyo Kabushiki Kaisha, Japan

[21] Appl. No.: 313,390

[22] Filed: Sep. 27, 1994

Related U.S. Application Data

[63] Continuation of Ser. No. 800,837, Nov. 29, 1991, abandoned.

[30] Foreign Application Priority Data

Nov. 29, 1990 [JP] Japan .................. 2-331942

[51] Int. Cl.$^6$ ............................... B60K 31/00
[52] U.S. Cl. .................. 364/426.041; 364/424.04; 364/431.07; 364/426.01; 180/197; 180/282; 180/179; 180/170; 123/350; 123/399; 123/349; 123/486
[58] Field of Search .................. 364/424.1, 424.01, 364/426.01, 426.02, 426.03, 426.04, 431.05, 431.07, 424.04, 431.03; 477/43, 68, 107, 32, 46, 92, 905, 48, 78, 109, 62, 154, 155; 123/350, 361, 399, 479; 180/197, 179, 282

[56] References Cited

U.S. PATENT DOCUMENTS

| | | | |
|---|---|---|---|
| 4,507,986 | 4/1985 | Okamura et al. | 74/866 |
| 4,517,646 | 5/1985 | Magnusson et al. | 364/424.1 |
| 4,589,302 | 5/1986 | Oda et al. | 477/32 |
| 4,627,311 | 12/1986 | Yokooku et al. | 477/46 |
| 4,834,045 | 5/1989 | Imai et al. | 123/352 |
| 4,969,103 | 11/1990 | Maekawa | 364/426.04 |
| 4,987,966 | 1/1991 | Fujita | 180/197 |
| 5,019,989 | 5/1991 | Ueda et al. | 364/426.03 |
| 5,021,958 | 6/1991 | Tokoro | 364/424.01 |
| 5,022,285 | 6/1991 | Suzuki | 74/867 |
| 5,078,109 | 1/1992 | Yoshida et al. | 123/350 |
| 5,088,043 | 2/1992 | Akishino et al. | 364/426.04 |
| 5,122,956 | 6/1992 | Satoh et al. | 364/424.1 |
| 5,163,530 | 11/1992 | Nakamura et al. | 364/426.01 |
| 5,197,008 | 3/1993 | Itoh et al. | 364/426.01 |
| 5,219,038 | 6/1993 | Hamada et al. | 180/248 |
| 5,233,530 | 8/1993 | Shimada et al. | 364/431.05 |

*Primary Examiner*—Kevin J. Teska
*Assistant Examiner*—Jacques H. Louis-Jacques
*Attorney, Agent, or Firm*—Evenson, McKeown, Edwards & Lenahan

[57] ABSTRACT

Described herein is a drive-by-wire vehicle engine output control system. The system permits good-response acceleration by a driver's simple and reasonable operation, i.e., by operating an accelerator pedal and also a prompt response even when a sudden load change occurs. Further, the system permits precise speed control by simple equipment even when the deviation of a vehicle speed from a target vehicle speed is large. Output changes of an engine can be controlled within a permissible output change range by (a) comparing a target autocruise engine output with an acceleration demanding ending output, choosing the larger engine output and then controlling the engine to give the larger engine output, (b) controlling the engine to achieve a target autocruise engine output obtained from a speed correction torque and a running load torque or (c) limiting an engine control quantity on the basis of a permissible output change value.

35 Claims, 51 Drawing Sheets

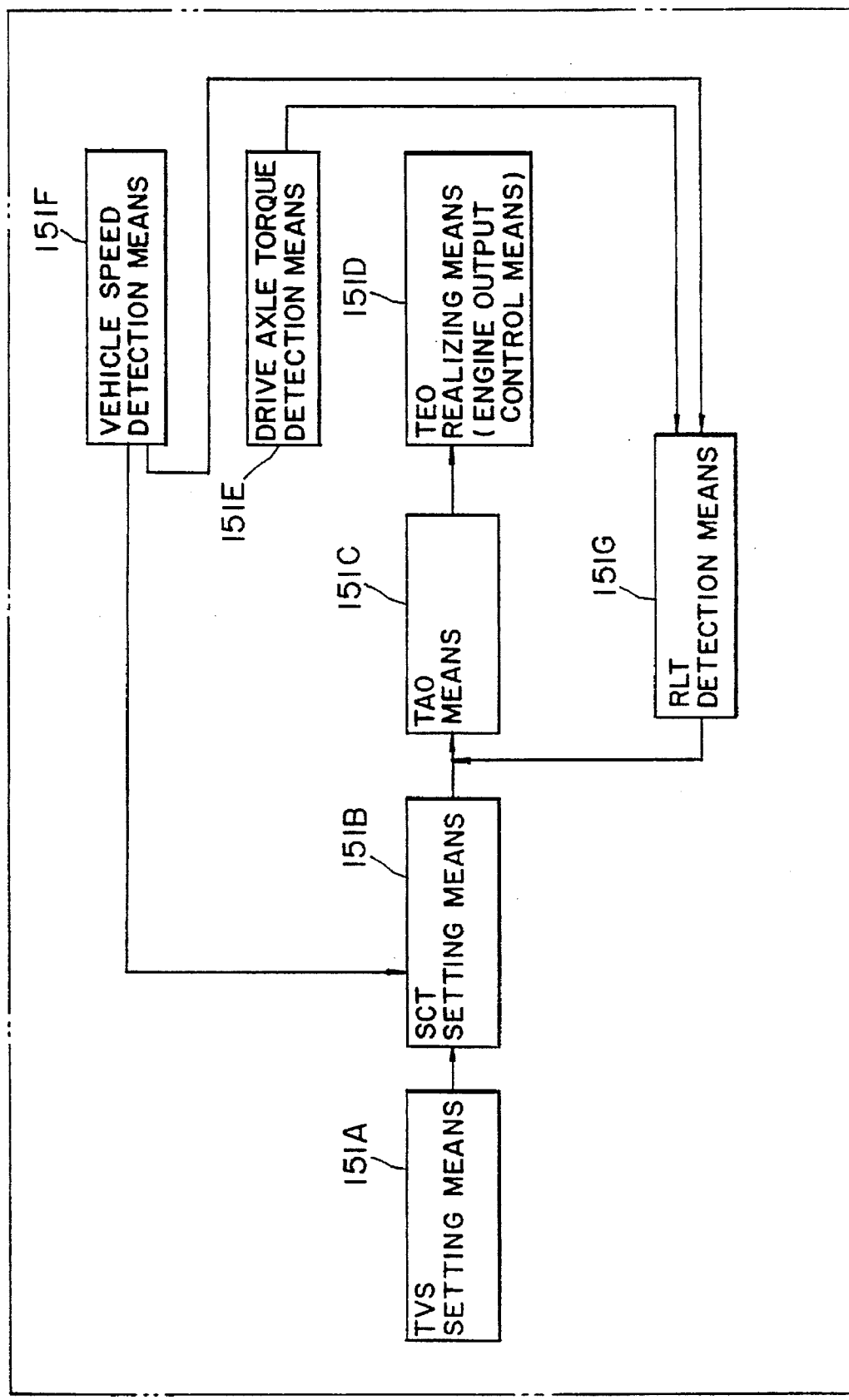
FIG. I(b)

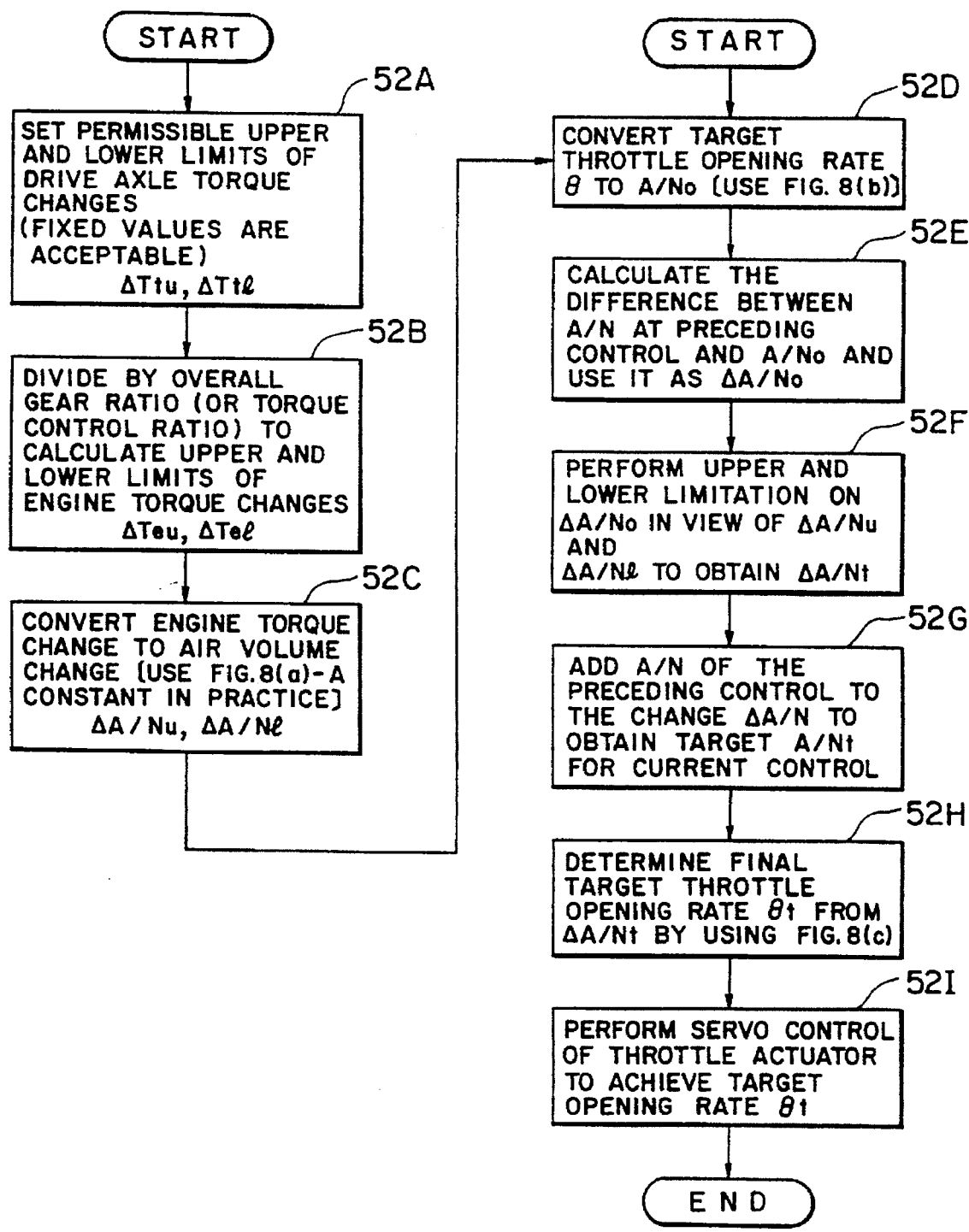

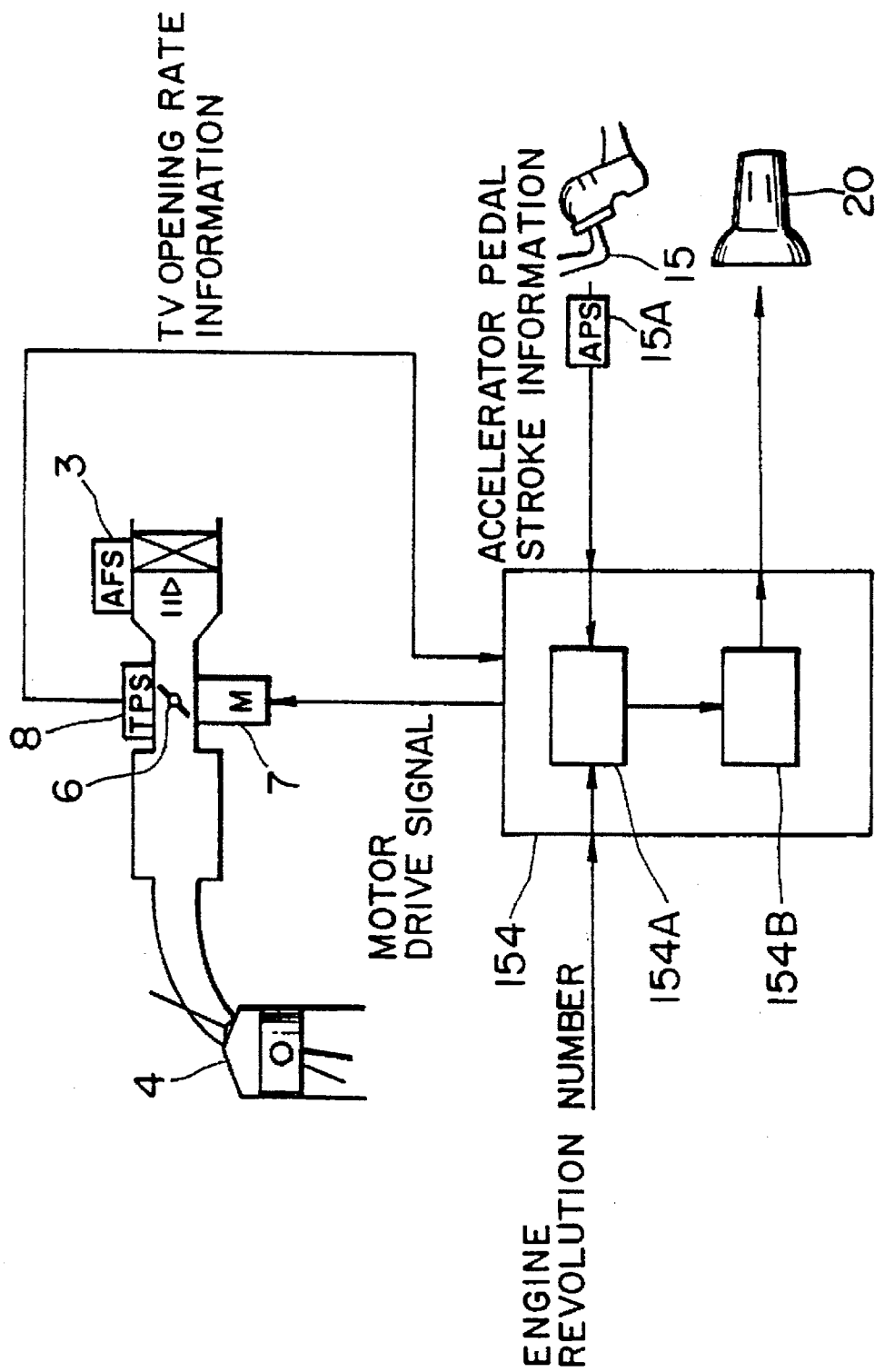

ACCELERATOR PEDAL POSITION SENSOR

ENGINE REVOLUTION NUMBER

FIG. II
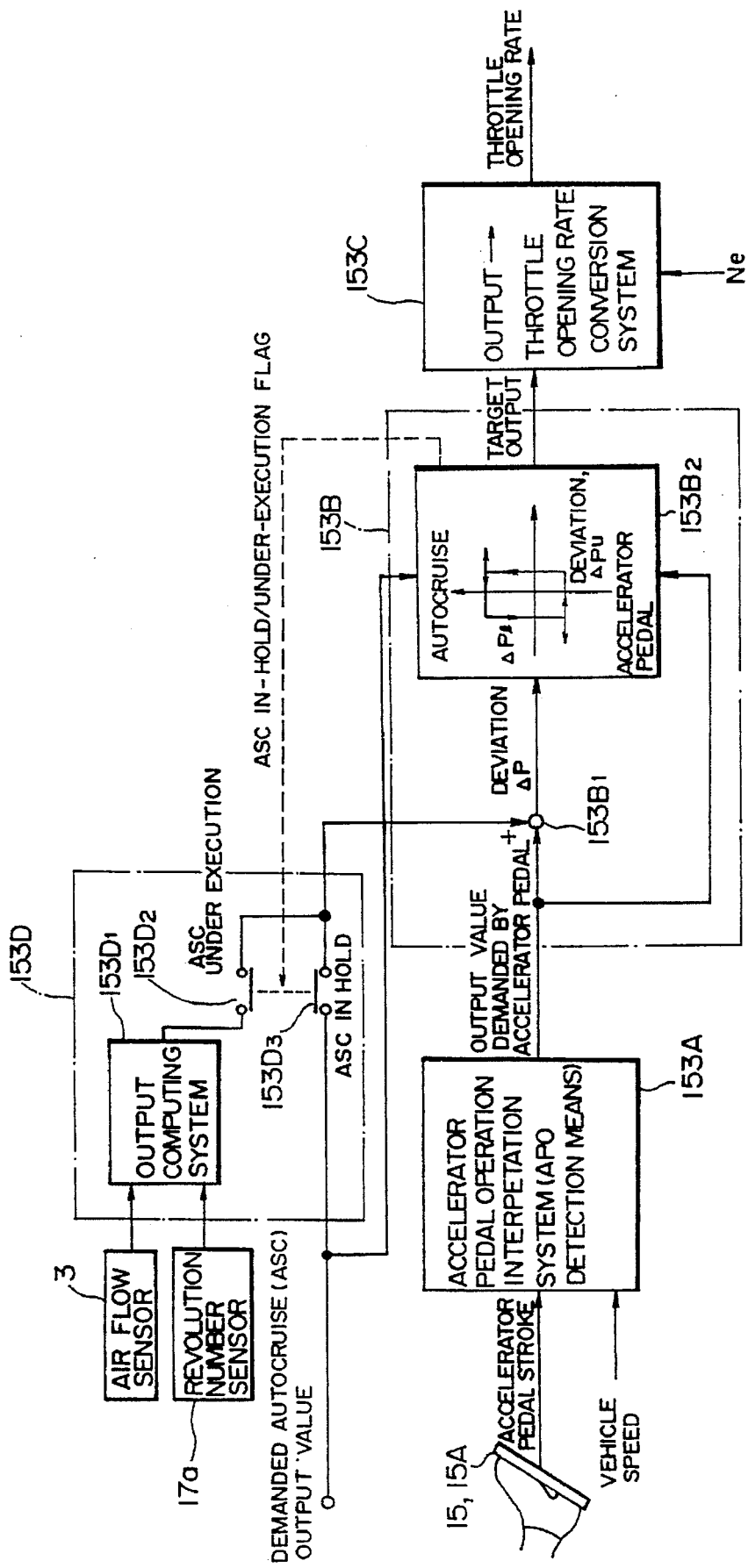

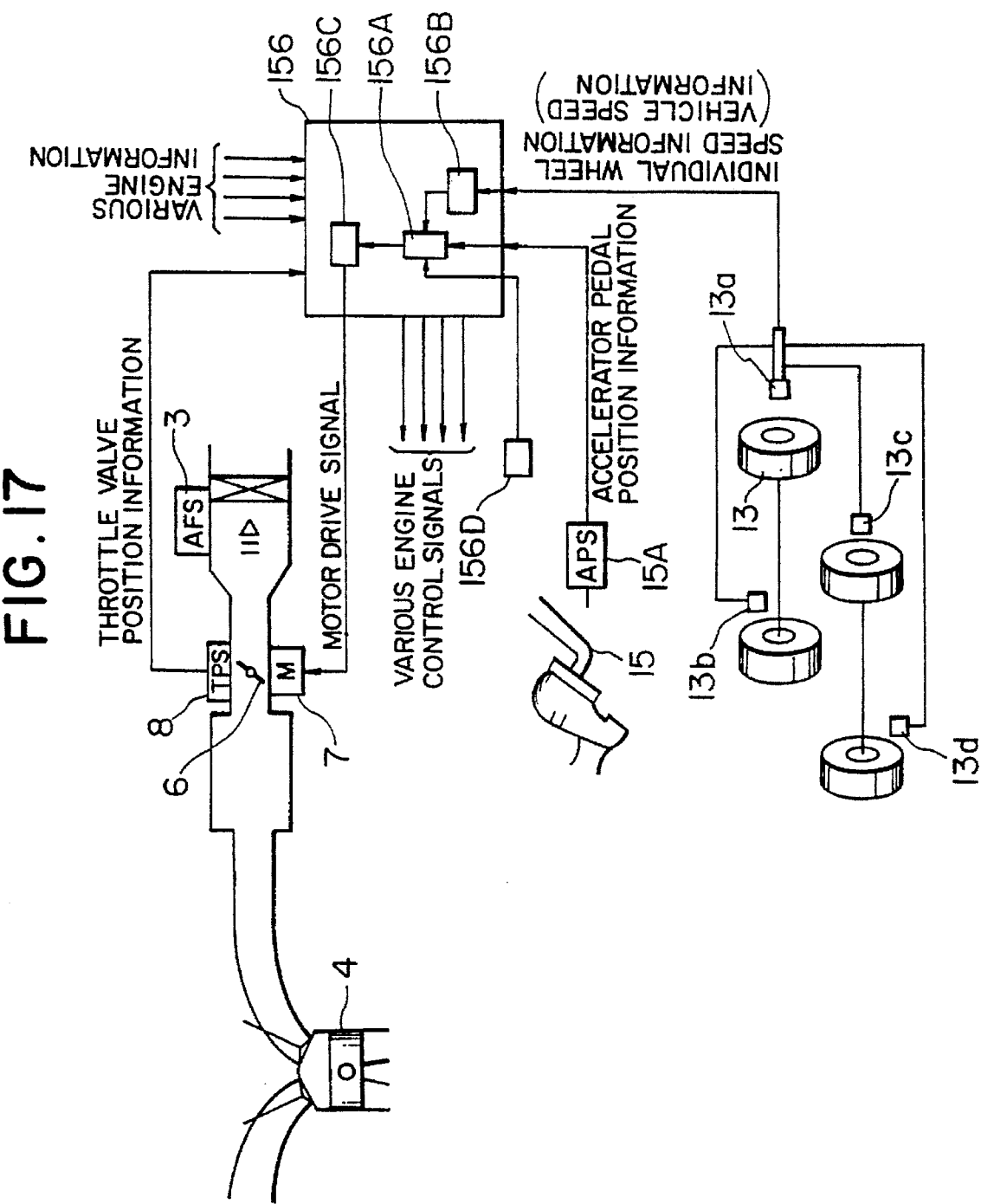

5,625,558

DRIVE-BY-WIRE VEHICLE ENGINE OUTPUT CONTROL SYSTEM

This application is a continuation of U.S. application Ser. No. 07/800,837 filed Nov. 29, 1991 now abandoned.

BACKGROUND OF THE INVENTION

1) Field of Invention

This invention relates to a drive-by-wire (DBW) vehicle engine output control system for setting the quantity of control of an engine in accordance with the degree of depression of an accelerator pedal by a driver and the mode of operation of a vehicle to electrically control the output of the engine on the basis of the control quantity or for controlling the output of the engine without relying upon operation of the accelerator pedal.

2) Description of the Related Art

Constant-speed control systems for making an automotive vehicle run at a constant speed (autocruise systems) have been provided to date. In those installed in automotive vehicles with a throttle valve mechanically connected to an accelerator pedal as an acceleration operating member, treadling of the accelerator pedal by a driver during autocruising is judged as the driver's need for more acceleration than the current level.

In such a case, the driver can directly operate the throttle valve at opening rates greater than the maximum valve drive quantity by a cruise actuator in autocruising.

The DBW system in which no mechanical connection is provided between an accelerator pedal and a throttle valve is, however, accompanied by the inconvenience that acceleration by the accelerator pedal is not feasible unless a brake pedal is treadled to cancel the autocruise mode.

Such a system therefore requires the preposterous operation that, because the throttle valve returns to a fully-closed position by the cancellation of the autocruising and is then driven to open the same, the response becomes slower and the brake pedal has to be treadled once for acceleration.

Further, the speed control system in a conventional constant-speed control system for making an automotive vehicle to run at a constant speed (autocruise system) is constructed, for example, in the following way.

To obtain an intake air volume corresponding to a target vehicle speed, the position of a throttle valve (the position of a control rod of a governor in the case of a diesel engine) is adjustable. Owing to this adjustment, a vehicle speed achieved or realized on the side of an engine-body system is fed back to calculate the deviation ΔV of the actual speed from the target vehicle speed. Feedback control corresponding to the deviation ΔV is then applied to the position of the throttle valve, whereby the target vehicle speed can be realized.

In an automotive vehicle equipped with such a conventional constant-speed control system, a relatively long time is, however, required to return to a target vehicle speed if a substantial deviation from the target vehicle speed takes place upon occurrence of a sudden change in load on a slope or the like.

Where the deviation ΔV from the target vehicle speed is large in the automotive vehicle equipped with the conventional speed control system, the opening rate of the throttle valve is significantly adjusted (in the case of a diesel engine, the position of the control rod of the governor is substantially adjusted) in order to correct or eliminate the deviation ΔV. This may result in the potential problem that the drive torque of the engine would suddenly change to induce a certain acceleration or deceleration shock and the riding comfort would be deteriorated.

To overcome this problem, it may be contemplated of lowering the open/close speed of the throttle valve upon control and hence limiting the change in the drive torque. There is, however, no linear relation between changes in the opening rate of the throttle valve and corresponding changes in the torque of a drive axle. If the open/close speed of the throttle valve is limited under conditions that the torque of the drive axle undergoes the largest change relative to the change in the opening rate of the throttle valve, the response of the speed control becomes slower under other driving conditions so that precise speed control cannot be performed.

It is, therefore, necessary to vary the quantity of control of the open/close speed of the throttle valve in accordance with complex conditions. This, however, results in the need for a complex speed control system.

SUMMARY OF THE INVENTION

The present invention has been completed in view of such problems or inconvenience as described above. A first object of this invention is to permit good-response acceleration by a simple and reasonable operation, i.e., by controlling an accelerator pedal operating member where there is no mechanical connection between the accelerator pedal operating member and the throttle valve.

A second object of this invention is to permit a prompt response by compensation of a running load even when a sudden load change has occurred.

A third object of this invention is to permit precise speed control by a simple system, i.e., by limiting output torque changes even when a vehicle speed is substantially deviated from a target vehicle speed.

To achieve the first object, the present invention provides a drive-by-wire vehicle engine output control system for setting the quantity of control of an engine in accordance with the degree of depression of an accelerator pedal by a driver and the mode of operation of a vehicle to electrically control the output of the engine on the basis of the control quantity or controlling the output of the engine without relying upon operation of the accelerator pedal, comprising:

a vehicle speed detection means for detecting a running speed of the vehicle;

a target engine output setting means for setting, based on the running speed detected by said vehicle speed detection means, a target autocruise engine output as a target output value to be outputted from the engine to execute autocruising in which the running speed of the vehicle is maintained at a predetermined value;

an acceleration demand detection means for setting an acceleration demanding engine output as a target output value to be outputted from the engine in order to accelerate the vehicle in accordance with the degree of operation of the accelerator pedal;

a selector means for comparing the target autocruise engine output set by said target engine output setting means with the acceleration demanding engine output set by said acceleration demand detection means and, when one of the engine outputs is greater than the other, selecting said greater engine output as a target engine output; and a target engine output realizing means for setting the engine control quantity at a level required to actually obtain an engine output equal to the target engine output selected by said selector means.

Preferably, the selector means compares the target autocruise engine output set by said target engine output setting means with the acceleration demanding engine output set by said acceleration demand detection means and, when one of the engine outputs is greater than the other by a deviation of at least a predetermined value, selecting said greater engine output as a target engine output.

The system may further comprises an output detection means for detecting an actual output of the engine in the course of the execution of the autocruising, wherein said selector means compares, instead of the target autocruise engine output, the actual engine output detected by said output detection means with the acceleration demanding engine output while the target autocruise engine output is selected as the target engine output.

The acceleration demanding means preferably sets the acceleration demanding engine output on the basis of the running speed of the vehicle detected by said vehicle speed detection means and the degree of operation of the accelerator pedal.

The target engine output setting means may preferably comprises a target vehicle speed setting means for setting a target vehicle speed upon the autocruising, a speed correction torque setting means for determining the deviation of the running speed of the vehicle detected by said vehicle speed detection means from the target vehicle speed set by the target vehicle speed setting means and, based on the deviation, setting a speed correction torque as a correction quantity for a torque of a drive axle of the vehicle, said correction quantity being required to eliminate the deviation, a drive axle torque detection means for detecting an actual drive torque of the drive axle, a running load torque detection means for detecting, based on the drive axle torque detected by said drive axle torque detection means, a running load torque corresponding to a running load during running of the vehicle, and a target engine setting means for setting the target autocruise engine output on the basis of the speed correction torque set by said speed correction torque setting means and the running load torque detected by said running load torque detection means.

Preferably, the running load torque detection means further comprises an acceleration torque detection means for detecting an acceleration torque applied upon actual acceleration of the vehicle, whereby the running load torque is detected based on the drive axle torque detected by said drive axle torque detection means and the acceleration torque detected by said acceleration torque detection means. The running load torque detection means may detects the running load torque by subtracting the acceleration torque detected by said acceleration torque detection means from the drive axle torque detected by said drive axle torque detection means. Desirably, the acceleration torque detection means comprises an acceleration detection means for detecting a running acceleration of the vehicle, and an acceleration torque computing unit for computing the acceleration torque on the basis of the running acceleration detected by the acceleration detection means.

The target autocruise output calculation means may preferably sum the speed correction torque set by said speed correction torque setting means and the running load torque detected by said running load torque detection means, converts the resulting sum to the target autocruise engine output and then outputs the target autocruise engine output.

The speed correction torque setting means can comprise a PI control unit for determining the deviation of the running speed of the vehicle detected by said vehicle speed detection means from the target vehicle speed set by said vehicle speed setting means and setting a speed correction torque as a torque correction quantity for the drive axle of the vehicle, said torque correction quantity being required to eliminate the deviation, and a speed correction torque limiter for limiting, within a predetermined range, the speed correction torque set by said PI control unit.

The system may further comprises a permissible torque change setting means for setting a permissible output change value for the engine, and a control quantity limiting means for limiting, on the basis of the permissible output change value set by the permissible torque change setting means, the engine control quantity set by the target engine output realizing means whereby changes in output of the engine are maintained not greater than the permissible output change value. Preferably, the permissible torque change setting means converts the preset permissible value of a torque change at the drive axle of the vehicle to the permissible output change value on the basis of a current gear shift position of a transmission. The target engine output realizing means converts the target engine output, which has been selected by said selector means, to a target air volume—which is the volume of intake air per revolution of the engine required to actually obtain an engine output equal to the target engine output selected by said selector means—and then outputs the target air volume as the engine control quantity.

The system may further comprises a converter means for converting the permissible output change value, which has been set by said permissible torque change setting means, to a permissible air fuel volume change per revolution of the engine, whereby said control quantity limiting means controls the target air volume, which has been set by the target engine output realizing means, on the basis of the permissible air volume change obtained as a result of conversion by the converter means. The control quantity limiting means may comprises an intake air volume detection means for detecting the volume of intake air actually taken in the engine per revolution of the engine, and an air volume change limiter for limiting the deviation of the actual intake air volume detected by said intake air volume detection means from the target air volume set by the target engine output realizing means to a level not greater than the permissible air volume change obtained as a result of conversion by the converter means and then outputting the thus-limited deviation as a target air change quantity, whereby the engine control quantity required to make a change of the actual intake air volume per revolution of the engine equal to the target air change value is set based on the target air change value outputted from said air volume change limiter. The control quantity limiting means can output, as the engine control quantity, a final target air volume obtained by summing the target air change value outputted from said air volume change limiter and the actual intake air volume detected by said intake air volume detection means.

Preferably, the system can control the output of the engine via a throttle valve of the engine and said target output realizing means sets, as the engine control quantity, a target opening rate of the throttle valve required to actually obtain an engine output equal to the target engine output selected by said selector means. The system may further comprises a converter means for converting the permissible output change value, which has been set by said permissible torque change setting means, to a permissible air volume change per revolution of the engine, wherein said control quantity limiting means comprises a throttle opening rate-air volume conversion unit for converting the target opening rate, which has been set by said target engine output realizing means, to a target air volume which is an intake air volume per revolution of the engine, an air volume change limiter for limiting the target air volume, which has been obtained as a result of conversion by said throttle opening rate-air volume conversion unit, on the basis of the permissible air volume change obtained as a result of conversion by said converter means, and an air volume-throttle opening rate conversion unit for setting, as a final target opening rate, an opening rate of the throttle valve required to make the actual intake air volume per revolution of engine equal to the target air volume limited by said air volume change limiter.

The control quantity limiting means may further comprise an intake air volume detection means for detecting the volume of intake air actually taken in the engine per revolution of the engine, the air volume change limiter limits the deviation of the actual intake air volume detected by said intake air volume detection means from the target air volume obtained as a result of conversion by said throttle opening rate-air volume conversion unit to a value not greater than the permissible air volume change obtained as a result of conversion by said converter means, and said air volume-throttle opening rate conversion unit determines a final target air volume by summing the target air change value outputted from said air volume change limiter and the actual intake air volume detected by said intake air volume detection means, thereby setting, based on the final target air volume, the final opening rate of the throttle valve required to make the volume of intake air taken in the engine per revolution of the engine equal to the final target air volume.

The system may further comprises a converter means for converting the permissible output change value, which has been set by said permissible torque change setting means, to a permissible air volume change per revolution of the engine, wherein said control quantity limiting means limits the target opening rate, which has been set by said target engine output realizing means, on the basis of the permissible fuel volume change obtained as a result of conversion by said converter means, whereby any change in the output of the engine is controlled equal to or smaller than the permissible output change value.

To attain the second object, this invention also provides a drive-by-wire vehicle engine output control system for setting the quantity of control of an engine in accordance with the degree of depression of an accelerator pedal by a driver and the mode of operation of a vehicle to electrically control the output of the engine on the basis of the control quantity or for controlling the output of the engine without relying upon operation of the accelerator pedal, comprising:

- a vehicle speed detection means for detecting a running speed of the vehicle;
- a target vehicle speed setting means for setting a target vehicle speed upon autocruising in which the running speed of the vehicle is maintained constant;
- a speed correction torque setting means for determining the deviation of the running speed of the vehicle detected by said vehicle speed detection means from the target vehicle speed set by the target vehicle speed setting means and, based on the deviation, setting a speed correction torque as a correction quantity for a torque of a drive axle of the vehicle, said correction quantity being required to eliminate the deviation;
- a drive axle torque detection means for detecting an actual drive torque of the drive axle;
- a running load torque detection means for detecting, based on the drive axle torque detected by said drive axle torque detection means, a running load torque corresponding to a running load during running of the vehicle;
- a target autocruise output calculation means for setting the target autocruise engine output on the basis of the speed correction torque set by said speed correction torque setting means and the running load torque detected by said running load torque detection means; and
- a target engine output realizing means for setting the engine control quantity at a level required to actually obtain an engine output equal to the target autocruise engine output set by said target engine output setting means.

The running load torque detection means may further comprise an acceleration torque detection means for detecting an acceleration torque applied upon actual acceleration of the vehicle, whereby the running load torque is detected based on the drive axle torque detected by said drive axle torque detection means and the acceleration torque detected by said acceleration torque detection means. Preferably, the running load torque detection means detects the running load torque by subtracting the acceleration torque detected by said acceleration torque detection means from the drive axle torque detected by said drive axle torque detection means. The acceleration torque detection means desirably comprises an acceleration detection means for detecting a running acceleration of the vehicle, and an acceleration torque computing unit for computing the acceleration torque on the basis of the running acceleration detected by the acceleration detection means. The target autocruise output calculation means may preferably sum the speed correction torque set by said speed correction torque setting means and the running load torque detected by said running load torque detection means, converts the resulting sum to the target autocruise engine output and then outputs the target autocruise engine output. The speed correction torque setting means may comprise a PI control unit for determining the deviation of the running speed of the vehicle detected by said vehicle speed detection means from the target vehicle speed set by said vehicle speed setting means and setting a speed correction torque as a torque correction quantity for the drive axle of the vehicle, said torque correction quantity being required to eliminate the deviation, and a speed correction torque limiter for limiting, within a predetermined range, the speed correction torque set by said PI control unit.

To fulfill the third object, this invention also provides a drive-by-wire vehicle engine output control system for setting the quantity of control of an engine in accordance with the degree of depression of an accelerator pedal by a driver and the mode of operation of a vehicle to electrically control the output of the engine on the basis of the control quantity or for controlling the output of the engine without relying upon operation of the accelerator pedal, comprising:

- a vehicle speed detection means for detecting a running speed of the vehicle;
- a target engine output setting means for setting, based on the running speed detected by said vehicle speed detection means, a target autocruise engine output as a target output value to be outputted from the engine to execute autocruising in which the running speed of the vehicle is maintained at a predetermined value;
- a target engine output realizing means for setting the engine control quantity at a level required to actually obtain an engine output equal to the target autocruise engine output set by said target engine output setting means;

a permissible torque change setting means for setting a permissible output change value for the engine; and a control quantity limiting means for limiting, on the basis of the permissible output change value set by the permissible torque change setting means, the engine control quantity set by the target engine output realizing means whereby changes in output of the engine are maintained not greater than the permissible output change value.

Preferably, the permissible torque change setting means converts the preset permissible value of a torque change at the drive axle of the vehicle to the permissible output change value on the basis of a current gear shift position of a transmission.

The target engine output realizing means may preferably convert the target engine output, which has been selected by said selector means, to a target air volume—which is the volume of intake air per revolution of the engine required to actually obtain an engine output equal to the target autocruise engine output set by said target engine output setting means and then outputs the target air volume as the engine control quantity. The system may further comprises a converter means for converting the permissible output change value, which has been set by said permissible torque change setting means, to a permissible air volume change per revolution of the engine, whereby said control quantity limiting means controls the target air volume, which has been set by the target engine output realizing means, on the basis of the permissible air volume change obtained as a result of conversion by the converter means. Desirably, the control quantity limiting means comprises an intake air volume detection means for detecting the volume of intake air actually taken in the engine per revolution of the engine, and an air volume change limiter for limiting the deviation of the actual intake air volume detected by said intake air volume detection means from the target air volume set by the target engine output realizing means to a level not greater than the permissible air volume change obtained as a result of conversion by the converter means and then outputting the thus-limited deviation as a target air change quantity, whereby the engine control quantity required to make a change of the actual intake air volume per revolution of the engine equal to the target air change value is set based on the target air change value outputted from said air volume change limiter. The control quantity limiting means may preferably output, as the engine control quantity, a final target air volume obtained by summing the target air change value outputted from said air volume change limiter and the actual intake air volume detected by said intake air volume detection means.

The system may preferably control the output of the engine via a throttle valve of the engine and said target output realizing means sets, as the engine control quantity, a target opening rate of the throttle valve required to actually obtain an engine output equal to the target autocruise engine output set by said engine output setting means. Desirably, the system further comprises a converter means for converting the permissible output change value, which has been set by said permissible torque change setting means, to a permissible air volume change per revolution of the engine, wherein said control quantity limiting means comprises a throttle opening rate-air volume conversion unit for converting the target opening rate, which has been set by said target engine output realizing means, to a target air volume which is an intake air volume per revolution of the engine, an air volume change limiter for limiting the target air volume, which has been obtained as a result of conversion by said throttle opening rate-air volume conversion unit, on the basis of the permissible air volume change obtained as a result of conversion by said converter means, and an air volume-throttle opening rate conversion unit for setting, as a final target opening rate, an opening rate of the throttle valve required to make the actual intake air volume per revolution of engine equal to the target air volume limited by said air volume change limiter. Preferably, the control quantity limiting means further comprises an intake air volume detection means for detecting the volume of intake air actually taken in the engine per revolution of the engine, the air volume change limiter limits the deviation of the actual intake air volume detected by said intake air volume detection means from the target air volume obtained as a result of conversion by said throttle opening rate-air volume conversion unit to a value not greater than the permissible air volume change obtained as a result of conversion by said Converter means, and said air volume-throttle opening rate conversion unit determines a final target air volume by summing the target air change value outputted from said air volume change limiter and the actual intake air volume detected by said intake air volume detection means, thereby setting, based on the final target air volume, the final opening rate of the throttle valve required to make the volume of intake air taken in the engine per revolution of the engine equal to the final target air volume.

The fulfillment of the first object by the present invention has brought about the following advantages:

(1) Acceleration can be promptly effected responsive to the driver's intention without interruption of autocruising by treadling of the brake pedal, so that the response is fast.

(2) No shock is produced upon returning to autocruising because the output of the engine changes in a continuous fashion.

(3) It is no longer necessary to cancel the autocruise mode. The operation is therefore simplified, thereby reducing the chance of erroneous or accidental operation.

The attainment of the second object by this invention has brought about the following advantage:

(4) Upon changing the speed of the vehicle, it is possible to estimate the running load resistance of the vehicle and hence to adjust the output of the engine on the basis of the running load resistance so estimated. This has improved the response to load variations, thereby making it possible to perform speed control resistant to disturbances such as slopes and the like.

The achievement of the third object by this invention has brought about the following advantage:

(5) To avoid acceleration shock, changes in the intake air volume or the fuel volume (each per revolution of the engine) which is in a linear relation with the output torque of the engine are limited directly. It is hence possible to readily and surely prevent acceleration shock.

BRIEF DESCRIPTION OF THE DRAWINGS

FIGS. 1(a) to 46(c) illustrate a drive-by-wire vehicle engine output control system according to one embodiment of the present invention, in which:

FIG. 1(a) to 1(c) are schematic fragmentary block diagrams of the system;

FIG. 2(a) is a fragmentary block diagram of a control unit of the system;

FIG. 3 is a simplified schematic block diagram of a target speed setting means of the control unit;

FIGS. 4, 5(a), 5(b) and 5(c) illustrate a running load compensating control unit of the control unit, in which FIG. 4 is a block diagram of the running load compensating control unit and FIGS. 5(a), 5(b) and 5(c) are flow charts showing the operation of the running load compensating control unit;

FIGS. 6 to 8(c) depict an output torque change limiting speed control unit of the system, in which FIG. 6 is a block diagram of the speed control unit, FIG. 7 is a flow chart of the speed control unit, and FIGS. 8(a), 8(b) and 8(c) are diagrammatic representations showing characteristics of the speed control unit;

FIGS. 9(a) to 10(b) show a transmission control unit of the system, in which FIG. 9(a) is a schematic diagram of the transmission control unit, FIGS. 10(a) and 10(b) are both diagrammatic representations depicting characteristics of the transmission control unit;

FIGS. 11 to 13(b) show an accelerator-pedal-combined speed control unit of the system, in which FIG. 11 is a schematic block diagram of the speed control unit, FIGS. 12(a), 12(b) and 12(c) are all flow charts illustrating the operation of the speed control unit, and FIGS. 13(a) and 13(b) are diagrammatic representations illustrating the operation of the speed control unit;

FIGS. 14 to FIG. 16(b) depict an acceleration shock preventing control unit of the system, in which FIG. 14 is a simplified schematic diagram of the preventing control unit, FIG. 15 is a flow chart showing the operation of the preventing control unit, and FIGS. 16(a) and 16(b) are diagrammatic representations depicting characteristics of the preventing control unit;

FIGS. 17 to 19(b) illustrate a vehicle-running-state-associated mode change-over control unit of the system, in which FIG. 17 is a simplified schematic diagram of the mode change-over control unit, FIG. 18 is a flow chart showing the operation of the mode change-over control unit, and FIGS. 19(a) and 19(b) are diagrammatic representations depicting characteristics of the mode change-over control unit;

FIGS. 20 to 22 show an accelerator-pedal-associated mode change-over control unit of the system, in which FIG. 20 is a simplified schematic diagram of the mode change-over control unit, FIG. 22 is a flow chart depicting the operation of the mode change-over control unit;

FIGS. 23 to 25 illustrate a vehicle speed detection compensating control unit of the system, in which FIG. 23 is a simplified schematic diagram of the compensating control unit, FIG. 24 is a flow chart showing the operation of the compensating control unit, and FIG. 25 is a diagrammatic representation depicting characteristics of the compensating control unit;

FIGS. 26 and 27 depict an accelerator pedal position sensor failure-time, acceleration control unit of the system in which FIG. 26 is a simplified schematic diagram of the acceleration control unit and FIG. 27 is a flow chart showing the operation of the acceleration control unit;

FIGS. 28(a) and 28(b) show an accelerator pedal position sensor failure-time, brake-switch-associated control unit of the system, in which FIG. 28(a) is a simplified schematic diagram of the brake-switch-associated control unit and FIG. 28(b) is a flow chart showing the operation of the brake-switch-associated control unit;

FIGS. 29 and 30 depict an engine-associated initialize inhibiting control unit of the system, in which FIG. 29 is a simplified schematic diagram of the inhibiting control unit and FIG. 30 is a flow chart showing the operation of the inhibiting control unit;

FIGS. 31 and 32 depict a transmission-associated initialize inhibiting control unit of the system, in which FIG. 31 is a simplified schematic diagram of the inhibiting control unit and FIG. 32 is a flow chart showing the operation of the inhibiting control unit;

FIGS. 33 and 34 depict a throttle valve sensor failure-time air control unit of the system, in which FIG. 33 is a simplified schematic diagram of the air control unit and FIG. 34 is a flow chart showing the operation of the air control unit;

FIGS. 35 to 37 illustrate an ignition-angle-throttle-valve-combined revolution number control unit of the system, in which FIG. 35 is a simplified schematic diagram of the revolution number control unit, FIG. 36 is a flow chart showing the operation of the revolution number control unit, and FIG. 37 is a diagrammatic representation depicting characteristics of the revolution number control unit;

FIGS. 38(a) to FIG. 40 illustrate an output torque adjusting revolution number control unit of the system, in which FIGS. 38(a) and 38(b) are simplified schematic illustrations showing the position of arrangement of a throttle valve, FIG. 39 is a simplified schematic block diagram of the revolution number control unit, and FIG. 40 is a flow chart illustrating the operation of the revolution number control unit;

FIGS. 41 to 43 show a control mode change-over control unit of the system, in which FIG. 41 is a simplified schematic diagram of the control unit, FIG. 42 is a block diagram showing the detailed construction of the control unit, and FIG. 43 is a flow chart showing the operation of the control unit; and FIGS. 44 to 46(c) illustrate a throttle valve closure forcing mechanism of the system, in which FIG. 44 is a simplified schematic block diagram of the mechanism, FIG. 45 is a schematic perspective view of the mechanism, and FIGS. 46(a), 46(b) and 46(c) are schematic illustrations showing the operation of the mechanism.

DESCRIPTION OF THE PREFERRED EMBODIMENT

Figure 2:
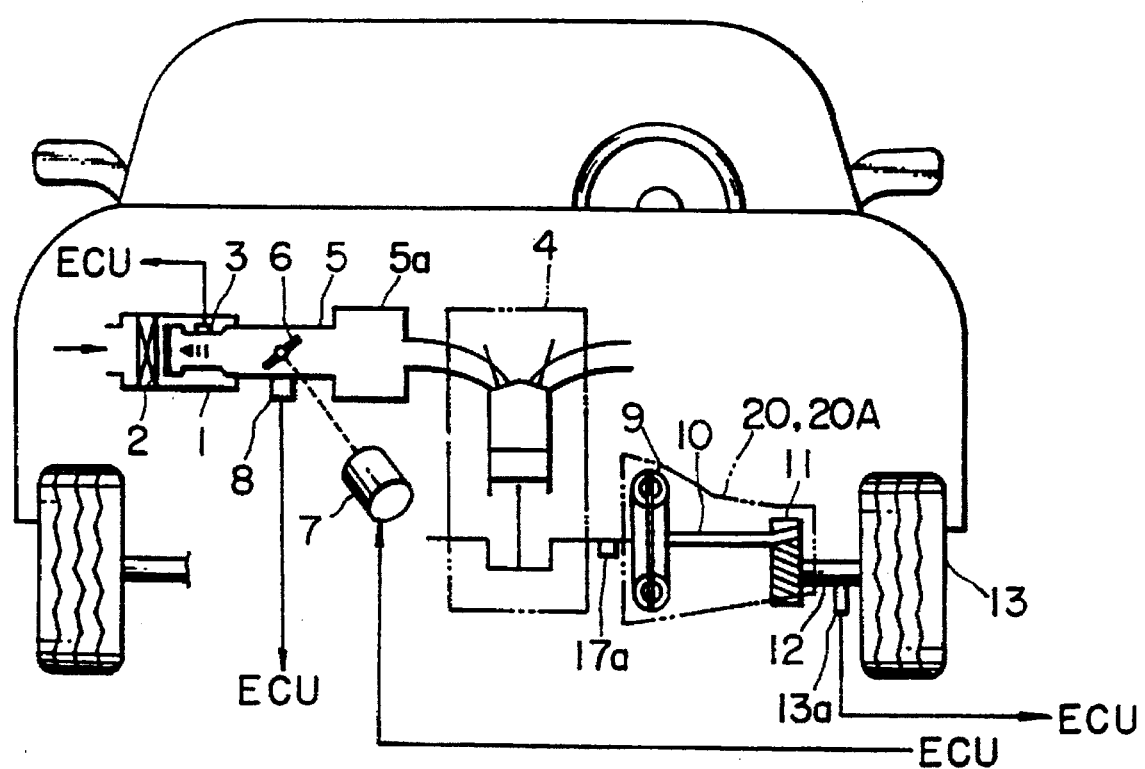

An automotive vehicle in which the system according to this embodiment can be suitably incorporated is a drive-by-wire vehicle (DBW vehicle) in which the quantity of control of an engine is set in accordance with the degree of depression of an accelerator pedal by a driver and the mode of operation of the vehicle to electrically control the output of the engine on the basis of the control quantity and the output of the engine can also be controlled without relying upon operation of the accelerator pedal. Therefore, as shown in FIG. 2(a), a motor (DC motor or stepper motor) 7 is connected to a throttle valve 6 disposed in an intake passage 5 through which combustion air is introduced into an engine main body 4 from an air cleaner 1. The throttle valve 6 is therefore driven by the motor 7 from a fully-closed position to a fully-opened position.

In this embodiment, there are actually two intake passages which communicate to two banks of a V6 engine, respectively. Each of the intake passages is provided with such a throttle valve which is opened and closed by such a motor. Unless it is necessary to describe these intake passages and throttle valves individually, they will be referred to simply as the intake passage 5, throttle valve 6 and motor 7. The throttle valve 6 is also provided with a throttle opening rate sensor 8. This throttle opening rate sensor 8 is constructed, for example, of a potentiometer and can output a signal of a voltage level corresponding to each opening rate of the throttle valve 6.

As is understood from the foregoing, the throttle valve 6 is not connected via a cable to an accelerator pedal as an accelerator operating member but is connected to the motor 7 controlled by a below-described engine control computer (ECU) 14. The output of the engine can therefore be controlled without relying upon operation of the accelerator by the driver.

A pump of a torque converter 9 is connected to an output shaft of the engine body 4. Connected to a turbine of the torque converter 9 via a shaft 10 is a transmission unit 11, to which a wheel 13 is connected by way of a drive axle 12. The torque converter 9, shaft 10 and transmission unit 11 are assembled as an automatic transmission 20. The transmission unit 11 may be constructed as a manual transmission. The air cleaner 1 is equipped with an air flow sensor 3 on a side downstream of a cleaner element 2. This air flow sensor 3 is connected to ECU 14 so that an intake air volume A detected by the air flow sensor 3 is transmitted to ECU 14. Designated at symbol 5a is a surge tank.

As has been described above, an output of ECU 14 is inputted to the motor 7 so that the motor 7 is controlled. Namely, the output of ECU 14 is transmitted as a control quantity to a motor derive unit. The motor drive unit then outputs a predetermined operation quantity to the motor 7, whereby the throttle valve 6 is opened or closed to an extent as needed.

Figure 2B:
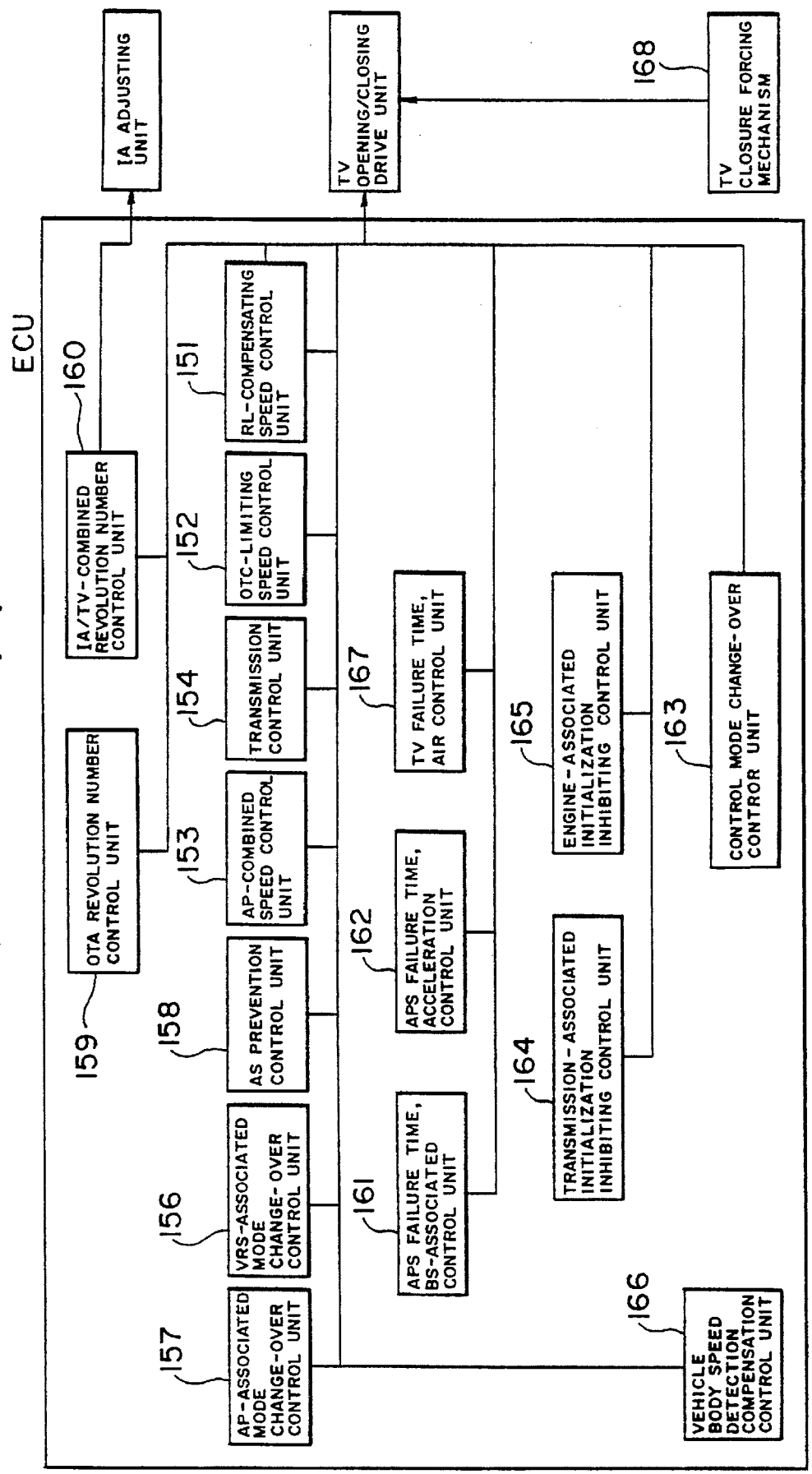
FIG. 2(b) is a simplified schematic block diagram of the control unit.

ECU 14 is provided with such control units (see numerals 151–168 (155-skipped) and the like as illustrated in FIG. 2(b). Pursuant to driver's mode setting and priority setting and automated systematic selection, these control units 151–168 and the like are selectively actuated to perform combined control.

Of these control units 151–168 and the like, the running-load-compensating speed control unit (hereinafter referred to as the "RL-compensating speed control unit) 151 is constructed as will be described next.

Figure 4:
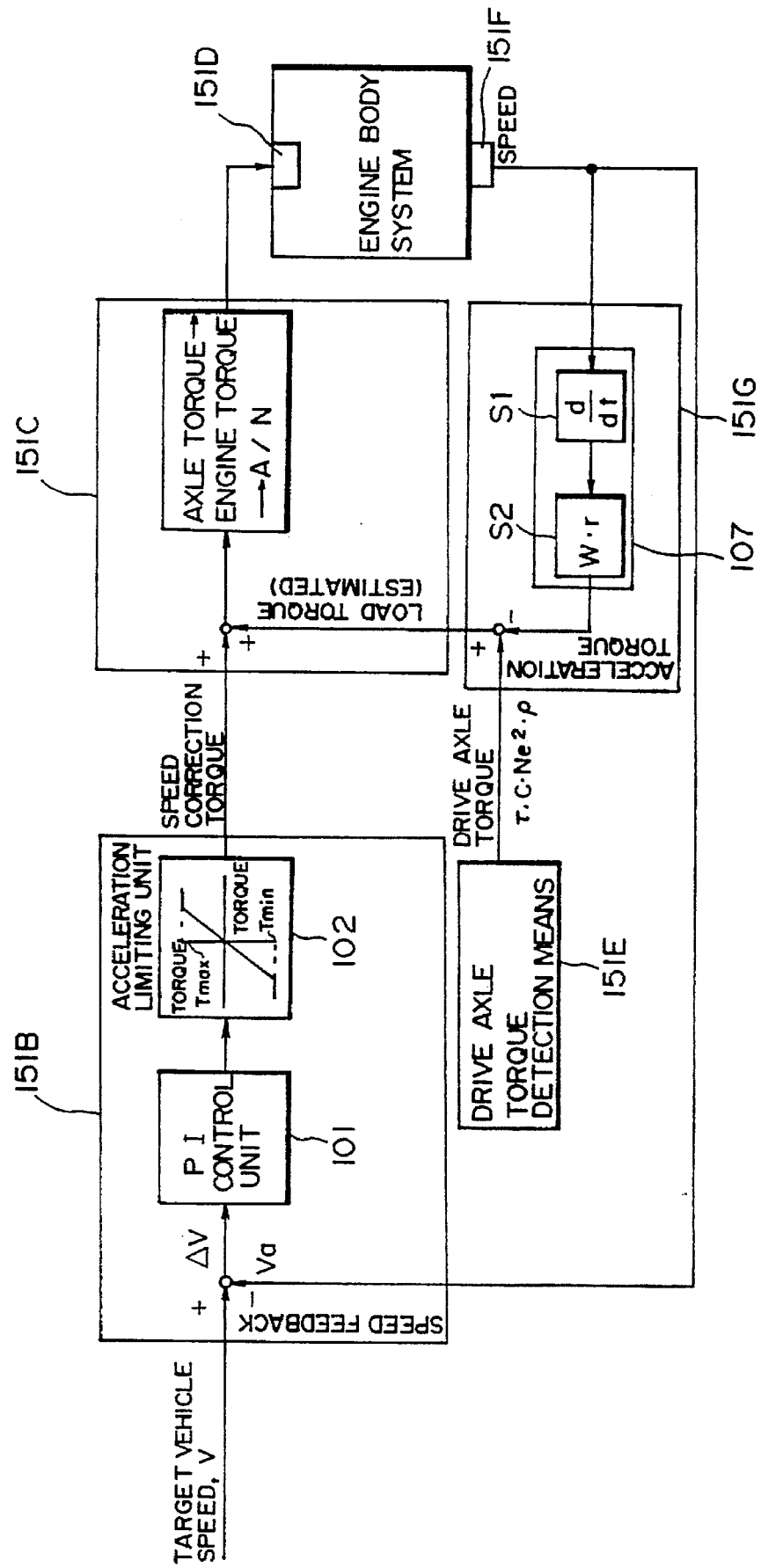

As is depicted in FIG. 1(b) and FIG. 4, a target autocruise output means (hereinafter referred to as the "TAO means") 151C is connected to a target engine output realizing means (hereinafter referred to as the "TAO realizing means"), whereby a target autocruise output to be realized is calculated by the means 151C and then inputted to the realizing means 151D.

The TAO calculation means 151C is inputted with a speed correction torque and also with an output from a running load torque detection means (hereinafter referred to as the "RLT detection means") 151G, whereby the TAO means 151C sums the speed correction torque and a running load torque to calculate a target drive axle torque.

The speed correction torque is obtained as an output from a target vehicle speed setting means (hereinafter referred to as the "TVS setting means" 151A and a speed correction torque setting means (hereinafter referred to as "SCT setting means") 151B. The speed correction torque is calculated through a PI control unit 101 and an acceleration limiting unit (speed correction torque limiter) 102.

Namely, a deviation $\Delta V$ (=$V-V_a$) of an actual vehicle speed $V_a$ from a target vehicle speed $V$ outputted from the TVS setting means 151A is inputted to the PI control unit 101, where a speed correction torque is calculated in accordance with the following formula:

$$K_p \cdot \Delta V + K_I \int \Delta V$$

The value so calculated is then determined as the speed correction torque by way of the unit 102.

At the unit 102, by using an output torque change limiting speed control unit (hereinafter referred to as the "OTC-limiting speed control unit") 152 and the like, the correction torque is determined and outputted in a state limited in speed correction torque change quantity in order to avoid shock which may otherwise be produced by an abrupt speed correction.

On the other hand, the running load torque is detected by the RLT detection means 151G. Using an output from a drive axle torque detection means 151E and a detection signal from an acceleration torque detection means 107, the RLT detection means 151G detects the running load torque. Described specifically, the running load torque is calculated by subtracting an acceleration torque from a drive axle torque which has been calculated using an engine revolution number Ne.

In other words, the running load torque is a torque for maintaining the vehicle speed and is calculated as follows:

Running load torque=drive shaft torque−acceleration torque

This running load torque is detected and outputted as a torque to be compensated.

Incidentally, the drive axle torque can be determined in accordance with the following formula:

$$\tau \cdot C \cdot Ne^2 \cdot \rho$$

where

C: capacity coefficient of torque converter;

$\tau$: torque ratio;

Ne: revolution number of engine; and $\rho$: overall gear ratio of transmission.

On the other hand, the acceleration torque can be determined by the following formula:

$$W \cdot (dV/dt) \cdot r$$

where

W: total vehicle weight;

r: tire diameter; and

V: vehicle body speed.

Namely, dV/dt is determined at a differentiating unit (acceleration detection means) S1 and $W \cdot (dV/dt) \cdot r$ is calculated at a computing unit (acceleration torque computing unit) S2 with a multiplying circuit included therein. W and r have been stored beforehand in the computing unit S2.

Figure 3:
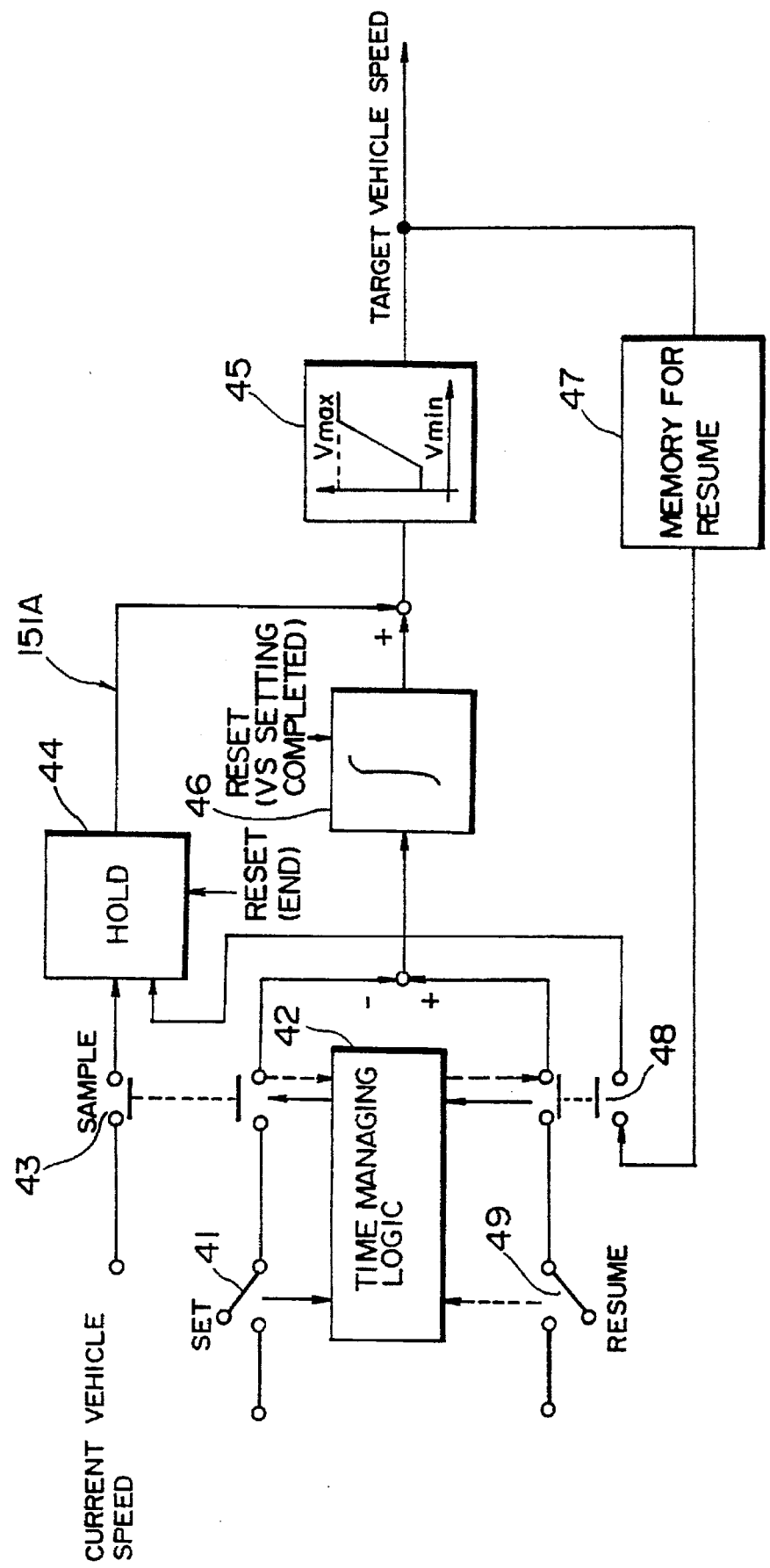

The TVS setting means 151A is constructed as shown in the block diagram of FIG. 3.

Namely, a set switch 41 and a resume switch 49 are provided. By turning these switches on or off, setting of a target vehicle speed is performed based on the current vehicle speed via a time managing logic 42, a hold circuit 44, an integrating unit 46, a resume memory 47, switches 43,48 and a vehicle speed limiter 45.

In addition to the elements described above, an unillustrated cruise switch is also provided as a main switch for conducting speed control (autocruise).

The specifications of these switches are as follows:

(1) Functions of the setting switches i) Set switch 41:

Setting of a target vehicle speed and reduction of the target vehicle speed.

ii) Resume switch 49:
   Resume of autocruising and increase of the target vehicle speed.
iii) Brake switch:
   Discontinuation of autocruising.
iv) Inhibitor switch:
   Suspension of autocruising.
(2) Conditions for the actuation of the respective functions:
   i) Setting of a target vehicle speed:
      The cruise switch should be in the ON position and the current vehicle speed is supposed be in a predetermined range. With both the brake switch and the inhibitor switched turned off, the set switch 41 is turned off→on→off. The ON period is supposed to fall within a prescribed range. Simultaneous pressing of the set switch and the resume switch should be taken invalid.
   ii) Increase of the preset vehicle speed:
      The vehicle speed should be increased at the rate of 1 km/hr every 0.5 second when the resume switch 49 is maintained in the ON position for 0.5 second or longer in the course of speed control.
   iii) Reduction of the preset vehicle speed:
      The vehicle speed should be decreased at the rate of 1 km/hr every 0.5 second when the set switch 41 is maintained in the ON position for 0.5 second or longer in the course of speed control.
   iv) Resume function:
      When the conditions for the initiation of autocruising are satisfied and the resume switch 49 is in the ON position, autocruising is performed using as a target speed the speed at the time of end of the preceding autocruise. Even when the ignition switch is turned on, this turning-on actuation is invalidated as long as it is before the initiation of autocruising.
   v) Discontinuation of autocruising:
      Autocruising is discontinued when either the brake switch or the inhibitor switch is turned on, or the cruise switch is turned off.
   vi) Suspension of autocruising:
      When a torque instructed by the accelerator pedal is greater than the current autocruise demanding torque, autocruising is suspended and the vehicle runs at the torque instructed by the accelerator pedal. When the torque instructed by the accelerator pedal becomes equal to or smaller than the current autocruise demanding torque (90% or smaller including a hysteresis) or the accelerator pedal position becomes equal to or higher than the idling level, autocruising is performed at the speed before the suspension.

Owing to the construction described above, the RL-compensating speed control unit 151 performs such operation as will be described next.

To actuate the speed control unit (autocruise), the driver turns on the autocruise switch and also turns off, on and then off the set switch 41 shown in the block diagram of FIG. 3. If, at this time, the vehicle speed V is in the range higher than 10 km/hr but lower than 100 km/hr (10 km/hr<V<100 km/hr), the brake switch and inhibitor switch are both in ON state and the period, t seconds, of the ON state of the set switch 41 is in the range longer than 0.1 second but shorter than 0.5 second (0.1<t<0.5), autocruise control is initiated. Namely, as is shown in FIG. 3, an interlocking switch 43 is maintained in ON state while the period of this ON state is being measured at the time control logic 42. The current vehicle speed held by the hold circuit 44 and this vehicle speed is inputted to the vehicle speed limiter 45.

An output of the vehicle speed limiter 45 is then inputted as a target vehicle speed V to an engine output control system depicted in FIGS. 1(b) and 4. If the operator turns on the resume switch 49 subsequent to the initiation of autocruising (ASC) and has the ON state continued for 0.5 second or longer, the vehicle speed stored in the resume memory 47 is inputted to the vehicle speed limiter 45 via the switch 48 and the hold circuit 44 and the speed increased at the rate of 1 km/hr upon every continuation of 0.5 second is inputted to the vehicle speed limiter 45 via the integrating circuit 46. As a result, the target speed is increased by 1 km/hr upon every 0.5 second continuation of the resume switch 49 in ON state. At the vehicle speed limiter 45, for a preset vehicle speed not lower than a desired speed, a preset maximum speed $V_{max}$ is outputted as a target vehicle speed. For a preset vehicle speed lower than a desired speed, the preset slowest vehicle speed $V_{min}$ will be outputted as a target.

To reduce the target vehicle speed, on the other hand, the set switch 41 is maintained in ON state for 0.5 second or longer. As a consequence, a reduced speed so set is inputted into the integrating circuit 46 via the switch 43. The so-set reduced speed as an output from the integrating circuit 46 is subtracted from the set vehicle speed as an output from the hold circuit 44, and the difference is inputted into the vehicle speed limiter 45. A target vehicle speed V reduced by 1 km/hr upon every 0.5 second continuation of ON state of the set switch 41 is, therefore, outputted from the vehicle limiter 45.

The actuation of this autocruising (ASC) is discontinued when the brake switch or inhibitor switch is turned on or the cruise switch is turned off. When the resume switch 49 is turned on, autocruising is resumed. At this time, the speed at the time of discontinuation of the preceding autocruising is read from the resume memory 47 and autocruising is performed using that speed as a target speed. Even when the resume switch 49 is brought into ON state after an ignition switch has been turned on, autocruising is not performed if there is no history of actuation of autocruising before the resume switch 49 was turned on.

On the other hand, at the engine output control unit which performs autocruising by controlling the output of the engine, as is illustrated in the block diagram of FIG. 4 and the flow charts of FIGS. 5(a) to 5(c), a target vehicle speed V is inputted from a target vehicle speed setting means (hereinafter referred to as the "TVS setting means") 151A. A deviation $\Delta V$ (=V−Va) of an actually-measured vehicle speed Va, which has been detected by a vehicle speed detection means 151F, from the target vehicle speed V is calculated (step b1), followed by the input of the deviation $\Delta V$ into the PI control unit 101. At the PI control unit 101, a speed correction torque is calculated in accordance with the formula $K_p \cdot \Delta V + K_I \cdot \int \Delta V$ ($K_p, K_I$: constants) (step b2). The value so calculated is inputted into the acceleration limiting unit 102.

To avoid shock by a speed correction, a preset maximum correction torque $T_{max}$ in the range that no shock will be produced is outputted from the acceleration limiting unit 102 against any speed correction unit of a level greater than that needed. On the other hand, a preset minimum correction torque $T_{min}$ is outputted for any speed correction torque of a level smaller than needed (step b3). Upon receipt of the vehicle speed V detected by the vehicle speed detection means 151F, the acceleration torque detection means 107 detects (or estimates) the acceleration of the vehicle by differentiation (step a1). The acceleration detection means S1 in the acceleration torque detection means 107 can be constructed of an acceleration sensor.

At the acceleration torque detection means 107, the acceleration torque corresponding to the current acceleration quantity is calculated in accordance with W·(dV/dt)·r (step a2). In this equation, W: total vehicle weight, V: vehicle body speed, and r: tire diameter. Next, upon receipt of the engine revolution number Ne detected by the engine revolution number sensor 17a, the drive axle torque of the engine is detected (or estimated) by the drive axle torque calculation means 151E (step a3).

Namely, the drive axle torque can be calculated in accordance with the following formula:

$$C \cdot \tau \cdot Ne^2 \cdot \rho$$

where

C: capacity coefficient of torque converter (which is given by a separate map);

τ: torque ratio (which is given by a separate map;

Ne: engine revolution number (rpm); and

ρ: overall gear ratio.

Measured values of the above acceleration and drive axle torque are subjected to a primary filter to eliminate noise, whereby the acceleration and drive axle torque are determined while placing priority on stability rather than momentary accuracy. Further, any error which may arise during the calculation can be corrected by PID control.

Subsequent to the above-described detection of the drive axle torque, the calculation of the running resistance torque (running load torque) is conducted in accordance with the following formula:

Running resistance torque=drive axle torque $(C \cdot \tau \cdot Ne^2 \cdot \rho)$—acceleration torque $\{W \cdot (dV/dt) \cdot r\}$      (step a4).

At the TAO means 151C, the running load torque and the speed correction torque, both described above, are then summed to determined a target drive axle torque. This target drive axle torque is inputted to the TEO realizing means 151D (step c1).

At the TAO means 151C, the target drive axle torque is converted to an intake air volume A/N per revolution of the engine via an engine torque. In other words, an engine output torque corresponding to the axle torque is calculated in view of the gear ratio (including the torque ratio of the torque converter). An air volume required for the output torque is then determined based on a substantially linear function which indicates the their relationship. The air volume is converted to an angle of rotation of the throttle valve 6 and is inputted to the TEO realizing means 151D.

Instead of obtaining the intake air volume from the engine output torque, a fuel volume may be obtained from the engine output torque. In this manner, the control can be applied not only to a gasoline engine but also to a diesel engine. Namely, it is necessary to determine an intake air volume or fuel volume in the case of a gasoline engine or a fuel volume in the case of a diesel engine and then control the intake air volume or the fuel volume.

By doing so, the throttle valve 6 is rotated under control to a position by the motor drive unit so that the engine can output the target drive axle torque (step c2).

Figure 5C:
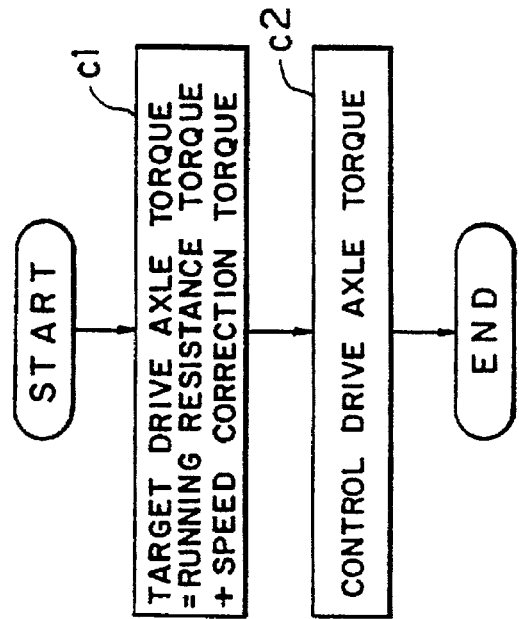
Figure 5B:
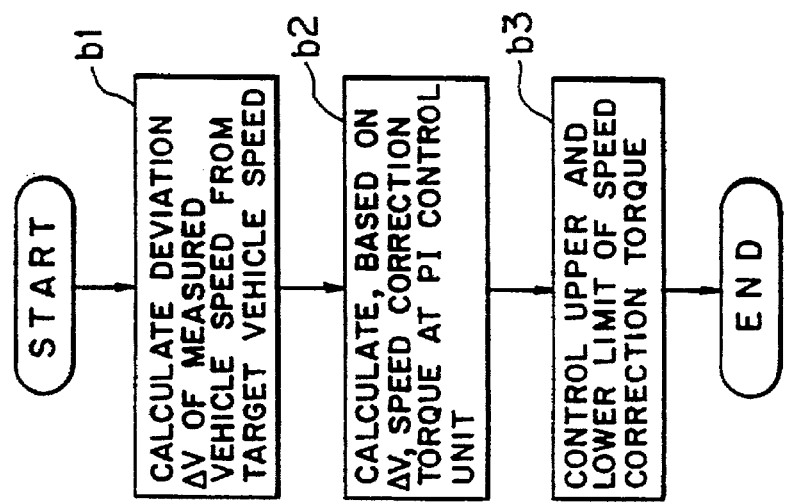
Figure 5A:
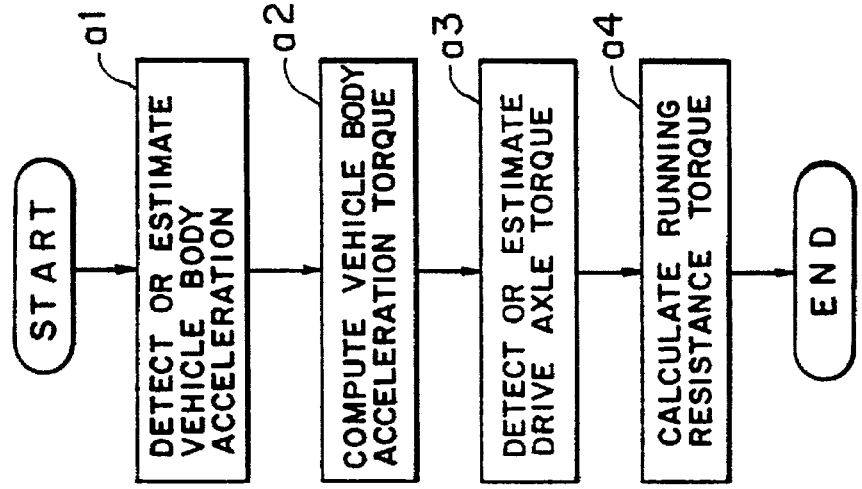

The individual operations in the flow charts shown in FIGS. 5(a), 5(b) and 5(c), respectively, are performed in parallel and, as the detection values for the respective steps, those at the time of the processings are used.

By such operations as described above, when the vehicle has come to a slope or the like and a change has occurred in load, the throttle valve 6 is controlled to compensate the running load torque such that the change in load can be eliminated, whereby a sure and prompt measure can also be taken against such a change in load.

A description will next be made of the OTC-limiting speed control unit 152. The unit 152 is constructed as shown in FIGS. 1(c), 2(a), 2(b) and 6.

Figure 8A:
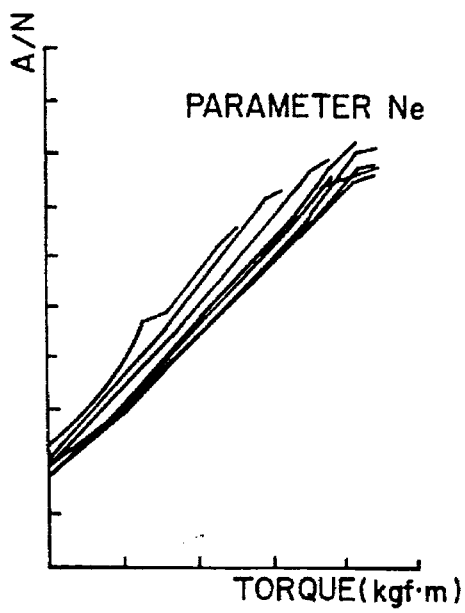

By a permissible torque change setting means (hereinafter referred to as the "PTC setting means") 152A, upper and lower limits for changes in drive torque are set so that the driver does not feel shock during speed control. These upper and lower limits are inputted in a converter means 152B. The converter means 152B is equipped with a map indicative of correlation between torque changes and A/N (air volumes per engine revolution) as shown in FIG. 8(a) and outputs the upper and lower limits of torque changes after converting them to an upper limit ΔA/Nu and a lower limit ΔA/Nl for A/N.

Figure 6:
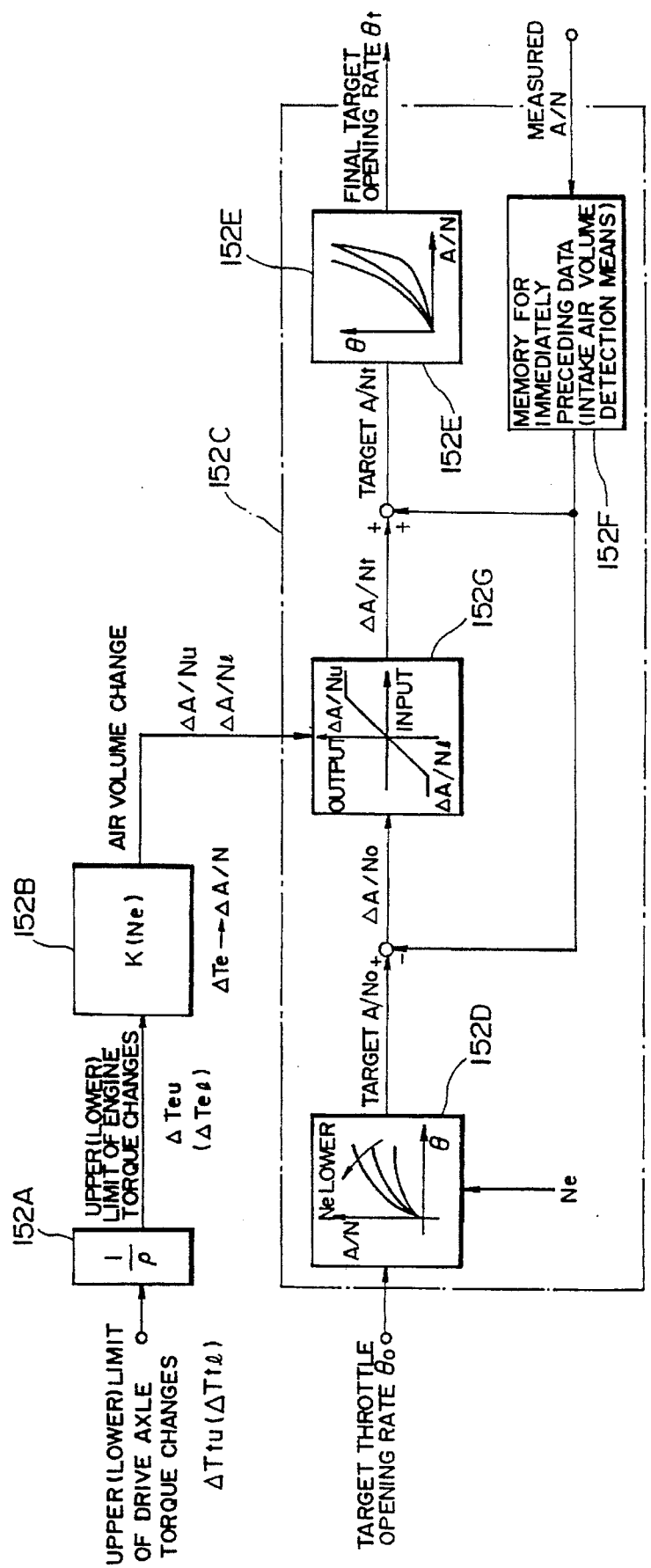
Figure 8B:
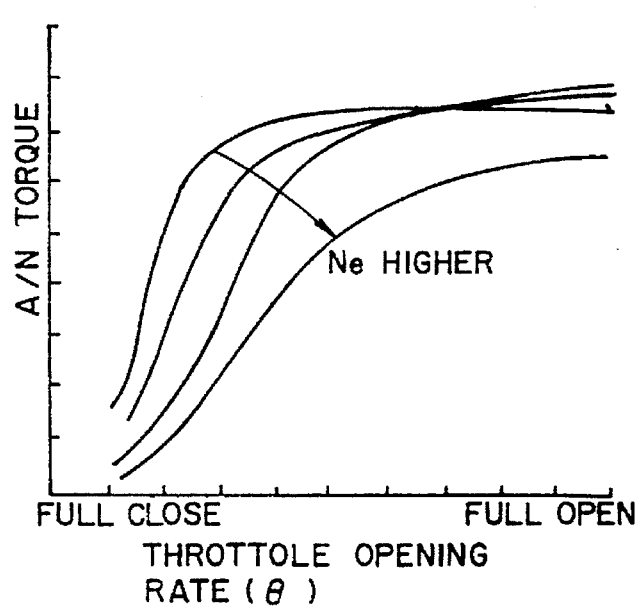

A throttle valve open/close limiting means (hereinafter referred to as the "TV open/close limiting means) 152C is also provided. This limiting means 152C is inputted with a target throttle opening rate θo from the TEO realizing means 153C, which will be described later, and outputs a final target throttle valve opening rate θt. Namely, the limiting means 152C is, as shown in FIG. 6, a throttle opening rate-air volume converter unit 152D to convert the target throttle opening rate θo to a target air volume A/No. A map indicative of air volumes A/N corresponding to throttle opening rates θ, such as that illustrated in FIG. 8(b), is stored against the engine revolution number Ne as a parameter in the conversion unit 152D. From the target throttle opening rate θo so inputted and also from an engine revolution number signal inputted from the engine revolution number sensor 17a, the target air volume A/No is calculated and outputted.

An A/N value of the engine, which has been measured during the last control and has been stored in a memory 152F, is subtracted from the output of the throttle opening rate-air volume converter unit 152D. The difference is then inputted as an air change ΔA/No to a limiter 152G. At the limiter 152G, to calculate the final target A/N, the air change ΔA/No is limited to ΔA/Nt which falls within the range defined by the upper and lower limits ΔA/Nu and ΔA/Nl, and is then outputted. The TV open/close limiting means 152C is provided with an air volume-throttle opening rate converter unit 152E. The air change ΔA/Nt outputted from the limiter 152G is added to the measured A/N value from the memory 152F in which the last operation state is stored, and the sum so obtained is inputted to the converter unit 152E.

Figure 8C:
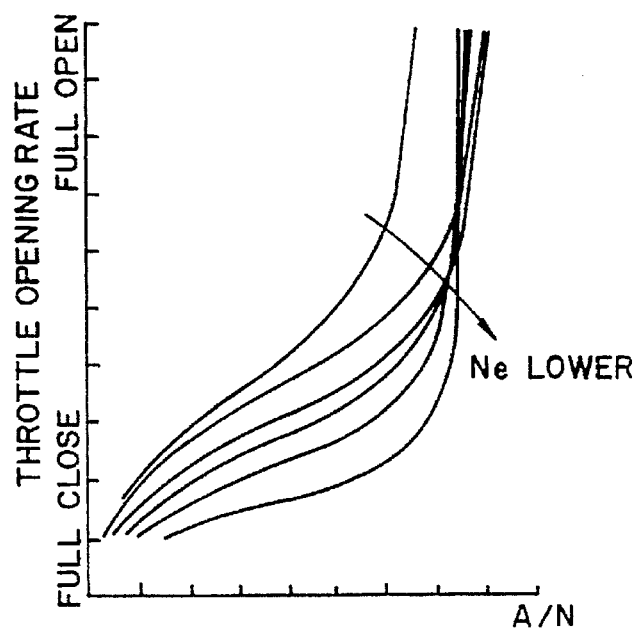

In the air volume-throttle opening rate converter unit 152E, a map indicative of throttle opening rates θ corresponding to A/N, such as that illustrated in FIG. 8(c), is stored against the engine revolution number Ne as a parameter, so that the target A/Nt can be outputted subsequent to its conversion to the final target opening rate θt.

Where the RL-compensating speed control unit 151 is provided, the final target opening rate θt is converted to a speed correction torque and then inputted to the TAO means 151C. Without the control unit 151, the final target opening rate θi is outputted directly to the drive motor 7 for the throttle valve 6.

Owing to the construction described above, at the OTC-limiting speed control unit 152, control is performed following the flow chart of FIG. 7 as will be described next.

Namely, an upper limit ΔTtu and a lower limit ΔTtl for a change in drive axle torque during every control cycle so that an occupant does not feel shock during speed control are set in advance at the PTC setting means 152A (step 52A).

At the PTC setting means 152A, the upper and lower limits ΔTtu,ΔTtl are divided by a current gear ratio ρ of the vehicle, respectively, and are hence converted to upper and lower limits ΔTeu,ΔTel to changes in engine torque (step 52B). Next, at the converter means 152B, the upper and lower limits ΔTeu, ΔTel of the engine torque change are converted to air volume changes (per engine revolution) ΔA/Nu,ΔA/Nl in accordance with the map shown in FIG. 8(a) (step 52C).

On the other hand, at the TV open/closure limiting means 152C, the target throttle opening rate θo is converted to the target air volume A/No by the throttle opening rate-air volume converter unit 152D. Here, the conversion is conducted by the map corresponding to the characteristics shown in FIG. 8(b) so that the target air volume A/No is determined by the throttle opening rate θo and the engine revolution number Ne (step 52D).

Further, the A/N at the time of the last control, which has been measured beforehand and is stored in the memory (intake air volume detection means) 152F, is subtracted from the target air volume A/No. The target air volume A/No is therefore inputted in the form of the difference ΔA/No in the air volume change limiter 152G (step 52E).

When the difference ΔA/No falls between the upper and lower limits ΔA/Nu and ΔA/Nl, the difference ΔA/No is outputted, as it is, as ΔA/Nt from the limiter 152G. When the difference ΔA/No is greater than the upper limit ΔA/Nu, ΔA/Nu is outputted. When the difference ΔA/No is smaller than the lower limit ΔA/Nl, ΔA/Nl is outputted as ΔA/Nt (step 52F). ΔA/Nt outputted from the limiter 152G is added to the last A/N stored in the memory 152F and is then inputted as the target air volume A/Nt to the air volume-throttle opening rate converter unit 152E (step 52G).

At the air volume-throttle opening rate converter unit 152E, the target air volume A/Nt is converted to the final target opening rate θt in accordance with the map of the characteristics depicted in FIG. 8(c) and is then outputted (step 52H). The throttle valve 6 is therefore driven toward the target opening rate θt by means of the motor 7 (step 52I).

Where the OTC-limiting speed control unit 152 is connected to the RL-compensating speed control unit 151, the target opening rate θt is converted further to a speed correction torque and is then inputted to the TAO means 151C. Accordingly, the OTC-limiting speed control unit 152 operates as the acceleration limiting unit 102.

As has been described above, changes in the intake air volume or fuel volume (each per engine revolution) which is in a linear relationship with the engine output torque are directly limited to avoid acceleration shock, thereby making it possible to easily and surely prevent acceleration shock.

The OTC-limiting speed control unit 152 can be designed to directly control the speed in accordance with the air volume without using the throttle opening rate as a target. In this case, the throttle opening rate-air volume converter unit 152D (θ→A/N) and the air volume-throttle opening rate converter unit 152E (A/N→θ) become unnecessary.

Since the air volume is substantially proportional to the fuel volume in a gasoline engine, the speed can be controlled based on the fuel volume instead of A/N. In the case of a diesel engine, the speed is controlled base on the fuel volume. When the speed is controlled in accordance with the fuel volume as described above, the control can also be conducted in a similar manner to the control performed relying upon the air volume.

Figure 1A:
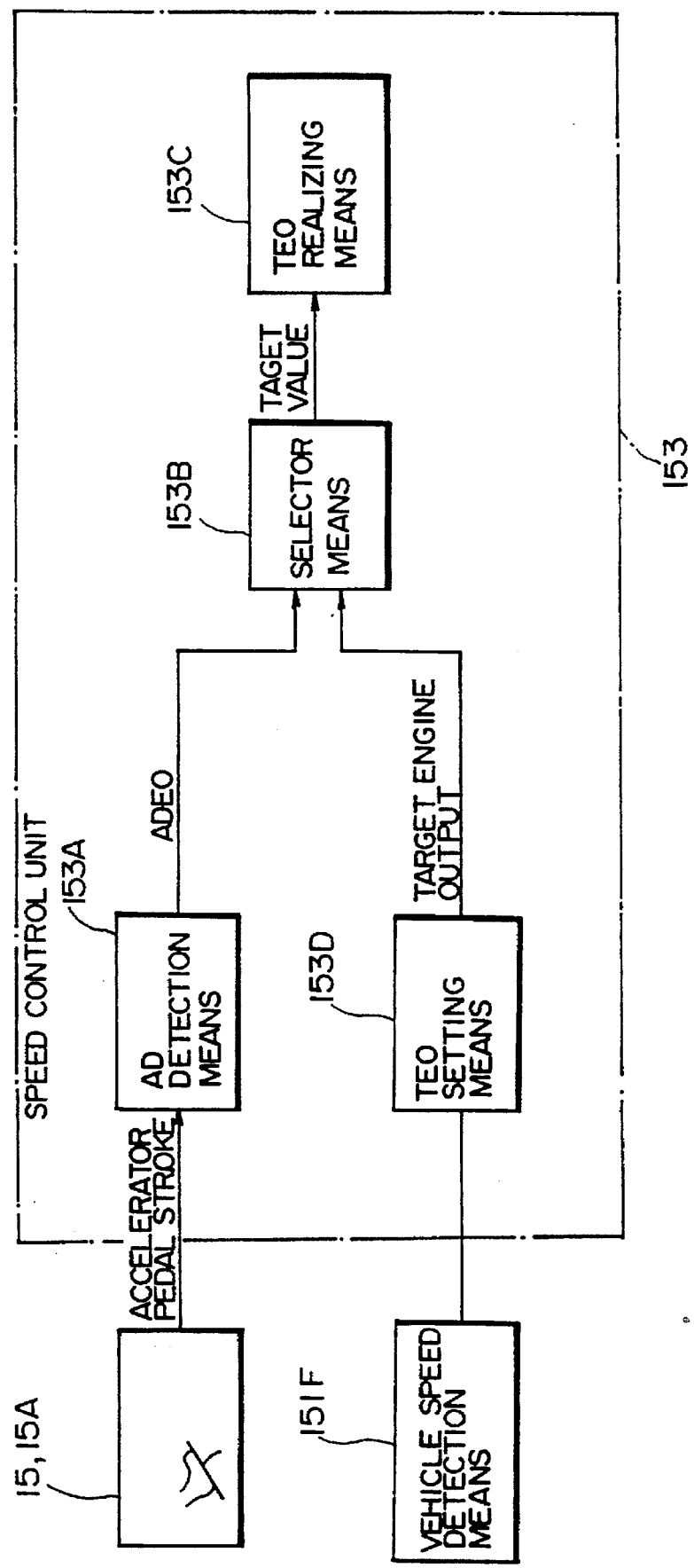
Figure 1C:
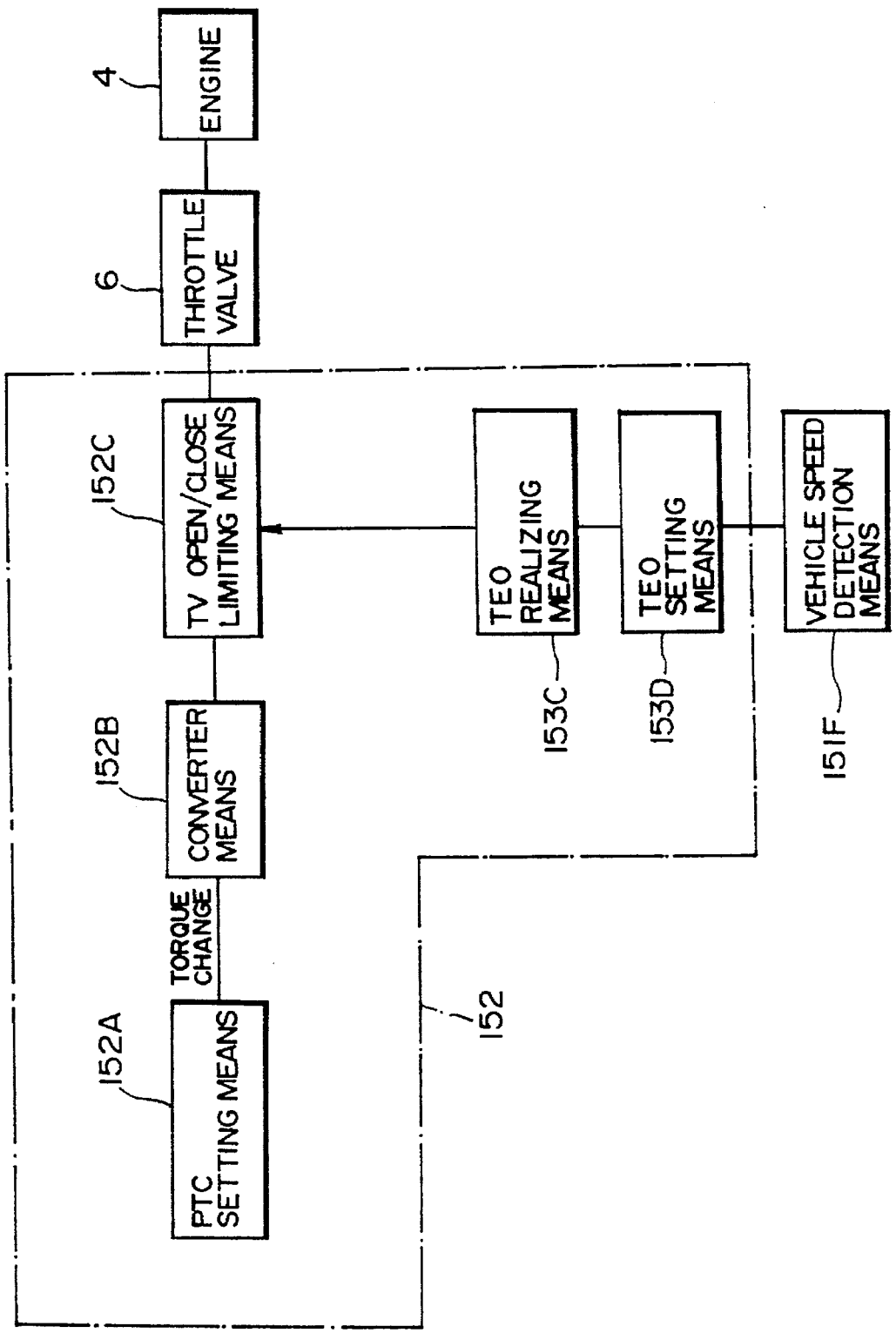
Figure 13A:
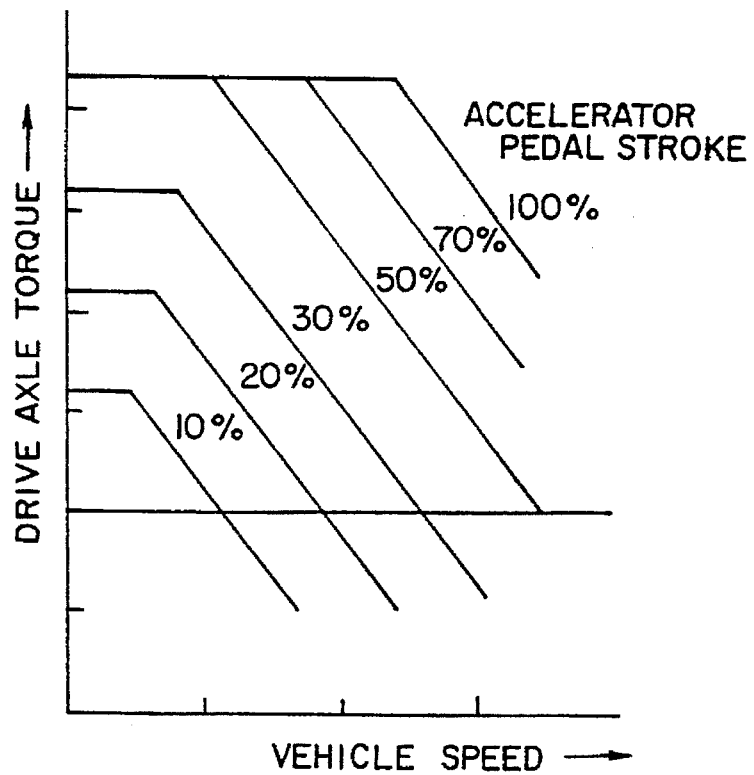

An accelerator-pedal-combined speed control unit (hereinafter referred to as the "AP-combined speed control unit") 153 will next be described. This AP-combined speed control unit 153 is constructed as shown in FIGS. 1(a) and 11. The AP-combined speed control unit 153 is provided with an acceleration demand detection means (hereinafter referred to as the "AD detection means") 153A which detects an acceleration output demanded by the driver through a stroke of an accelerator pedal 15. This AD detection means 153A is equipped with a map of characteristics such as those shown in FIG. 13(a), so that relations among preset speeds, drive axle torques and accelerator pedal strokes are set there.

Also provided is a target engine output setting means (hereinafter referred to as the "TEO setting means") 153D, which receiver as input information an engine output demand corresponding to a speed set by the driver for controlling autocruising (ASC), an intake air volume detected by the air flow sensor 3 and a revolution number detected by the engine revolution number sensor 17a.

In addition, a controller (selector means) 153B is also provided. Inputted to the controller 153B are the output demand from the AD detection means 153A, the output demand having been set by the accelerator pedal 15, and a target autocruising engine output from a target engine output setting means (hereinafter referred to as the "TEO setting means") 153D.

Figure 13B:
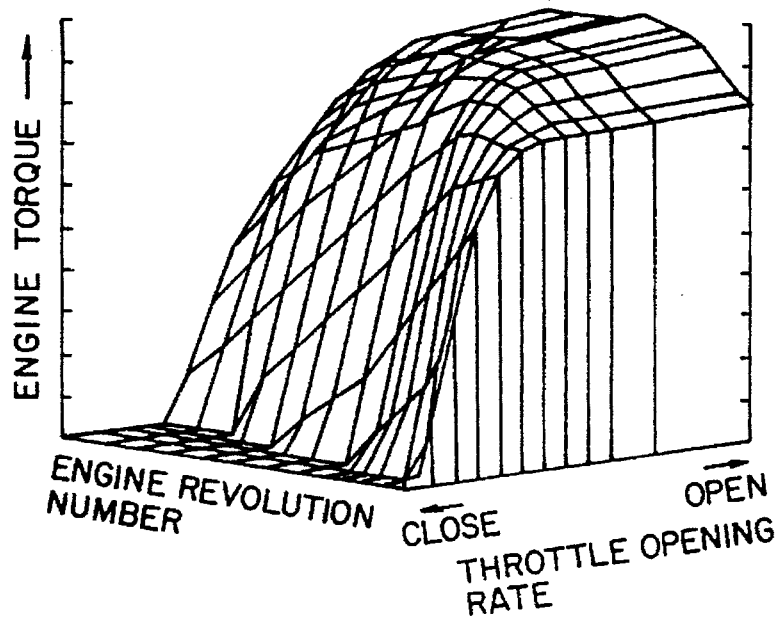

The controller 153B has a switching function (selection function). Either the output demand set by the accelerator pedal 15 or the target autocruising engine output is selected by the switching function and is outputted as a target engine output torque. The target engine output torque is then inputted to the TEO realizing means 153C. The TEO realizing means 153C is equipped with the characteristics, which are shown in FIG.13(b), as a map, whereby the target throttle opening θ is determined from the engine revolution number Ne and the target output torque (engine torque) T and is then outputted.

Figure 12A:
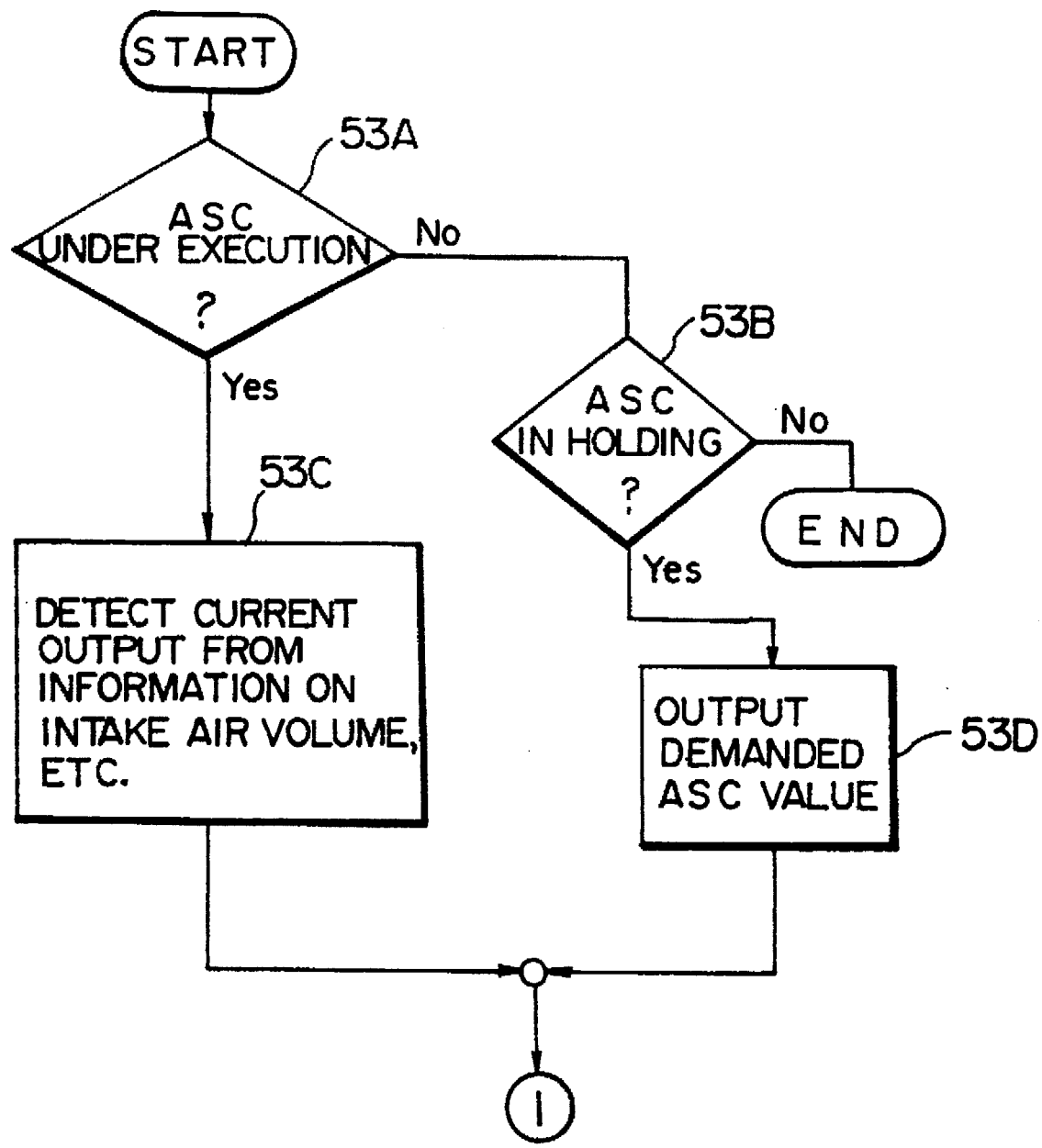
Figure 12:
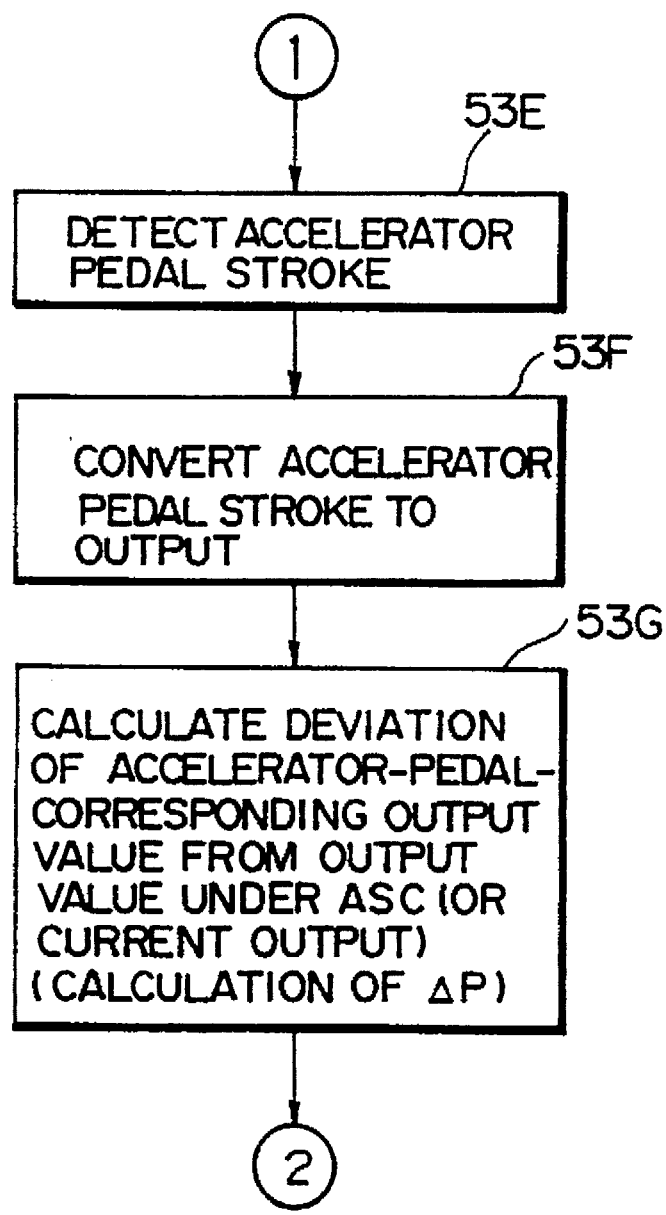
Figure 12C:
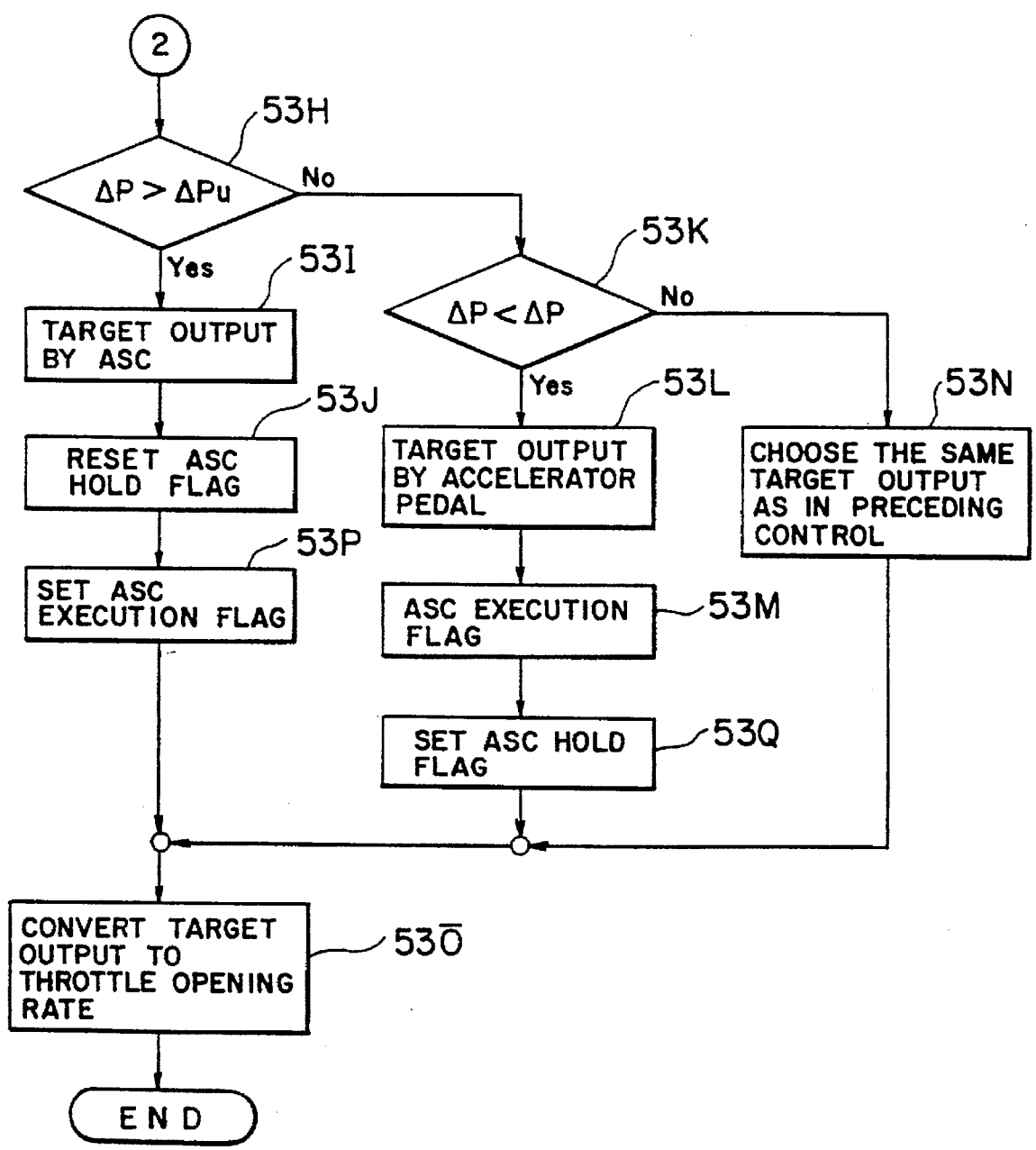

Owing to the above construction, the AP-combined speed control unit 153 operates following the charts depicted in FIGS. 12(a), 12(b) and 12(c), respectively.

It is judged by interlocked switches 153D$_2$,153D$_3$ in the TEO setting means 153D if autocruising (ASC) is under execution (step 53A). When autocruising is under execution with the switch 153D$_2$ being maintained in ON state, the present output is computed by the output detection means 153D$_1$ on the basis of an intake air volume from the air flow sensor 3 and a revolution number from the revolution number sensor 17a and is outputted from the TEO setting means 153D (step 53C). When the switch 153D$_2$ is in OFF state and switch 153D$_3$ is in ON state (i.e., during ASC holding; step 53B), the autocruising output demand is outputted from TEO setting means 153D (step 53D).

An acceleration demand by the driver, said demand having been made by treadling the accelerator pedal 15, is detected by the AD detection means 153A. Namely, the stroke of the accelerator pedal 15 is detected by an accelerator position sensor 15A (step 53E) and, by the map shown in FIG. 13(a), a vehicle speed plotted along the axis of abscissas is converted to an output (drive axle torque) while using the stroke as a parameter (step 53F).

The thus-determined output (drive axle torque) corresponding to the stroke of the accelerator pedal is inputted to a selector means 153B. At a subtraction means 153B$_1$, the output demand by the accelerator pedal is subtracted from the autocruising output demand so that the deviation ΔP of the former from the latter is calculated (step 53G). At the selector means 153B, the deviation ΔP is then inputted to a switcher 153B$_2$ so that a target output is determined through steps 53H, 53I, 53K, 53L and 53N.

Namely, if the deviation ΔP is greater than a preset upper deviation limit ΔPu (ΔPu>0), the output from the TEO setting means 153D, said output having been set to corresponding to autocruising, is adopted as the target output because the output from the TEO setting means 153D is greater by at least a predetermined value than the output demanded by the accelerator pedal 15 (steps 53H,53I). As a result, an autocruise hold flag for bringing the switch 153D$_3$ into OFF state is reset (step 53J), and an autocruise execution flag for bringing the switch 152D$_2$ to ON state is set (step 53P).

If the deviation ΔP is smaller than a preset lower deviation limit ΔPl(ΔPl<0<ΔPu), the output demanded by the accelerator pedal 15 is adopted as the target output because it is greater by at least a predetermined value than the output from the TEO setting means 153D, said output having been set to correspond to autocruising step 53L). As a result, the autocruise execution flag is reset by the switch 152D$_2$ (step 53M) and the autocruise hold flag is set by the switch 153D$_3$ (step 53Q).

If the deviation ΔP is a value between ΔPu and ΔPl, the target output at the time of the last control is adopted again because the output demanded by the accelerator pedal 15 is not greater by at least a predetermined value than the output corresponding to the autocruise or vice versa (step 53N). Accordingly, the autocruise hold flag is neither set nor reset so that control conducted like the last control. Namely, if the last control is autocruising, the target engine output for the autocruising is selected. If the last control is a demand for acceleration, the acceleration demanding engine output is selected. This can prevent control chattering.

The target output determined by the selector means 153B is then inputted to the TEO realizing means 153C and, in accordance with the map shown in FIG. 13(b), a target throttle opening rate θ is outputted (step 53O). Namely, the target throttle opening rate θ is determined by the engine output number Ne and the target output (engine torque) in FIG. 13(b).

When the accelerator pedal 15 is treadled substantially while maintaining the autocruising speed controlled state by such an operation as described above, acceleration corresponding to the stroke of the accelerator pedal 15 is effected. When the stroke of the accelerator pedal 15 is reduced to or beyond a predetermined level, the vehicle returns to the autocruising state.

Acceleration pursuant to the driver's intention is therefore achieved promptly without any interruption of autocruising by treadling of the brake pedal as described above. The response is therefore faster and, as the output of the engine changes in a continuous manner upon returning to the autocruise mode, no shock is produced upon returning to the autocruise mode.

In addition, it is no longer necessary to cancel the autocruise mode. This has eliminated the cumbersome operation, thereby lowering the danger of induction of erroneous operations.

The output from the AL-combined speed control unit 153 is selectively adopted depending on the degree of its preference relative to other outputs parallelly outputted from other control units and the setting of a drive mode by the driver, whereby the running of the vehicle is controlled.

From the foregoing, it is understood that the RL-compensating speed control unit 151, the OTC-limiting speed control unit 152 and the AP-combined speed control unit 153 are constructed as described below.

A description will first be made centering on the AP-combined speed control unit 153. In the drive-by-wire vehicle engine output control system for setting the quantity of control of an engine in accordance with the state of operation of the accelerator pedal 15 by the driver and the state of driving of the vehicle to electrically control the output of the engine on the basis of the control quantity or for controlling the output of the engine without relying upon operation of the accelerator pedal, the AP-combined speed control unit 153 comprises the vehicle speed detection means 151F for detecting a running speed of the vehicle; the TEO setting means 153D for setting, based on the running speed detected by the vehicle speed detection means 151F, a target autocruise engine output as the target output value to be outputted from the engine to execute autocruising in which the running speed of the vehicle is maintained at the predetermined value; the AD detection means 153A for setting an acceleration demanding engine output as the target output value to be outputted from the engine in order to accelerate the vehicle in accordance with the degree of operation of the accelerator pedal; the selector means 153B for comparing the target autocruise engine output set by the TEO setting means 153D with the acceleration demanding engine output set by the AD detection means 153A and, when one of the engine outputs is greater than the other, selecting the greater engine output as the target engine output; and the TEO realizing means 153C for setting the engine control quantity at the level required to actually obtain an engine output equal to the target engine output selected by the selector means 153B.

In the above construction, the selector means 153B compares the target autocruise engine output set by the TEO setting means 153D with the acceleration demanding engine output set by the AD detection means 153A and, when one of the engine outputs is greater than the other by a deviation of at least a predetermined value, selecting the greater engine output as the target engine output. The TEO setting means 153D further comprises the output detection means 153D$_1$ for detecting an actual output of the engine in the course of the execution of the autocruising, and the selector means compares, instead of the target autocruise engine output, the actual engine output detected by the output detection means 153D$_1$ with the acceleration demanding engine output while the target autocruise engine output is selected as the target engine output. The AD detection means 153A sets the acceleration demanding engine output on the basis of the running speed of the vehicle detected by the vehicle speed detection means 151F and the degree of operation of the accelerator pedal. The TEO setting means 153D comprises the TVS setting means 151A for setting a target vehicle speed upon the autocruising; the SCT setting means 151B for determining the deviation of the running speed of the vehicle detected by the vehicle speed detection means 151F from the target vehicle speed set by the TVS setting means 151A and, based on the deviation, setting the speed correction torque as a correction quantity for the torque of the drive axle of the vehicle, said correction quantity being required to eliminate the deviation; the drive axle torque detection means 151E for detecting an actual drive torque of the drive axle; the RLT detection means 151G for detecting, based on the drive axle torque detected by the drive axle torque detection means 151E, a running load torque corresponding to a running load during running of the vehicle; and the TAO means 151C for setting the target autocruise engine output on the basis of the speed correction torque set by the SCT setting means 151B and the running load torque detected by the RLT detection means 151G.

In addition, the RLT detection means 151G further comprises the acceleration torque detection means 107 for detecting an acceleration torque applied upon actual acceleration of the vehicle, whereby the running load torque is detected based on the drive axle torque detected by the drive axle torque detection means 151E and the acceleration torque detected by the acceleration torque detection means 107. The RLT detection means may be designed to detect the running load torque by subtracting the acceleration torque detected by the acceleration torque detection means 107 from the drive axle torque detected by the drive axle torque detection means 151E. The acceleration torque detection means 107 comprises the acceleration detection means S1 for detecting a running acceleration of the vehicle; and the acceleration torque computing unit S2 for computing the acceleration torque on the basis of the running acceleration detected by the acceleration detection means S1.

The TAO means 151C sums the speed correction torque set by the SCT setting means 151B and the running load torque detected by the RLT detection means 151G, converts the resulting sum to the target autocruise engine output and then outputs the target autocruise engine output. The SCT setting means 151B comprises the PI control unit 101 for determining the deviation of the running speed of the vehicle detected by the vehicle speed detection means 151F from the target vehicle speed set by the TVS setting means 151A and setting a speed correction torque as the torque correction quantity for the drive axle of the vehicle, said torque correction quantity being required to eliminate the deviation; and the acceleration limiting unit 102 for limiting, within the predetermined range, the speed correction torque set by the PI control unit 101.

The AP-combined speed control unit 153 further comprises the PTC setting means 152A for setting a permissible output change value for the engine; and the TV open/close limiting means 152 for limiting, on the basis of the permissible output change value set by the PTC setting means 152A, the engine control quantity set by the TEO realizing means 153C whereby changes in output of the engine are maintained not greater than the permissible output change value. The PTC setting means 152A converts the preset permissible value of the torque change at the drive axle of the vehicle to the permissible output change value on the basis of the current gear shift position of the transmission.

The TEO realizing means 153C converts the target engine output, which has been selected by the TEO realizing means 153C, to a target air volume—which is the volume of intake air per revolution of the engine required to actually obtain an engine output equal to the target engine output selected by the selector means 153B—and then outputs the target air volume as the engine control quantity. The TEO realizing means 153C further comprises the converter means 152B for converting the permissible output change value, which has been set by the PTC setting means 152A, to the permissible air volume change per revolution of the engine, whereby the TV open/close limiting means 152C controls the target air volume, which has been set by the TEO realizing means 153C, on the basis of the permissible air volume change obtained as a result of conversion by the converter means 152B.

The TV open/close limiting means 152C comprises the intake air volume detection means 152F for detecting the volume of intake air actually taken in the engine per revolution of the engine; and the air volume change limiter 152G for limiting the deviation of the actual intake air volume detected by the intake air volume detection means 152F from the target air volume set by the TEO realizing means 153C to a level not greater than the permissible air volume change obtained as a result of conversion by the converter means 152B and then outputting the thus-limited deviation as a target air change quantity, whereby the engine control quantity required to make a change of the actual intake air volume per revolution of the engine equal to the target air change value is set based on the target air change value outputted from the air volume change limiter 152G. The TV open/close limiting means 152C outputs, as the engine control quantity, a final target air volume obtained by summing the target air change value outputted from the air volume change limiter 152G and the actual intake air volume detected by the intake air volume detection means 152F.

The system controls the output of the engine via the throttle valve 6 of the engine and the TEO realizing means 153C sets, as the engine control quantity, a target opening rate of the throttle valve required to actually obtain an engine output equal to the target engine output selected by the selector means 153B. The system, in which the output of the engine is controlled by the throttle valve 6 as described above, further comprises the converter means 152B for converting the permissible output change value, which has been set by the PTC setting means 152A, to a permissible air volume change per revolution of the engine, wherein the TV open/close limiting means 152C comprises the throttle opening rate-air volume converter unit 152D for converting the target opening rate, which has been set by the TEO realizing means 153C, to a target air volume which is an intake air volume per revolution of the engine; the TV open/close limiting means 152G for limiting the target air volume, which has been obtained as a result of conversion by the throttle opening rate-air volume converter unit 152D, on the basis of the permissible air volume change obtained as a result of conversion by the converter means 152B; and the air volume-throttle opening rate conversion unit 152E for setting, as the final target opening rate, an opening rate of the throttle valve required to make the actual intake air volume per revolution of engine equal to the target air volume limited by the air volume change limiter 152G.

In this case, the TV open/close limiting means 152C further comprises the intake air volume detection means 152F for detecting the volume of intake air actually taken in the engine per revolution of the engine, the air volume change limiter 152G limits the deviation of the actual intake air volume detected by the intake air volume detection means 152F from the target air volume obtained as a result of conversion by the throttle opening rate-air volume converter unit 152D to a value not greater than the permissible air volume change obtained as a result of conversion by the converter means 152B, and the air volume-throttle opening rate conversion unit 152E determines the final target air volume by summing the target air change value outputted from the air volume change limiter 152G and the actual intake air volume detected by the intake air volume detection means 152F, thereby setting, based on the final target air volume, the final opening rate of the throttle valve required to make the volume of intake air taken in the engine per revolution of the engine equal to the final target air volume.

The above drive-by-wire vehicle engine output control system further comprises the converter means 152B for converting the permissible output change value, which has been set by the PTC setting means 152A, to a permissible air volume change per revolution of the engine, wherein the TV open/close limiting means 152C limits the target opening rate, which has been set by the TEO realizing means 153C, on the basis of the permissible fuel volume change obtained as a result of conversion by the converter means 152B.

The construction has been described centering on the AP-combined speed control unit 153. The construction will hereinafter be discussed centering on the running-load-compensating speed control unit 151. In this case, the drive-by-wire vehicle engine output control system is for setting the quantity of control of the engine in accordance with the state of operation of the accelerator pedal by the driver and the state of driving of the vehicle to electrically control the output of the engine on the basis of the control quantity or for controlling the output of the engine without relying upon operation of the accelerator pedal. The system comprises the vehicle speed detection means 151F for detecting the running speed of the vehicle; the TVS setting means 151A for setting a target vehicle speed upon autocruising in which the running speed of the vehicle is maintained constant; the SCT setting means 151B for determining the deviation of the running speed of the vehicle detected by the vehicle speed detection means 151F from the target vehicle speed set by the TVS setting means 151A and, based on the deviation, setting a speed correction torque as the correction quantity for the torque of the drive axle of the vehicle, said correction quantity being required to eliminate the deviation; the drive axle torque detection means 151E for detecting an actual drive torque of the drive axle; the RLT detection means 151G for detecting, based on the drive axle torque detected by the drive axle torque detection means 151E, a running load torque corresponding to a running load during running of the vehicle; the TAO means 151C for setting the target autocruise engine output on the basis of the speed correction torque set by the SCT setting means 151B and the running load torque detected by the RLT detection means 151G; and the TEO realizing means 151D for setting the engine control quantity at a level required to actually obtain an engine output equal to the target autocruise engine output set by the TAO means 151C.

In this case, the RLT detection means 151G further comprises an acceleration torque detection means 107 for detecting an acceleration torque applied upon actual acceleration of the vehicle, whereby the running load torque is detected based on the drive axle torque detected by the drive axle torque detection means 151E and the acceleration torque detected by the acceleration torque detection means 107. Further, the RLT detection means 151G detects the running load torque by subtracting the acceleration torque detected by the acceleration torque detection means 107 from the drive axle torque detected by the drive axle torque detection means 151B. The acceleration torque detection means 107 comprises the acceleration detection means S1 for detecting a running acceleration of the vehicle; and an acceleration torque computing unit S2 for computing the acceleration torque on the basis of the running acceleration detected by the acceleration detection means S1.

In addition, the TAO means 151C sums the speed correction torque set by the SCT setting means 151B and the running load torque detected by the RLT detection means 151G, converts the resulting sum to the target autocruise engine output and then outputs the target autocruise engine output.

The SCT setting means 151B comprises the PI control unit 101 for determining the deviation of the running speed of the vehicle detected by the vehicle speed detection means 151F from the target vehicle speed set by the TVS setting means 151A and setting a speed correction torque as the torque correction quantity for the drive axle of the vehicle, said torque correction quantity being required to eliminate the deviation; and the speed correction torque limiter 102 for limiting, within the predetermined range, the speed correction torque set by the PI control unit 101.

The construction has been described centering on the running-load-compensating speed control unit 151. The construction will next be described centering on the output-torque-change-limiting speed control unit 152. In this case, the drive-by-wire vehicle engine output control system is for setting the quantity of control of the engine in accordance with the degree of depression of the accelerator pedal by the driver and the mode of operation of the vehicle to electrically control the output of the engine on the basis of the control quantity or for controlling the output of the engine without relying upon operation of the accelerator pedal. The system comprises the vehicle speed detection means 151F for detecting a running speed of the vehicle; the TEO setting means 153D for setting, based on the running speed detected by the vehicle speed detection means 151F, a target autocruise engine output as the target output value to be outputted from the engine to execute autocruising in which the running speed of the vehicle is maintained at the predetermined value; the TEO realizing means 153C for setting the engine control quantity at a level required to actually obtain an engine output equal to the target autocruise engine output set by the TEO setting means 153D; the PTC setting means 152A for setting a permissible output change value for the engine; and the TV open/close limiting means 152C for limiting, on the basis of the permissible output change value set by the PTC setting means 152A, the engine control quantity set by the TEO realizing means 153C whereby changes in output of the engine are maintained not greater than the permissible output change value.

In this case, the PTC setting means 152A converts the preset permissible value of the torque change at the drive axle of the vehicle to the permissible output change value on the basis of the current gear shift position of the transmission. The TEO realizing means 153C converts the target engine output, which has been selected by the TEO realizing means 153C, to the target air volume—which is the volume of intake air per revolution of the engine required to actually obtain an engine output equal to the target autocruise engine output set by the TEO setting means 153D—and then outputs the target air volume as the engine control quantity. Here, the above system further comprises further comprises the converter means 152B for converting the permissible output change value, which has been set by the PTC setting means 152A, to a permissible air volume change per revolution of the engine, whereby the TV open/close limiting means 152C controls the target air volume, which has been set by the TEO realizing means 153C, on the basis of the permissible air volume change obtained as a result of conversion by the converter means 152B. The TV open/close limiting means 152C comprises an intake air volume detection means 152F for detecting the volume of intake air actually taken in the engine per revolution of the engine, and an air volume change limiter 152G for limiting the deviation of the actual intake air volume detected by the intake air volume detection means 152F from the target air volume set by the TEO realizing means 153C to a level not greater than the permissible air volume change obtained as a result of conversion by the converter means 152B and then outputting the thus-limited deviation as a target air change quantity, whereby the engine control quantity required to make a change of the actual intake air volume per revolution of the engine equal to the target air change value is set based on the target air change value outputted from the air volume change limiter 152G.

Further, the TV open/close limiting means 152C sets, as the engine control quantity, the final target air volume obtained by summing the target air change value outputted from the air volume change limiter 152G and the actual intake air volume detected by the intake air volume detection means 152F.

In the above system which controls the output of the engine via the throttle valve 6 of the engine, the TV open/close limiting means 152C sets, as the engine control quantity, the target opening rate of the throttle valve required to actually obtain an engine output equal to the target autocruise engine output set by the engine output setting means 153D.

The system which controls the output of the engine via the throttle valve 6 also comprises the converter means 152B for converting the permissible output change value, which has been set by the PTC setting means, to a permissible air volume change per revolution of the engine, and the TV open/close limiting means 152C comprises the throttle opening rate-air volume converter unit 152D for converting the target opening rate, which has been set by the TEO realizing means 153C, to a target air volume which is an intake air volume per revolution of the engine, the air volume change limiter 152G for limiting the target air volume, which has been obtained as a result of conversion by the throttle opening rate-air volume converter unit 152D, on the basis of the permissible air volume change obtained as a result of conversion by the converter means 152B, and the air volume-throttle opening rate converter unit 152E for setting, as the final target opening rate, an opening rate of the throttle valve required to make the actual intake air volume per revolution of engine equal to the target air volume limited by the air volume change limiter 152G.

In this case, the TV open/close limiting means 152C further comprises the intake air volume detection means 152F for detecting the volume of intake air actually taken in the engine per revolution of the engine, the air volume change limiter 152G limits the deviation of the actual intake air volume detected by the intake air volume detection means 152F from the target air volume obtained as a result of conversion by the throttle opening rate-air volume converter unit 152D to a value not greater than the permissible air volume change obtained as a result of conversion by the converter means 152B, and the air volume-throttle opening rate converter unit 152E determines a final target air volume by summing the target air change value outputted from the air volume change limiter 152G and the actual intake air volume detected by the intake air volume detection means 152F, thereby setting, based on the final target air volume, the final opening rate of the throttle valve required to make the volume of intake air taken in the engine per revolution of the engine equal to the final target air volume.

A description will next be made of a transmission control unit 154. As is depicted in FIG. 9(a), an output signal from the engine revolution number sensor 17a for detecting the revolution number of the engine and an output signal from an accelerator pedal position sensor 15A for detecting, as an accelerator operation state detection means, a stroke (operated state) of the accelerator pedal 15 are inputted to an output torque margin detection means 154A. In the output torque margin detection means 154A, a characteristic showing the relationship between the engine revolution number and the throttle valve position (throttle opening rate) are stored as a map as shown by a solid curve in FIG. 10(b), whereby an area defined using this characteristic as a standard and having no engine output torque margin is set.

Figure 10A:
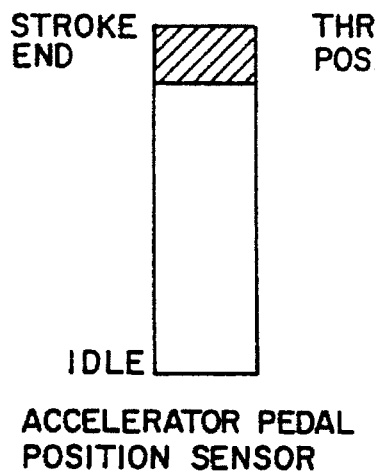

Further, another area for judging from the output of the accelerator position sensor 15A if the accelerator pedal 15 is in a stroke end area is also set as indicated by the hatched area in FIG. 10(a).

A margin signal indicating if there is a margin in the output torque of the engine is inputted to a transmission control means 154B. When there is no margin, the transmission control means 154B outputs a shift-down signal to the automatic transmission 20.

Figure 9B:
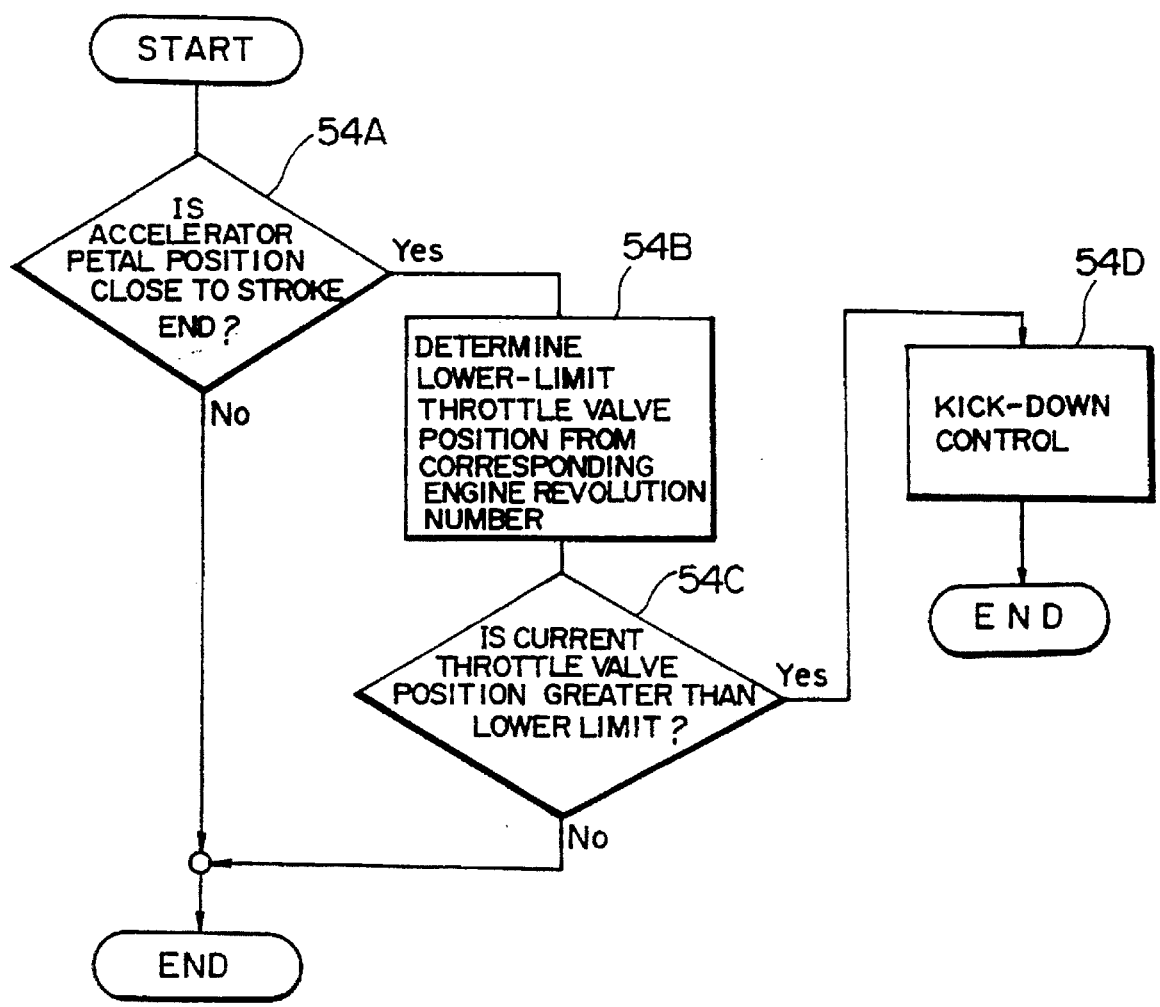
FIG. 9(b) is a flow chart showing the operation of the transmission control unit.

Owing to the construction described above, the transmission control unit 154 operates following the flow chart shown in FIG. 9(b).

Namely, the accelerator pedal 15 is treadled to the stroke end area out of the areas preset in FIG. 10(a) and, by the output torque margin detection means 154A, it is judged if the driver is demanding high acceleration (step 54A).

Figure 10B:
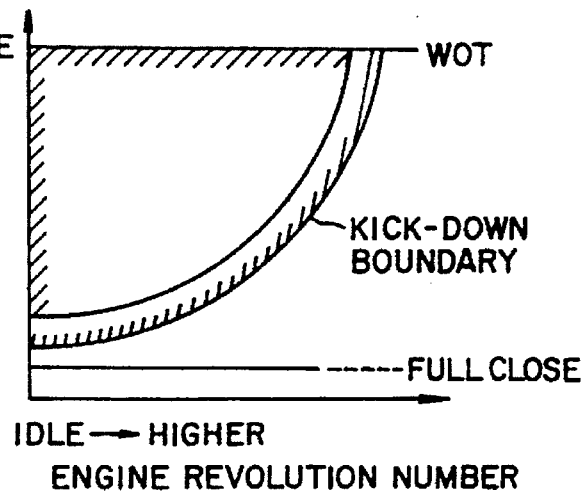

If the accelerator pedal 15 is located in the stroke end area, it is judged if an engine operation state, which is determined from the engine revolution number Ne and the position of the throttle valve 6, is located within the area set in FIG. 10(b).

Namely, in the hatched area of the map, a lower-limit throttle valve position corresponding to the engine revolution number Ne is read (step 54B), whereby it is judged if the current throttle valve position detected by the throttle valve position sensor 8 is greater (i.e., is treadled more) than the lower-limit throttle valve position so read (step 54C).

If the result of the above judgment is YES, the output torque margin detection means 154A is judged to show the state that there is no margin in the engine output although there is an acceleration demand of at least a predetermined level. Accordingly, a shift-down signal is outputted to the transmission 20 via the transmission control means 154B (step 54D). As a result, shift-down control (kick-down control) is performed by the transmission 20 so that acceleration of the vehicle is effected fully.

As has been described above, kick-down control can also be carried out fully in a DBW vehicle. Namely, kick-down control can be conducted effectively even in control such that the stroke of the accelerator pedal and the open/closure of the throttle valve 6 do not correspond directly in a DBW vehicle in which there is no mechanical interconnection between the throttle valve 6 and the accelerator pedal 15. The shift-down is conducted automatically so that driving can be facilitated.

The above-described margin of the engine output torque was judged from the throttle valve opening rate θ and the engine revolution number Ne. It is possible to use the air volume per revolution of engine (A/N) instead of the throttle valve opening rate Δ. As a further alternative, the judgment can also be made using the fuel volume per revolution of the engine (A/N). As a still further alternative, the judgment can also be conducted using the fuel volume per revolution of the engine (F/N). In these cases, it is judged from a graph similar to the graph of FIG. 10(b) except for plotting of A/N or F/N along the axis of abscissas if there is a margin in the engine output upon kickdown.

Figure 14:
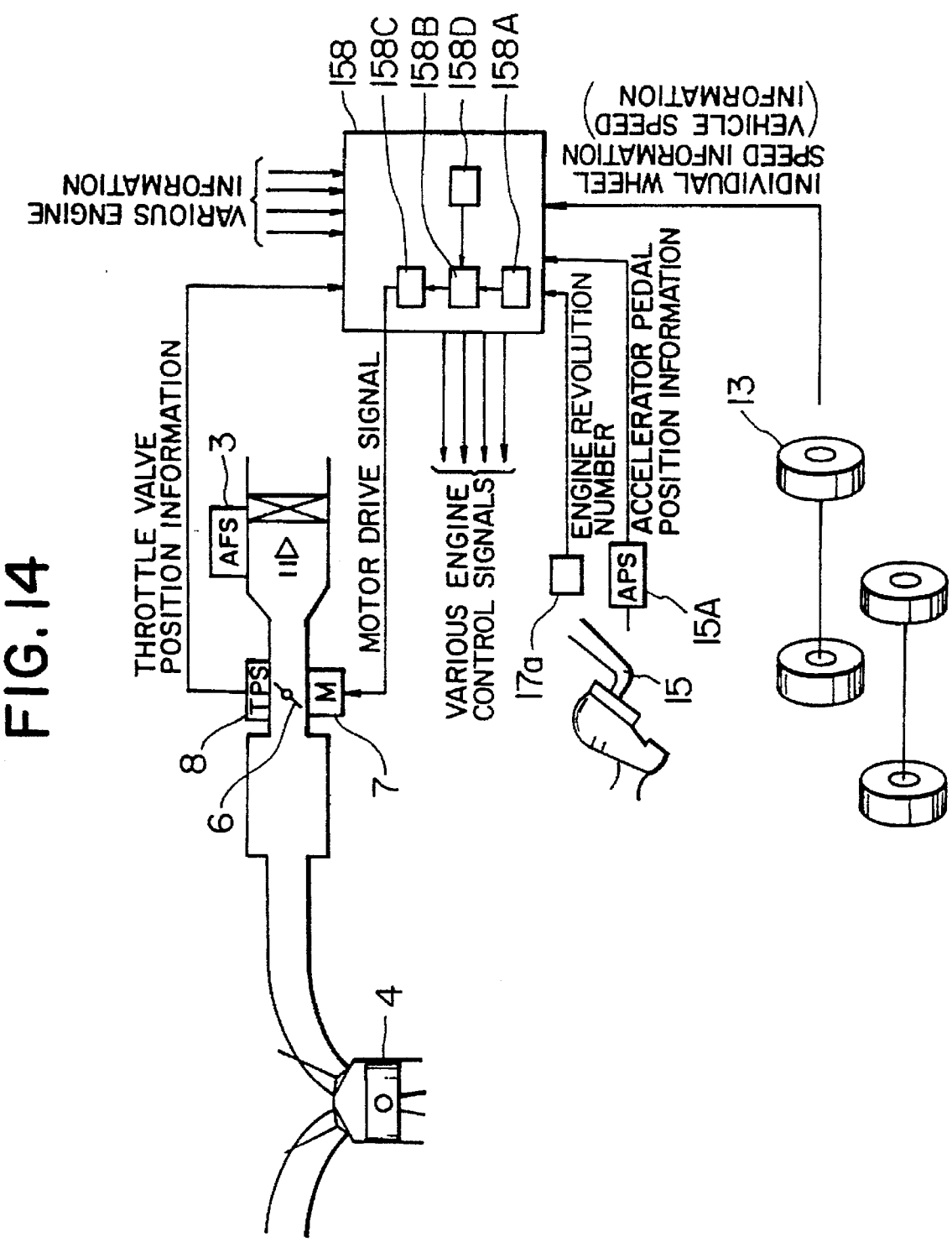

An acceleration shock prevention control unit (hereinafter referred to as the "AS prevention control unit") 158 will next be described. As is illustrated in FIG. 14, the state of treadling of the accelerator pedal 15 is detected by an accelerator pedal position sensor (APS) 15A. A detection signal from the accelerator pedal position sensor 15A is then inputted to the AS prevention control unit 158.

The AS prevention control unit 158 is provided with an acceleration demand detection means 158A which detects an acceleration demand of the driver upon receipt of the output signal from the accelerator pedal position sensor 15A. The AS prevention control unit 158 is also provided with a condition determining means 158D adapted to determine a limit operation condition for the engine. The condition determining means 158D serves to determine an engine operation range which does not cause acceleration shock, and the condition determining means 158D is equipped with a map corresponding to the characteristics depicted in FIGS. 16(a) and 16(b).

An acceleration limiting unit 158B is also provided. The acceleration limiting unit 158 is inputted with a target acceleration demand signal from the acceleration demand detection means 158A and also with a limit operation condition for the engine from the condition determining means 158D. The acceleration limiting unit 158B is designed to output a limit signal upon input of an acceleration demand exceeding the limit operation condition.

The limit signal and target acceleration demand signal are inputted to a control means 158C, whereby the throttle valve 6 is controlled by the control means 158C by way of the motor 7.

Figure 15:
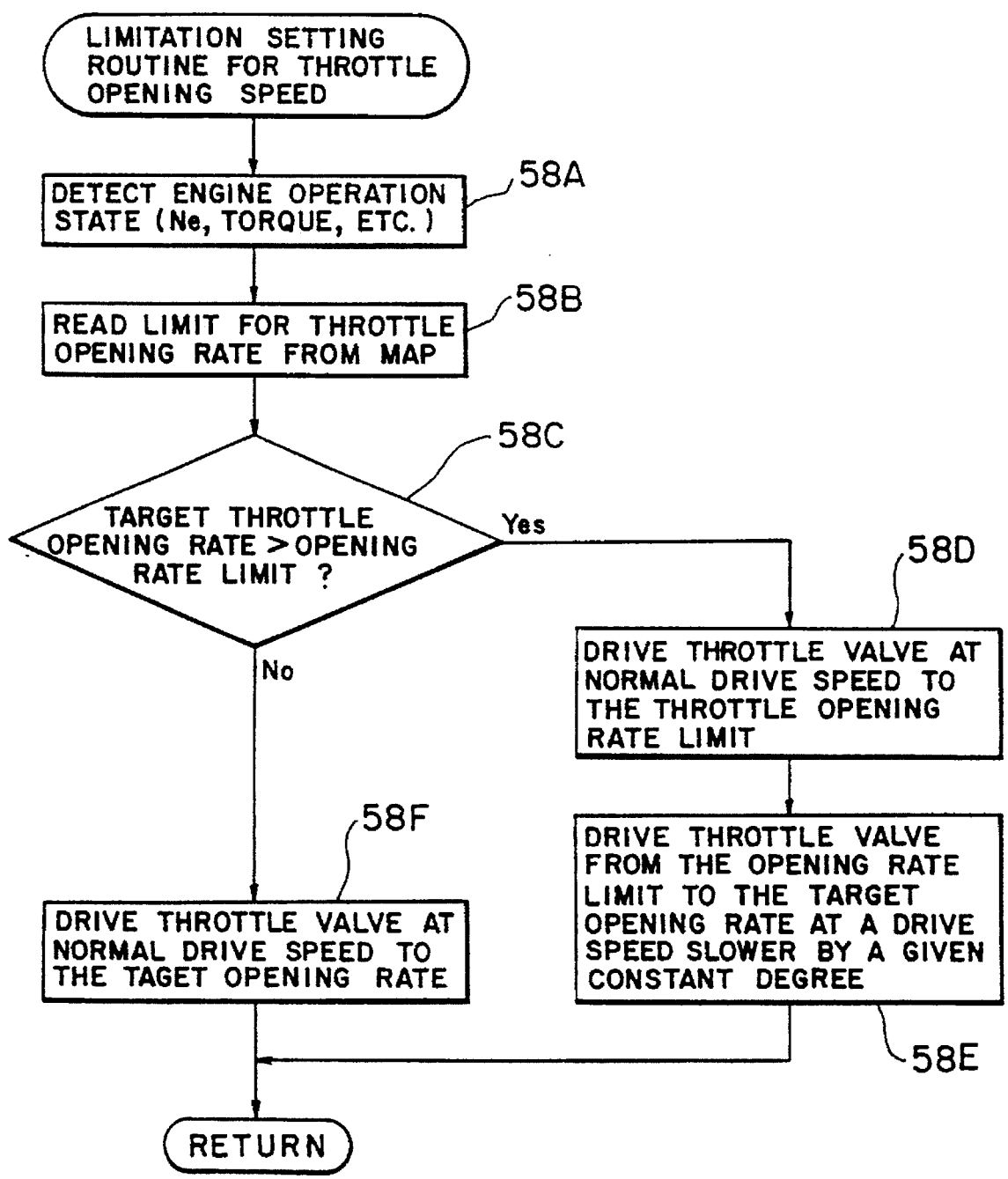

Owing to the construction described above, control is conducted by the AS prevention control unit 158, following the flow chart of FIG. 15.

First, based on outputs from various sensors, the operation state of the engine is detected by the condition determining means 158D (step 58A).

Figure 16A:
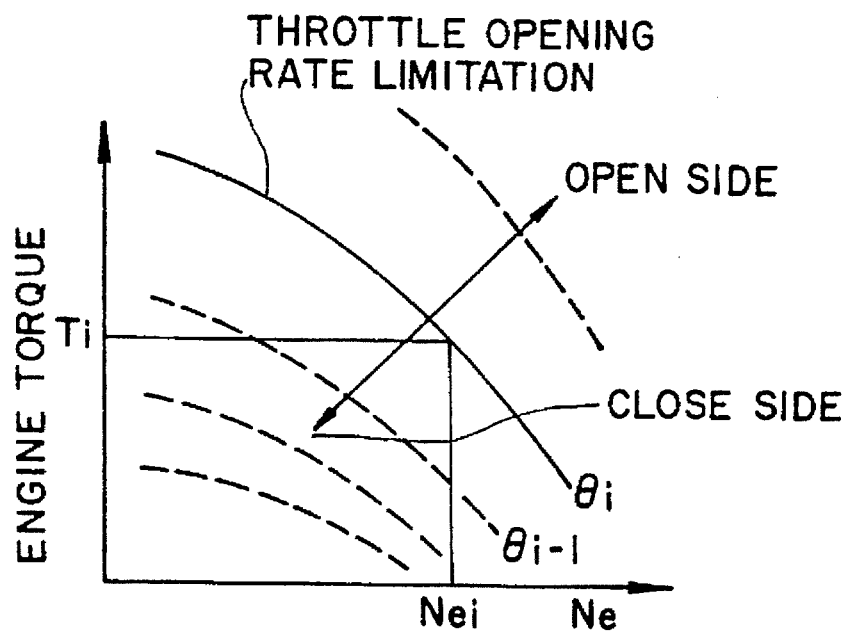

A limit to the throttle opening rate is then determined as a limit operation condition from the map of the characteristics shown in FIG. 16(a) (step 58B). Namely, for example, using a characteristic curve on which crossing points of engine revolution numbers Nei detected by the revolution number sensor 17a and detected engine torques Ti exist, i.e., the characteristic curve indicated by the solid curve in this example, a limit throttle opening rate θi is determined and is then outputted to the acceleration limiting unit 158B.

As a result of the input of the state of treadling of the accelerator pedal 15 detected by the accelerator pedal position sensor 15A to the acceleration demand detection means 158A, the target acceleration demand torque demanded by the driver is detected. The target acceleration demand torque is converted to a target throttle opening rate and is transmitted to the acceleration limiting unit 158B.

By the acceleration limiting unit 158B, it is judged if the target throttle opening rate is greater than the limit throttle opening rate θi as the opening rate limit (step 58C). If greater, the limit signal is transmitted to the control means 158C.

The control means 158C outputs a control signal to the throttle valve 6 via the motor 7 so that the throttle valve 6 is driven at a usual drive speed to the opening rate limit θi (step 58D). For a throttle valve opening rate (an opening rate greater than the limit θi) corresponding to the limit signal so transmitted, a control signal is outputted to drive the throttle valve at a drive speed slower by a predetermined percentage than the usual drive speed (step 58E).

Where the target throttle opening rate is smaller than or equal to the opening rate limit, the acceleration limiting unit 158B outputs a control signal to the control means 158C in order to have the throttle valve driven at the usual speed up to the target throttle opening rate (step 58F).

Figure 16B:
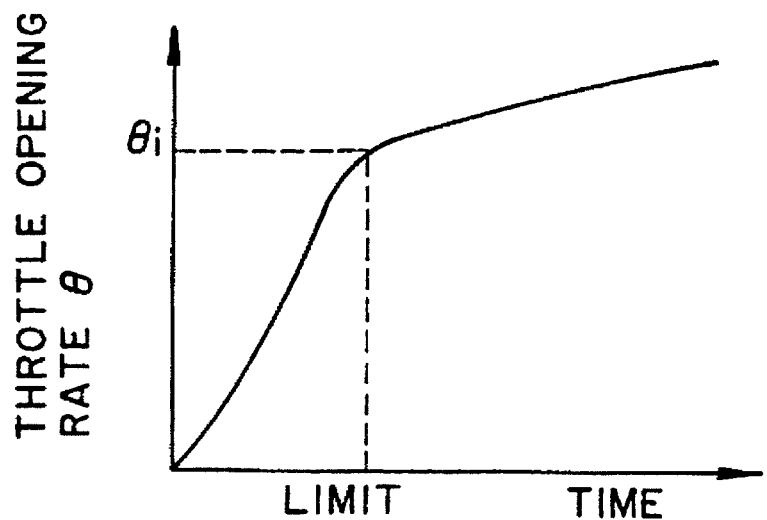

Incidentally, the above operation is represented by the relationship between throttle valve opening rate and time, said relationship being illustrated in FIG. 16(b). Up to the limit operation condition (opening rate: θi), the opening of the throttle valve is carried out at a maximum drive speed owing to an unconditional opening rate increase. Accordingly, quick-response starting acceleration is conducted and, in the subsequent acceleration range where acceleration shock tends to occur, running is performed under shock-free limit acceleration conditions.

The determination of the above-described limit operation condition for not causing acceleration shock relies upon a prescribed engine output torque for a given engine revolution number as shown in FIG. 16(a). This can also be done under the following conditions for determination:

(1) Prescribed A/N for a given engine revolution number.
(2) Prescribed negative pressure in an intake tube for a given engine revolution number.
(3) Prescribed fuel injection rate for a given engine revolution number.
(4) Prescribed throttle opening rate irrespective of the state of operation.

The control output from the AS prevention control unit 158 follows a prescribed order of preference in relation to outputs by other controls performed in parallel with the present control and also a mode set by the driver, and is outputted to the throttle valve 6.

As an alternative, the control output from the AC prevention control unit 158 may be used as an effective output only when its application is limited to acceleration of the automotive vehicle from idling or to its acceleration from the first gear position.

It is also possible to make the opening speed of the throttle valve under an operation condition not reaching the limit operation condition correspond to the operation speed of the accelerator pedal by the driver or to make it equal to the maximum drive speed.

In this manner, uncomfortable shock can be prevented to ensure smooth acceleration even if the operation of the accelerator pedal by the driver is not suitable.

Such advantageous effects as described above can be achieved only by modifications in the software, thereby making it possible to achieve improvements at a low cost.

A description will next be made of a vehicle-running-state-associated mode change-over control unit (hereinafter referred to as the "VRS-associated mode change-over control unit") 156. As is shown in FIG. 17, the VRS-associated mode change-over control unit 156 is designed such that a throttle valve open/close control signal is outputted upon input of a stroke of the accelerator pedal 15 to the VRS-associated mode change-over control unit 156 via the accelerator pedal position sensor 15A. The VRS-associated mode change-over control unit 156 is provided with a mode change-over means 156A, a running state detection means 156B and a throttle valve control means 156C.

The mode change-over means 156A has two setting modes, one being a normal mode and the other an economy mode. The mode change-over means 156A is designed to calculate throttle opening rates corresponding to the individual modes in relation to the stroke of the accelerator pedal 15. In the normal mode, for a stroke of the accelerator pedal 15, the throttle opening rate as demanded by the driver or a relatively large throttle opening rate placing importance on the output characteristics of the engine is set.

In the economy mode on the other hand, for a stroke of the accelerator pedal 15, an opening rate smaller than that demanded by the driver or a relatively slow throttle opening speed is set so that the engine can be operated in a good fuel-consumption range.

The throttle valve control means 156C is designed to output a control signal such that the target throttle valve opening rate so inputted can be realized.

Figure 19A:
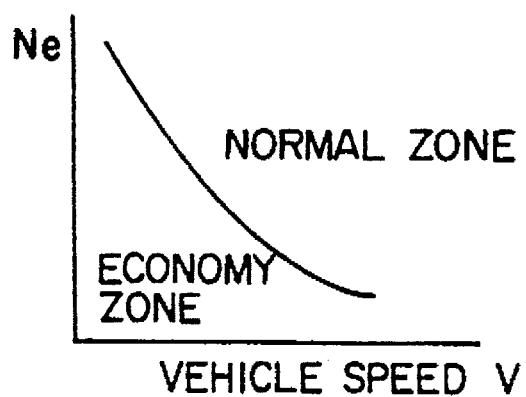

On the other hand, vehicle speed information detected by a still further control unit and an output signal from the engine revolution number sensor 17a are inputted to the running state detection means 156B so that the running state of the vehicle can be detected. The running state detection means 156B is also designed to output a change-over signal to the mode change-over means 156A, depending on the running state. Namely, the characteristic map shown in FIG. 19(a) is stored, whereby it is determined by the vehicle speed V and the engine revolution number Ne whether the running state of the vehicle is in the normal mode range or in the economy mode range.

Figure 19B:
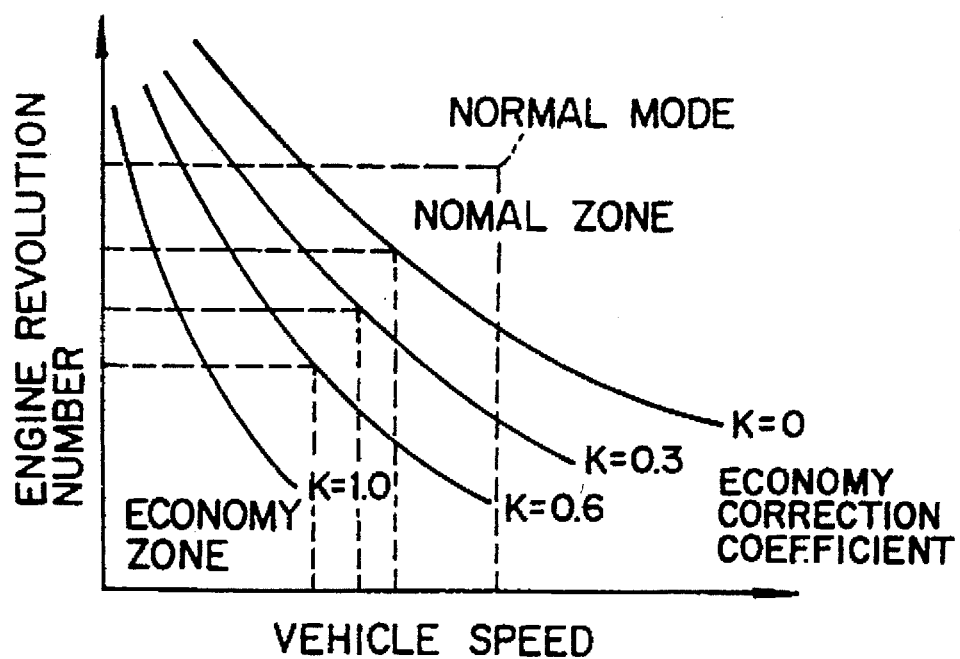

In addition to the normal mode and economy mode, plural intermediate modes can be added as shown in FIG. 19(b). The running state detection means 156B can then be designed to permit automated selection of the most suitable mode from these plural modes.

Figure 18:
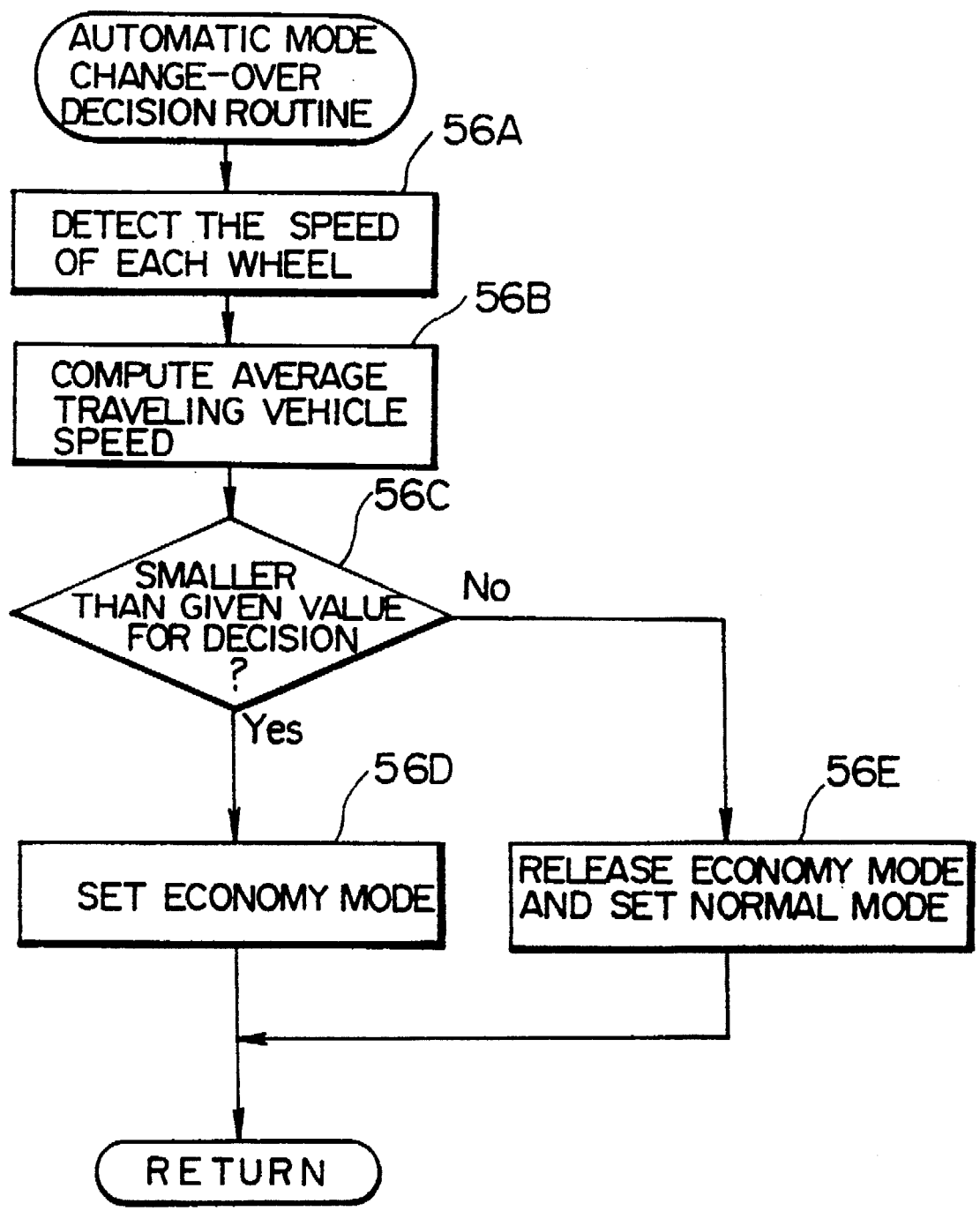

Owing to the construction described above, the VRS-associated mode change-over control unit 156 operates following the flow chart shown in FIG. 18.

Namely, the speeds of respective wheels are detected by their corresponding wheel speed sensors 13a,13b,13c,13c (step 56A). By the running state detection means 156B, an average moving vehicle speed V is calculated from the speeds of the respective wheels (step 56B).

By the engine revolution sensor 17a, it is judged based on the detected revolution number Ne and the above-calculated vehicle speed V and using the map shown in FIG. 19(a) if the vehicle speed V is lower than a predetermined value for judgment (step 56C), whereby it is determined whether the running state of the vehicle is in the normal range or in the economy range. The change-over signal selected depending on whether the running state of the vehicle is in the normal range or in the economy range is outputted to the mode change-over means 156A.

Upon receipt of the change-over signal described above, the mode change-over means 156A decides whether the economy mode should be set (step 56D) or the economy mode is canceled in favor of setting of the normal mode (step 56E).

By the mode change-over means 156A, a correction is performed to the either one of the modes determined as described above and, in accordance with the correlation map between the state of treadling of the accelerator pedal 15 and the opening rate of the throttle valve, a target throttle valve opening rate corresponding to the output signal from the accelerator pedal position sensor 15A is determined. This target throttle valve opening rate is then outputted to the throttle valve control means 156C.

As a result, the throttle valve 6 is subjected to open/close control via the motor 7 in the mode automatically selected corresponding to the running state of the vehicle.

In this manner, the failure of Change-over from the economy mode to the normal mode, said failure having occurred to date, can be eliminated, thereby making it possible to avoid such a problem that the vehicle is driven in a state not possible to obtain a desired output or under poor fuel consumption. The operational ease for the driver and the running performance of the vehicle can therefore be improved as advantages.

If such intermediate modes as shown in FIG. 19(b) are provided, an economy correction coefficient K is determined in relation to the vehicle speed V and the engine revolution number Ne. This correction coefficient K ranges form 0 (inclusive) to 1 (inclusive) [$0 \leq K \leq 1$]. The normal mode is selected at K=0, whereas the economy mode is chosen at K=1. Using this K, computation of the target throttle opening rate is conducted in accordance with the following formula:

Throttle opening rate=$f$−$K$·$g$ where f: function of the opening rate of the accelerator pedal in the normal mode;

g: function of the opening rate of the accelerator pedal in the economy mode; and K: economy correction coefficient.

By achieving this throttle opening rate, an intermediate mode corresponding to the running state can be realized.

By the above-described running state detection means 156B, it is judged to perform a mode change-over or not depending on whether the state of operation at the average moving vehicle speed V of the vehicle is at least equal to the prescribed engine revolution number Ne as shown in FIGS. 19(a) and 19(b). This can also be carried out in accordance with the following mode change-over judgment conditions:

(1) Average vehicle speed during a predetermined time period as determined from wheel speed information.

(2) Maximum vehicle speed during a predetermined time period as determined from wheel speed information.

(3) Average vehicle body acceleration during a predetermined time period as determined from wheel speed information.

(4) Maximum vehicle body acceleration during a predetermined time period as determined from wheel speed information.

(5) Average engine revolution number during a predetermined time period as determined from engine revolution number information.

(6) Maximum engine revolution number during a predetermined time period as determined from engine revolution number information.

(7) Average increase rate of engine revolution number during a predetermined time period as determined from engine revolution number information.

(8) Maximum increase rate of engine revolution number during a predetermined time period as determined from engine revolution number information.

(9) Average vehicle body speed and average engine revolution number.

The mode is switched to the economy mode when the vehicle speed, acceleration, engine revolution number or the like is low or small in the conditions (1)–(9). If high or great, the mode is switched to the normal mode.

Automated change-over is conducted between the normal mode and the economy mode or vice versa in the present embodiment. As a modification, a mode change-over switch 156D can be provided to choose an auto mode in which automated mode change-over is performed or a manual mode in which mode change-over is performed by the driver. Automated mode change-over is therefore conducted only when the mode change-over switch 156D is in the auto mode.

Figure 20:
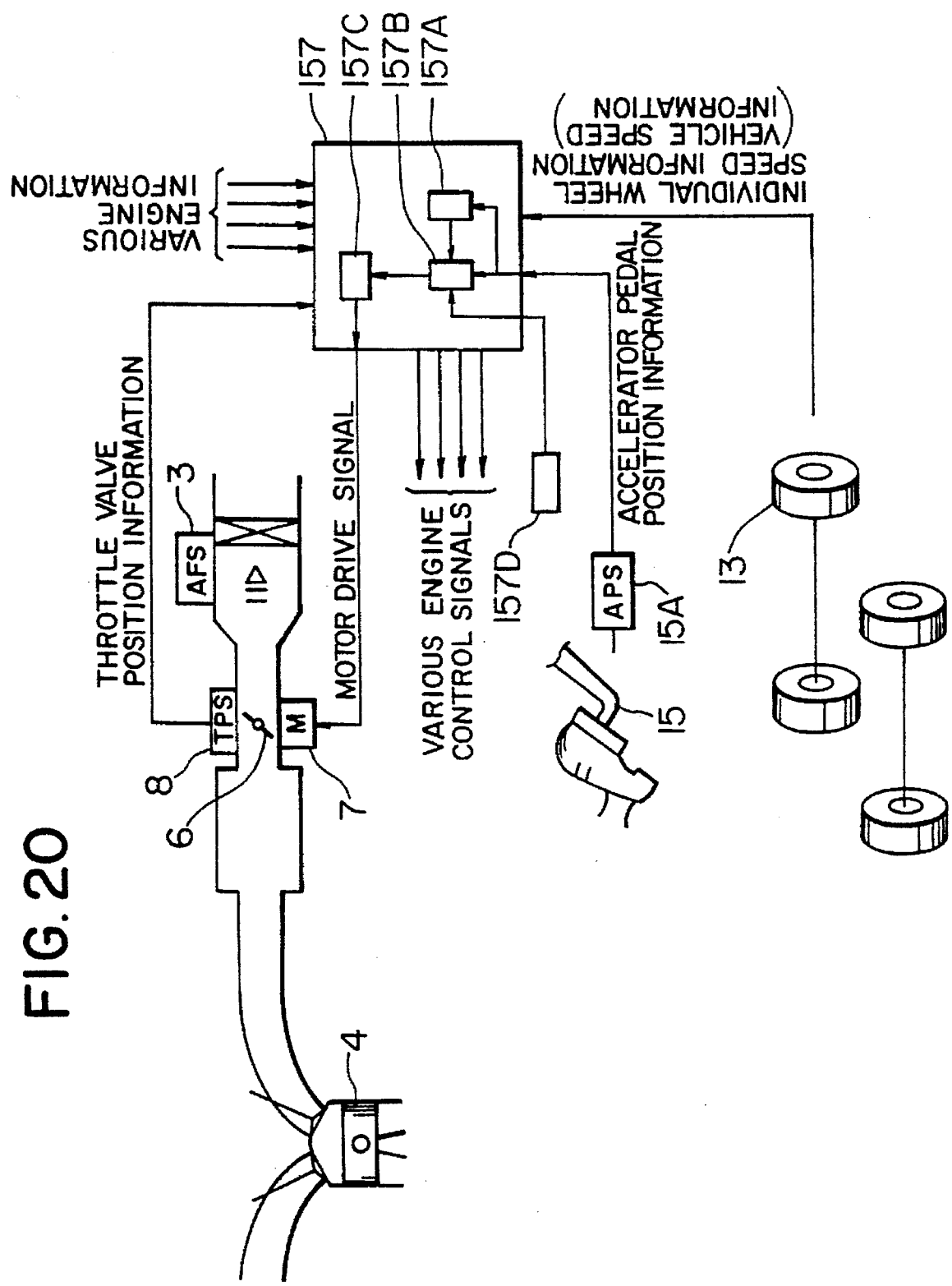

A description will next be made of an accelerator-pedal-associated mode change-over control unit (hereinafter referred to as the "AP-associated mode change-over control unit") 157. As is illustrated in FIG. 20, the AP-associated mode change-over control unit 157 is designed such that a stroke of the accelerator pedal 15 is inputted to the AP-associated mode change-over control unit 157 via the accelerator pedal position sensor 15A to output a throttle valve open/close signal. The AP-associated mode change-over control unit 157 is provided with a mode change-over means 157B, an engine ability demand, detection means 157A and a throttle valve control means 157C.

The mode change-over means 157B has two setting modes, one being a normal mode and the other an economy mode. The mode change-over means 157B is designed to calculate throttle opening rates corresponding to the individual modes in relation to the stroke of the accelerator pedal 15.

In the normal mode, for a stroke of the accelerator pedal 15, the throttle opening rate as demanded by the driver or a relatively large throttle opening rate placing importance on the output characteristics of the engine is set.

In the economy mode on the other hand, for a stroke of the accelerator pedal 15, an opening rate smaller than that demanded by the driver or a relatively slow throttle opening speed is set so that the engine can be operated in a good fuel-consumption range.

The throttle valve control means 157C is designed to output a control signal such that the target throttle valve opening rate so inputted can be realized.

On the other hand, an output signal from the accelerator pedal position sensor 15A is inputted to the engine ability demand detection means 157A so that the engine ability demand by the driver can be detected. The engine ability demand detection means 157A is also designed to output a change-over signal to the mode change-over means 157B, depending on the demand.

Figure 21A:
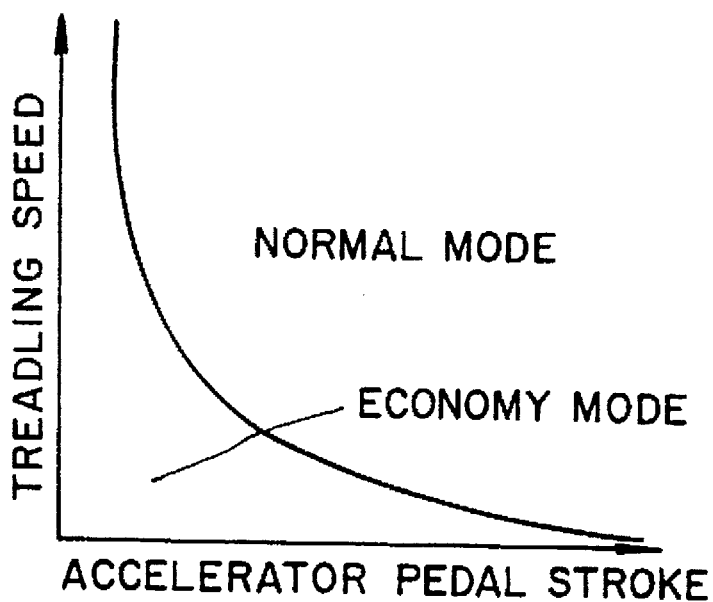
FIGS. 21(a) and 21(b) are diagrammatic representations showing characteristics of the mode change-over control unit.

Namely, the characteristic map shown in FIG. 21(a) is stored, whereby it is determined by the stroke and treadling speed of the accelerator pedal 15 which one of the normal mode range and the economy mode range should be selected.

Figure 21B:
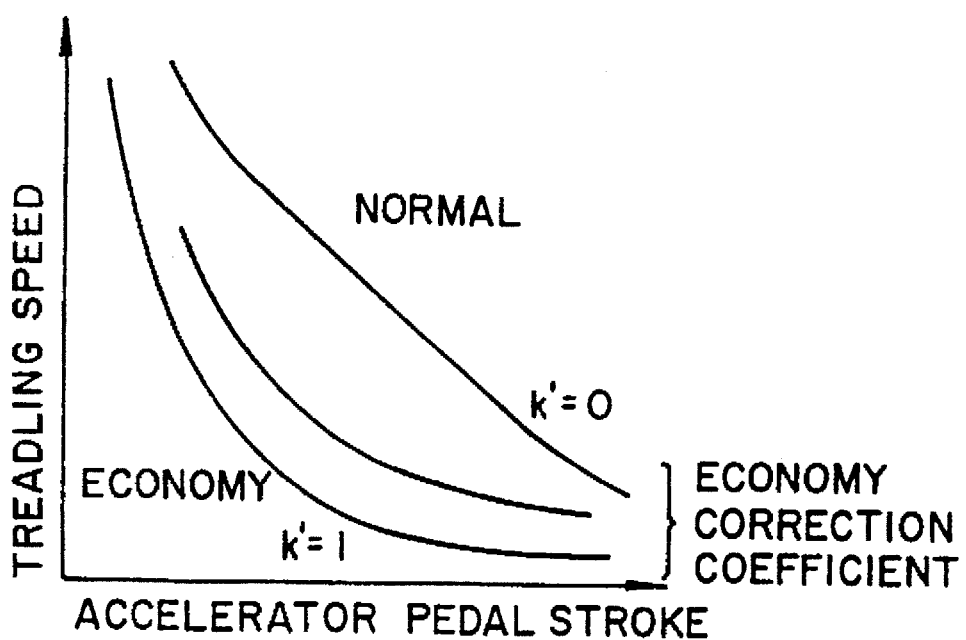

In addition to the normal mode and economy mode, plural intermediate modes can be added as shown in FIG. 21(b). The engine ability demand detection means 157A can be designed to permit automated selection of the most suitable mode from these plural modes.

Figure 22:
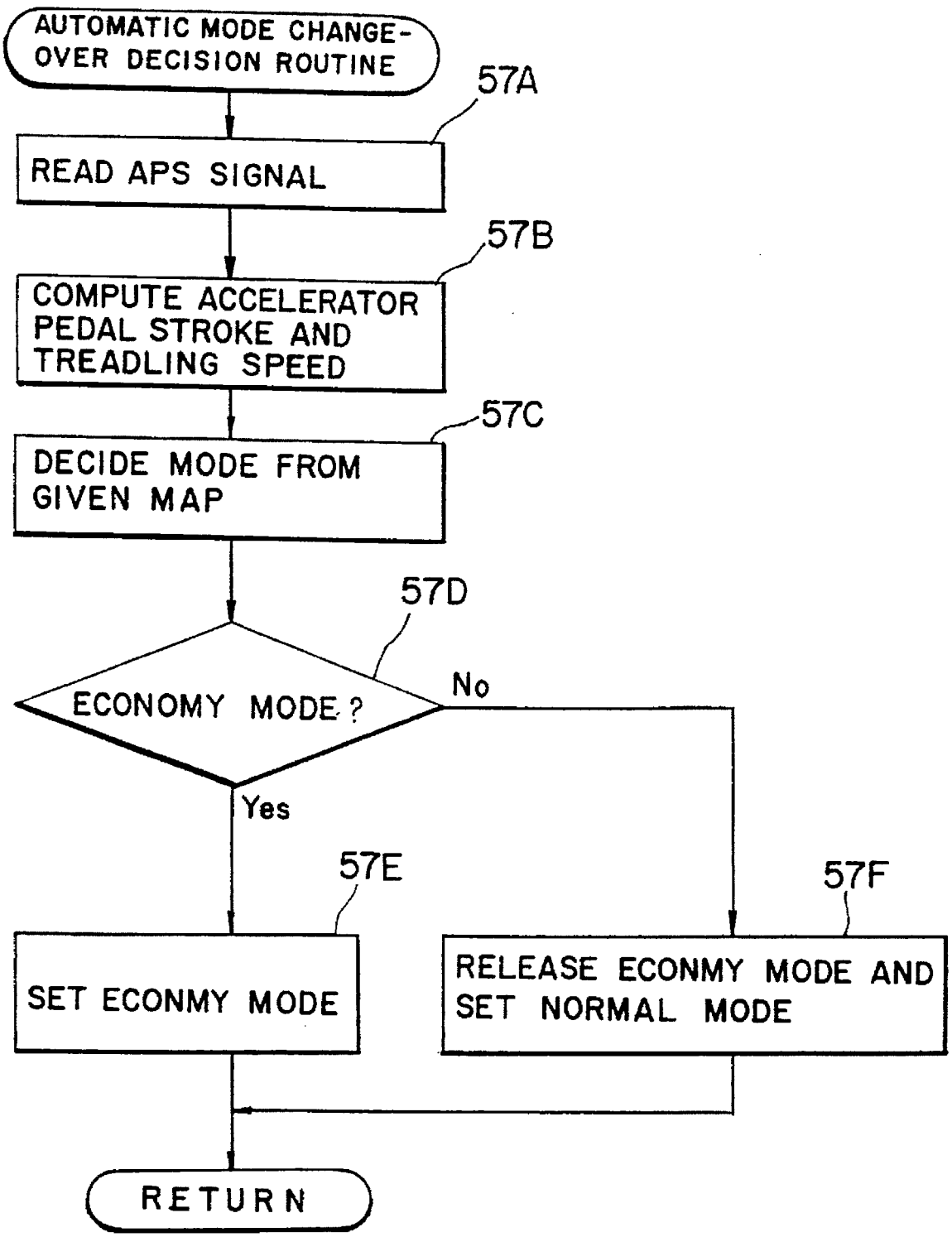

Owing to the construction described above, the AP-associated mode change-over control unit 157 operates following the flow chart shown in FIG. 22.

Namely, the position of the accelerator pedal 15 is detected by the accelerator pedal position sensor 15A (step 57A), and the stroke and treadling speed of the accelerator pedal 15 are computed by the engine ability demand detection means 157A (step 57B).

Then, in accordance with the map of the characteristics shown in FIG. 21(a), either a normal mode range or an economy mode rage is automatically selected corresponding to the stroke and treadling speed of the accelerator pedal 15.

As a result, the mode corresponding to the engine ability demand by the driver is automatically selected and control is then performed under the mode so-selected.

Namely, a change-over signal to the mode so selected is outputted to the mode change-over means 157B. Upon receipt of the change-over signal, the mode change-over means 157B sets the economy mode (step 57E) or cancels the economy mode in favor of setting of the normal mode (step 57F).

At the mode change-over means 157B, by a correlation map between the state of treadling of the accelerator pedal 15 in the mode determined as described above and the opening rate of the throttle valve, a target throttle valve opening rate corresponding to the output signal from the accelerator pedal position sensor 15A is determined. This target throttle valve opening rate is then outputted to the throttle valve control means 157C.

As a result, the throttle valve 6 is subjected to open/close control via the motor 7 in the mode automatically selected corresponding to the demand of the driver.

In this manner, the failure of change-over from the economy mode to the normal mode, said failure having occurred to date, can be eliminated, thereby making it possible to avoid such a problem that the vehicle is driven in a state not possible to obtain a desired output or under poor fuel consumption. The operational ease for the driver and the running performance of the vehicle can therefore be improved as advantages.

By the engine ability demand detection means 157A, it is detected which one of the two mode is demanded, namely, whether the normal mode or the economy mode is demanded. If such intermediate modes as shown in FIG. 21(b) are provided, an economy correction coefficient K' is determined in relation to the stroke and treadling speed of the accelerator pedal 15. This correction coefficient K' ranges form 0 (inclusive) to 1 (inclusive) [$0 \leq K' \leq 1$]. The normal mode is selected at K'=0, whereas the economy mode is chosen at K'=1.

This correction coefficient K' is outputted to the mode change-over means 157B and computation of the target throttle opening rate is conducted in accordance with the following formula:

$$\text{Throttle opening rate} = f' - K' \cdot g'$$

where

K': correction coefficient;

f',g': throttle opening rates determined in accordance with function of the stroke or treadling speed of the accelerator pedal, f' corresponds to the normal mode, and g' corresponds to the economy mode.

By achieving this throttle opening rate, an intermediate mode demanded by the driver can be realized.

By the above-described engine ability demand detection means 157A, judgment of mode change-over is performed depending on whether or not the treadling speed of the accelerator pedal 15 is at least equal to a predetermined value for a given stroke of the accelerator pedal 15. Judgment of a mode can also be carried out by detecting the driver's engine ability demand in accordance with the following mode change-over judgment conditions:

(1) Treadling speed of the accelerator pedal 15 as determined from an output from the accelerator pedal position sensor 15A.

(2) Average treadling speed of the accelerator pedal during a predetermined time period.

(3) Stroke of the accelerator pedal 15 as determined from an output from the accelerator pedal position sensor 15A.

(4) Average stroke of the accelerator pedal 15 as determined from an output from the accelerator position sensor 15.

The mode is switched to the economy mode when the treadling speed, stroke or the like is low or small in the conditions (1)–(4). If high or great, the mode is switched to the normal mode.

It is also possible to design such that the mode is switched to the normal mode when the treadling speed of the accelerator pedal 15 is equal to or greater than a predetermined value under predetermined engine operation conditions such as at a predetermined engine rotation number or the like or to the economy mode when the treadling speed is smaller.

Automated change-over is conducted between the normal mode and the economy mode or vice versa in the present embodiment. As a modification, a mode change-over switch 157D can be provided to choose an auto mode in which automated mode change-over is performed or a manual mode in which mode change-over is performed by the driver. Automated mode change-over is therefore conducted only when the mode change-over switch 157D is in the auto mode.

Figure 23:
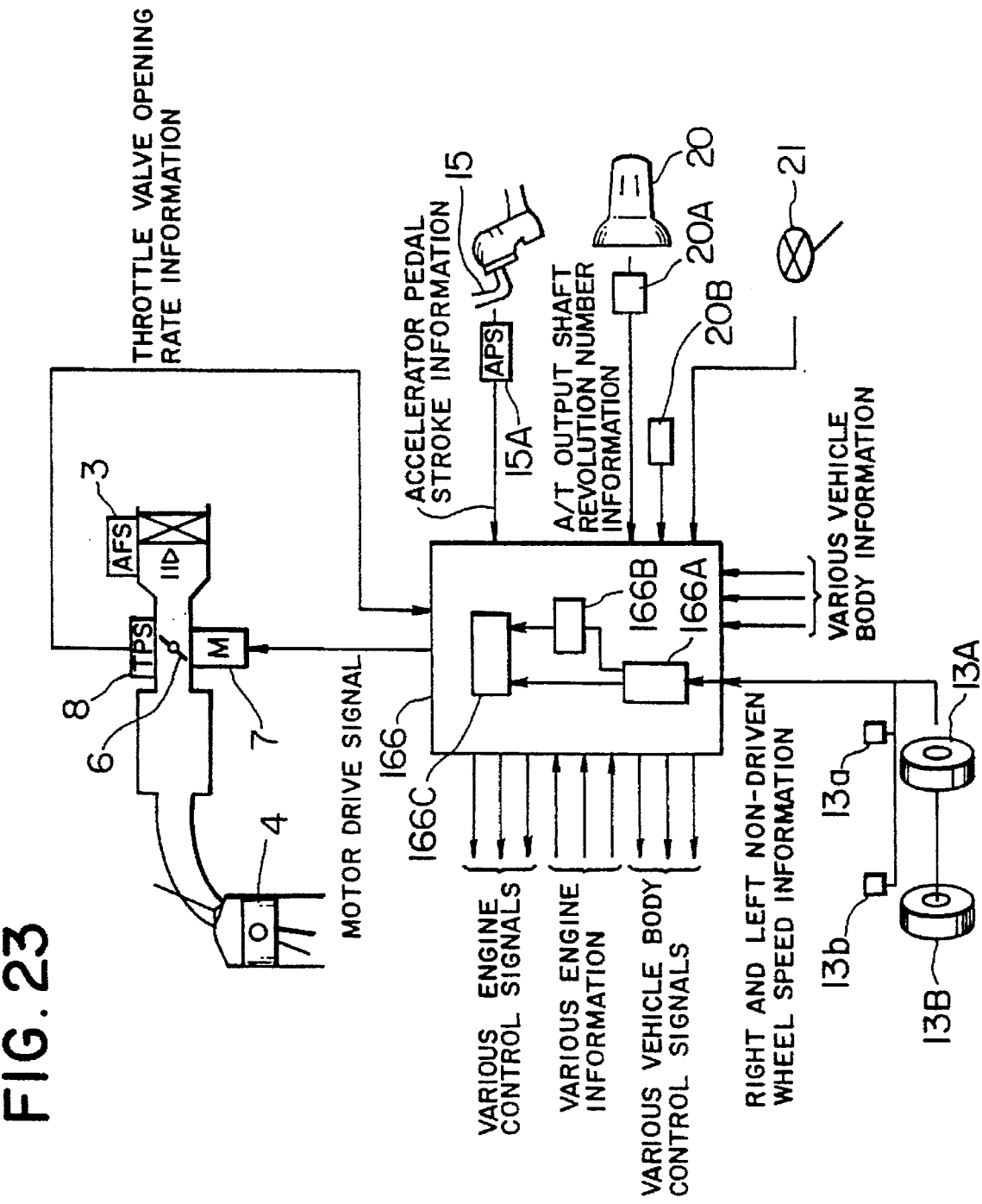

A description will next be made of a vehicle body speed detection compensation control unit 166. As is illustrated in FIG. 23, non-driven wheel speed sensors 13a,13b applied to left and right non-driven wheels 13A,13B, respectively, are connected to the vehicle body speed detection compensating control unit 166 to transmit output signals of the speed sensors 13a,13b to the control unit 166. The control unit 166 is provided with a failure detection means 166A, a compensation control means 166B and a running control unit 166C.

The failure detection means 166A is designed to always monitor the outputs of the non-driven wheel speed sensors 13a,13b so that they can detect failure, for example, by relying upon any output outside a normal range or absence of any change in the output for a predetermined time or longer. The failure detection means 166A therefore identifies any failed sensor and outputs a failure signal.

The compensation control means 166B is designed such that it receives a failure signal from the failure detection means 166A and compensates information from the failed non-driven wheel speed sensor 13a or 13b in accordance with a correction by an output signal from another sensor.

If either one of the non-driven wheel speed sensors 13a,13b should fail, a turning correction is applied by a steering operation angle detected by a steering angle sensor 121 to an output signal from the remaining non-driven wheel speed sensor 13a(13b) so that a vehicle speed V is obtained and outputted.

If both the non-driven wheel speed sensors 13a,13b should fail, an output signal from an output shaft revolution number sensor 20A of an automatic transmission 20 is corrected depending on the gear shift position and is then outputted as a simulated vehicle body speed.

The running control unit 166C is designed to perform automatic speed control (ASC). The control is conducted using the vehicle speed V which is obtained from the output signals of the wheel speed sensors 13a,13b.

Further, the running control unit 166C also receives sensor failure information from the failure detection means 166A and a simulated vehicle body speed signal outputted from the compensation control means 166B besides the signals outputted from the wheel speed sensors 13a,13b, whereby the running control unit 166C is continuously allowed to operate even during failure of the wheel speed sensors 13a,13b.

Figure 24:
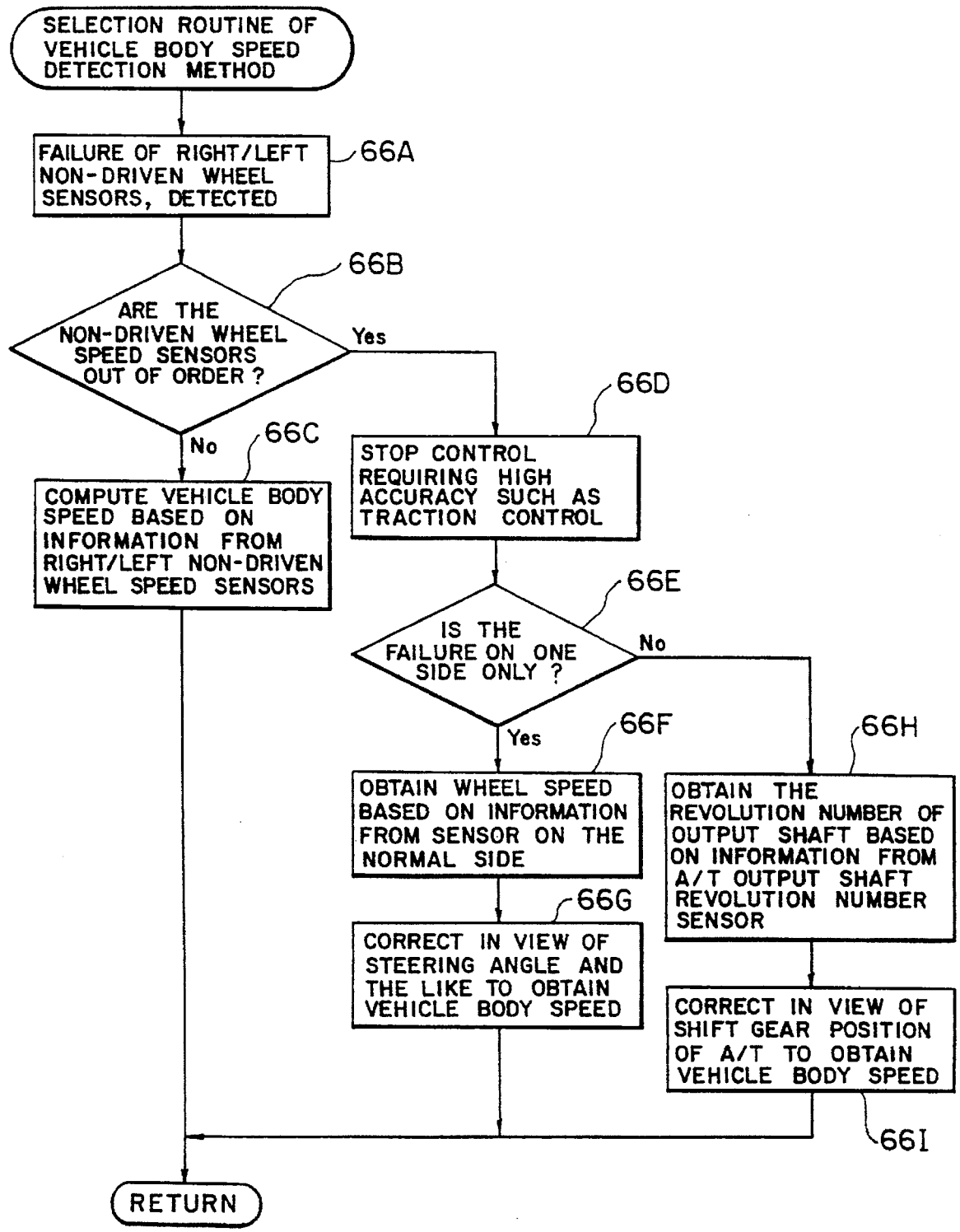

Owing to the construction described above, the vehicle speed detection compensation control unit 166 operates following the flow chart shown in FIG. 24.

When the failure detection means 166A detects failure of the lift and right non-driven wheel speed sensors 13a,13b (steps 66A,66B), the compensation control means 116B outputs a suspension signal to the running control unit 166C so that any control requiring a highly-accurate vehicle speed such as traction control is suspended (step 66D).

By the compensation control means 166B, it is judged if only one of the non-driven wheel speeds sensors 13a,13b has failed (step 66E). If so, a non-driven wheel speed on the fail-free side is compensated by a detection signal from the steering angle sensor 121 which serves to detect the steering angle of the steering so that a vehicle speed is obtained (steps 66F,66G). This vehicle speed is then outputted to the running control unit 166C whereby various running controls are continued.

If the non-driven wheel speed sensors 13a,13b on the both sides have failed, a detection signal is received from the output shaft revolution number sensor 20A of the automatic transmission 20 (step 66H) and information on the gear shift position of the automatic transmission 20 is also inputted in the form of an output signal from the shift position sensor 20B of the automatic transmission 20. A simulated vehicle speed is hence computed and then outputted to the running control unit 166C.

As a result, even if the non-driven wheel speed sensors 13a,13b should fail, the automatic speed (cruise) control (ASC) by the running control unit 166C is continued.

Figure 25:
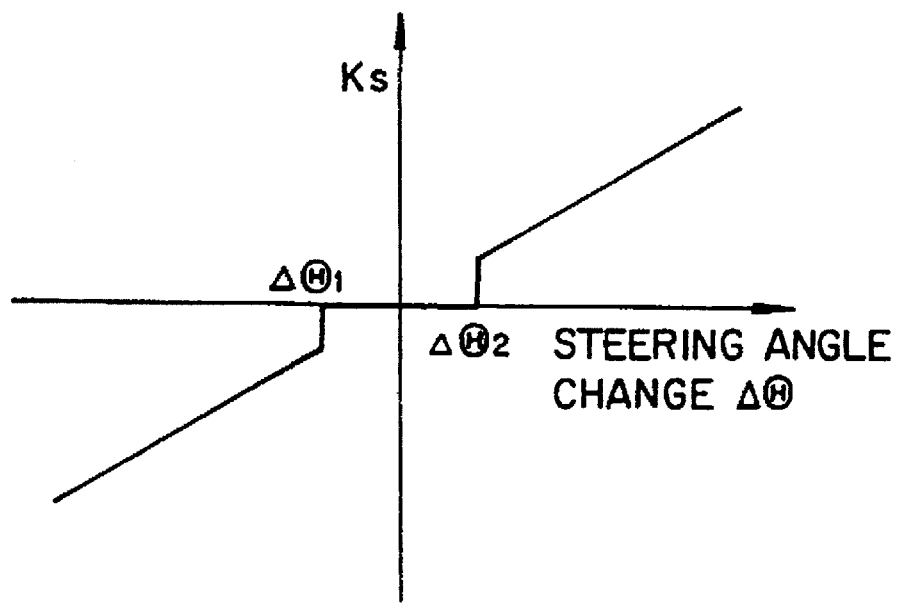

The above-described compensation of the non-driven wheel speed by the steering angle is conducted using a compensation coefficient Ks shown in FIG. 25. The compensation coefficient Ks increases in the form of a first-degree function relative to the steering angle change $\Delta\Theta$ as shown in the drawing. However, Ks =0 in the steering angle change range of from $\Delta\Theta_1$ to $\Delta\Theta_2$. This range is taken as a dead zone so that no compensation is conducted there to ensure stable drivability.

The vehicle speed can be accurately detected as described above even during failure of the non-driven wheel sensor(s), thereby bringing about the advantage that suspension of the control system can be avoided.

Figure 26:
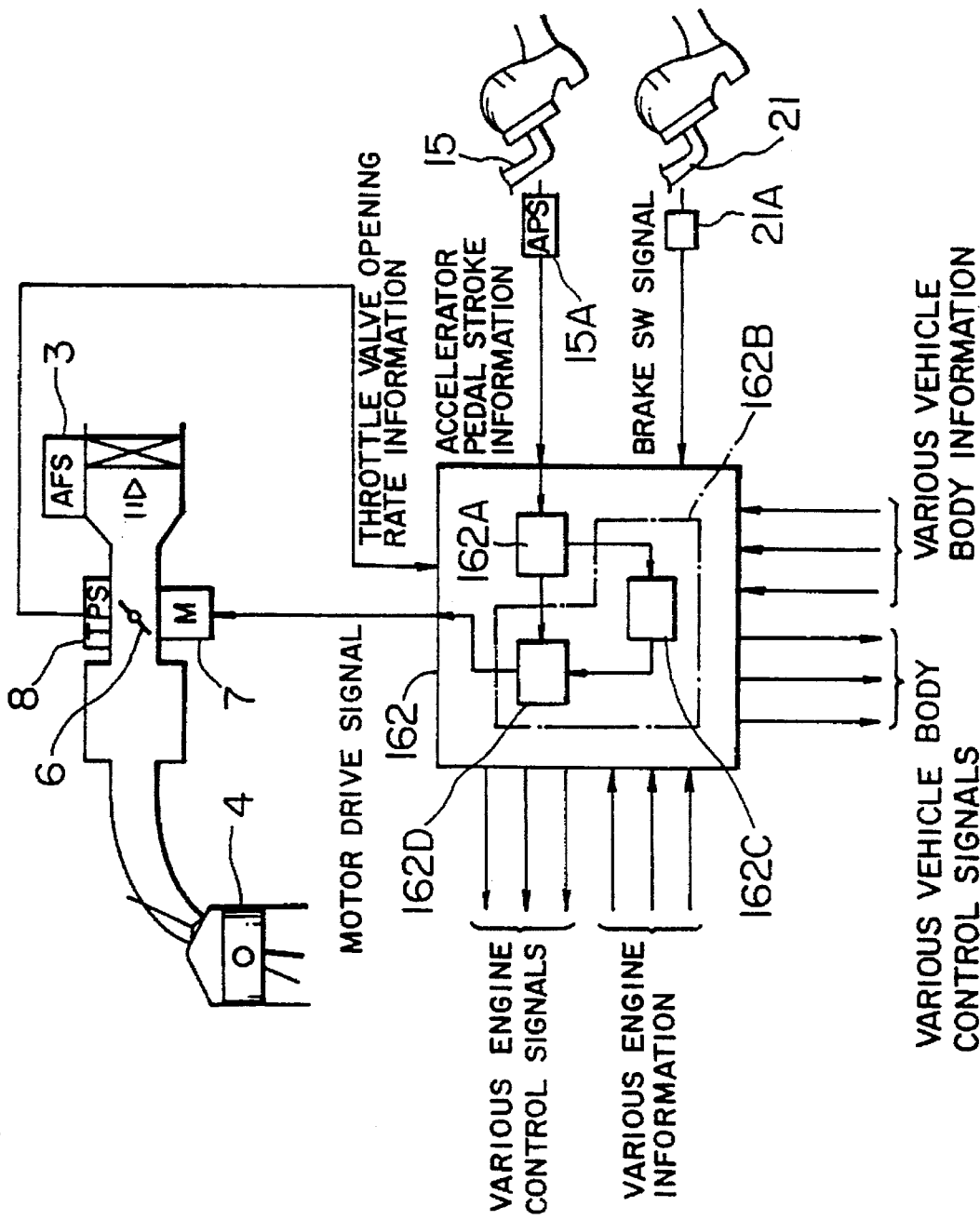

A description will next be made of an accelerator pedal position sensor failure-time acceleration control unit (hereinafter referred to as the "APS-failure-time acceleration control unit) 162. As is illustrated in FIG. 26, the APS-failure-time acceleration control unit 162 is inputted via the accelerator pedal position sensor 15A with information on a stroke of the accelerator pedal 15 and via a brake switch 21A as a brake pedal sensor with information on a stroke of the brake pedal 21.

The control unit 162 is provided with a failure detection means 162A and an acceleration control unit 162B. The acceleration control unit 162B is formed of a failure-time control unit 162C and a control means 162D.

The failure detection means 162A always monitors the output of the accelerator pedal position sensor 15A and, when the output does not change for a predetermined time or longer or an abnormal output is detected, outputs a failure signal to the failure-time control unit 162C.

The failure-time control unit 162C is designed to outputs a failure-time control opening rate for the throttle valve 6 when a failure signal is inputted. The control unit 162C uses a memory counter or the like. If the brake remains not operated, the failure-time control opening rate is gradually increased from an opening rate slightly greater than the opening rate during idling to an upper limit of the opening rate.

The control means 162D is designed to control the throttle valve 6 by the DBW (drive-by-wire) method. A control means of the ASC (automatic speed control) type or the like is assembled in the control means 162D.

Figure 27:
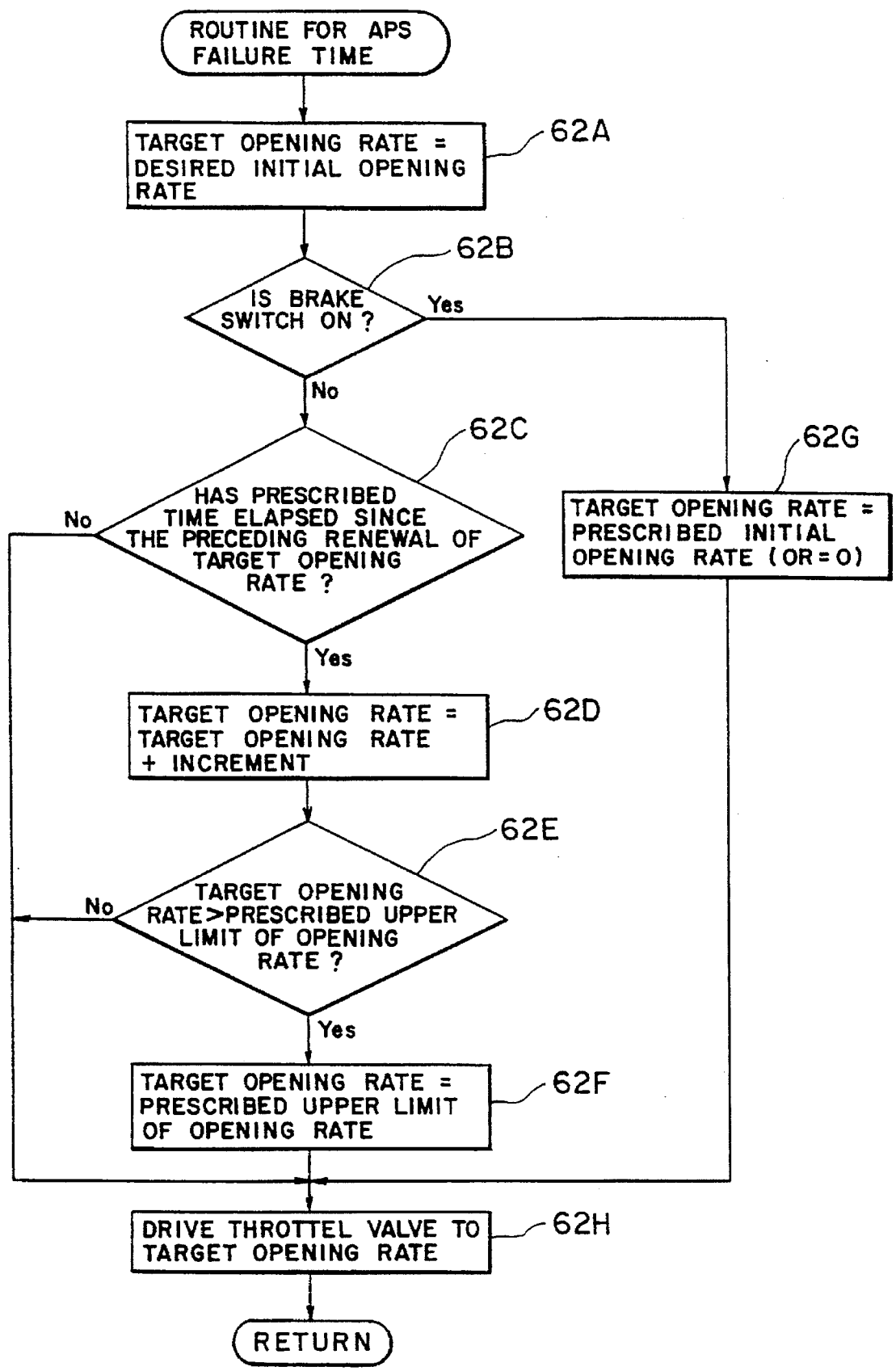

Owing to the construction described above, the APS-failure-time acceleration control unit 162 operates following the flow chart shown in FIG. 27.

When failure of the accelerator pedal position sensor 15A is detected by the failure detection means 162A, the operation of the flow chart is started. A predetermined throttle opening rate, which has been set in advance, is outputted as a target opening rate to the control means 162D (step 62A), so that the throttle valve 6 is operated to a prescribed throttle opening rate.

The prescribed throttle opening rate described above is set to an opening rate such that an engine output a little greater than that during idling can be obtained.

It is then judged based on an output signal from the brake switch 21A if the brake pedal 21 has been operated (step 62B). If not, step 62C is executed.

Namely, it is judged if a predetermined time has elapsed since the throttle opening rate was renewed to the prescribed throttle opening rate. If not, the output is maintained at a level by a prescribed throttle opening rate, which is somewhat greater than the throttle opening rate during idling (step 62H).

If the predetermined time has elapsed, the target opening rate of the throttle valve increases to a value added with a predetermined increment (step 62D) so that operation is performed at a throttle opening rate a little greater than the last throttle opening rate.

The target opening rate is gradually increased by the increment described above. It is monitored if the target opening rate so increased does not exceed the prescribed upper limit of the opening rate (step 62E). If the target opening rate increases the prescribed upper limit of the opening rate, the prescribed upper limit of the opening rate is always chosen as a target opening rate (step 62F).

The target opening rate so determined is outputted to the control means 162D and, while being limited to a target output opening rate from another control means, medium- or low-speed operation is continued without substantial reduction in the running performance even at the time of failure of the accelerator pedal position sensor 15A.

If, at the time of failure of the accelerator pedal position and during operation, the brake 21 is operated and the brake switch 21A is turned on, step 62G is executed. As a result, the target opening rate of the throttle valve 6 is changed to a prescribed initial opening rate or 0 and the throttle valve 6 returns to an opening rate corresponding to a lowest speed after the failure of the accelerator pedal position sensor or to the full close. This makes it possible to avoid an accident or the like.

Upon limiting the opening rate of the throttle valve as described above, the limitation to the throttle opening rate may be corrected by the vehicle body speed or the steering angle of the steering.

Instead of turning on the brake switch 21A in the manner described above, the above-described closure of the throttle valve 6 can be conducted in accordance with the following standards for judgment.

(1) By the detection of deceleration of the vehicle body from the vehicle body speed obtained from the speed of each wheel.

(2) By the detection of deceleration of the vehicle body based on a gravity (G) sensor.

(3) By a brake hydraulic pressure.

In this manner, even if failure takes place on the accelerator pedal position sensor 15A, the vehicle is still allowed to run at a medium or low speed without sudden stoppage so that the driver is allowed to safely stop the vehicle while avoiding danger to which the driver would be exposed if such sudden stoppage took place.

In the state that the brake is not operated, the throttle opening rate can be increased gradually to the upper limit of the engine output that assures safety. The vehicle can therefore be driven without substantially reducing the running performance.

Figure 28A:
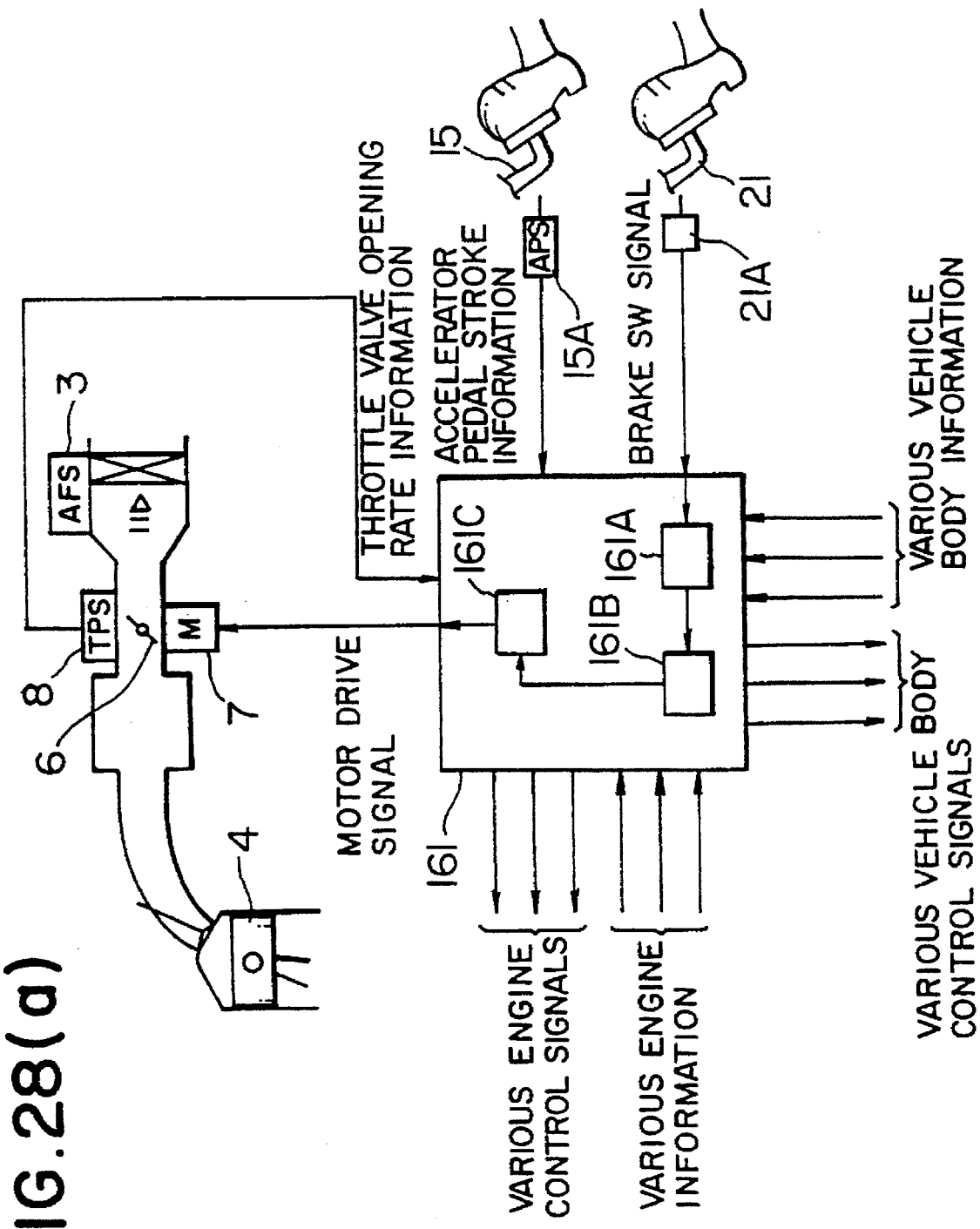
Figure 28A:
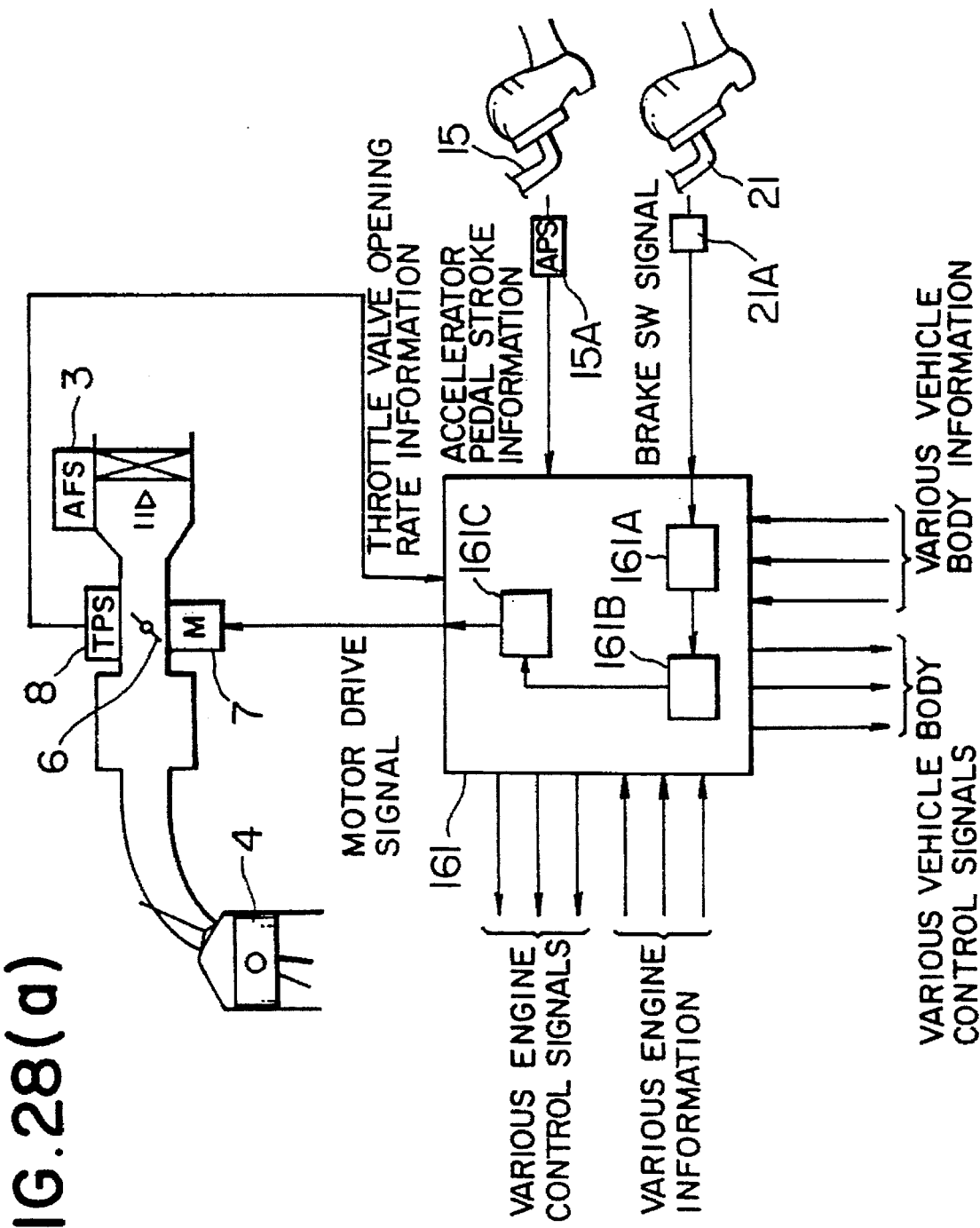

A description will next be made of an accelerator pedal position sensor failure-time, brake-switch-associated control unit (hereinafter referred to as the "APS failure time, BS-associated control unit) 161. As is illustrated in FIG. 28(a), a stroke of the accelerator pedal 15 is inputted to the control unit 161 via the accelerator pedal position sensor 15A and the state of operation of the brake 21 is also inputted to the control unit 161 via the brake switch 21A.

The control unit 161 is provided with a deceleration demand detection means 161A, a deceleration demand time control unit 161B and an acceleration control unit 161C.

Upon reception of an ON signal from the brake switch 21A as a result of operation of the brake pedal, the deceleration demand detection means 161A detects the deceleration demand and then outputs a deceleration demand signal.

Figure 28B:
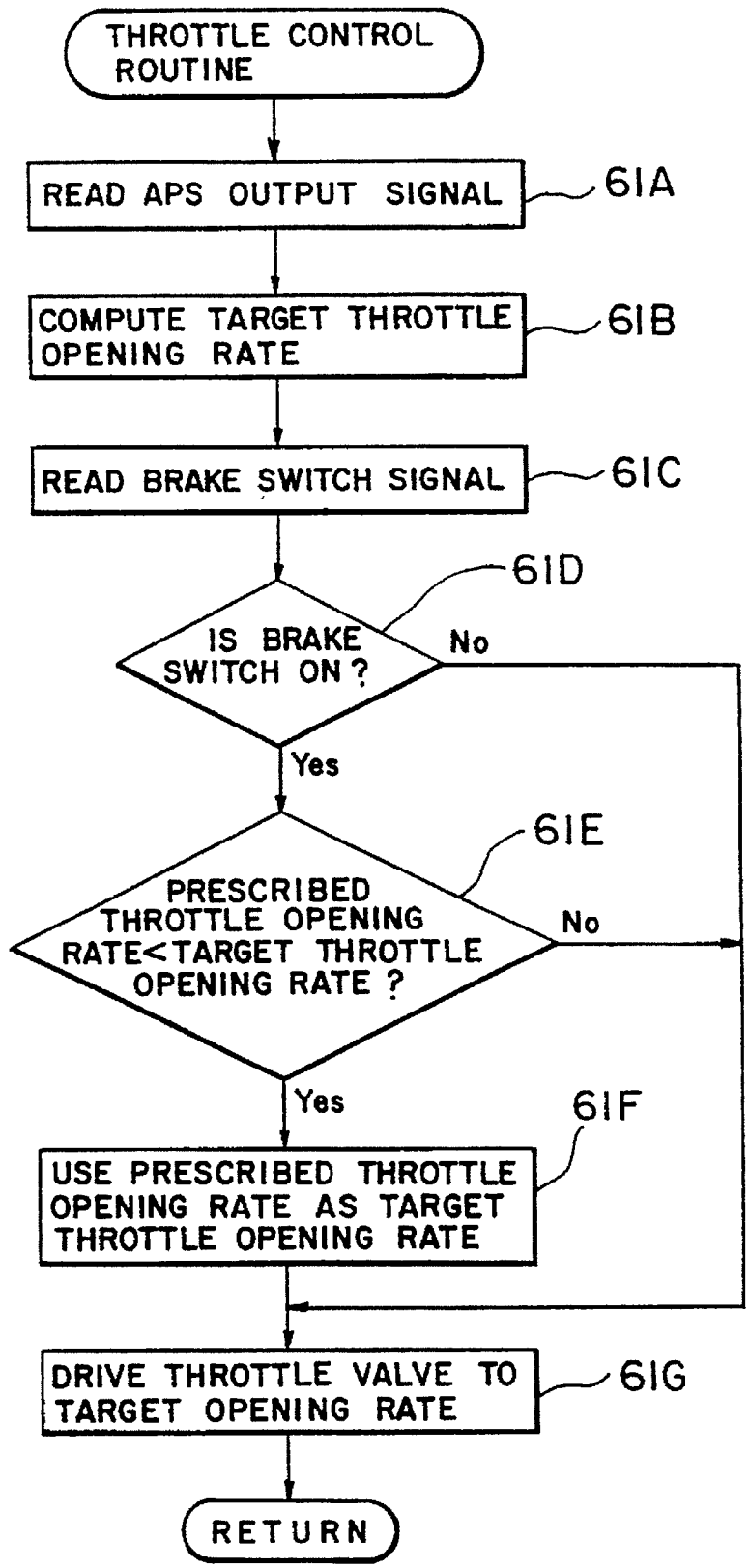

Upon receipt of the deceleration demand signal, the deceleration demand time control unit 161B performs the operation of the flow chart of FIG. 28(b) by an internal computation means and outputs a target throttle opening rate to the acceleration control unit 161C.

The acceleration control unit 161C receives the target opening rate for the throttle valve 6 and performs open/close control of the throttle valve 6 via the motor 7. The acceleration control unit 161C is equipped with function such as autocruise control of the DBW type.

Owing to the construction described above, the APS failure time, BS-associated control unit 161 operates following the flow chart of FIG. 28(b).

During normal operation, an output signal from the accelerator position sensor 15A is read by the acceleration control unit 161C (step 61A). A target throttle opening rate is thus computed (step 61B) and is then outputted, whereby the throttle valve 6 is driven to achieve acceleration as desired.

While such operation is carried out, the signal from the brake switch 15A is always read (step 61C) and is monitored (step 61D) by the deceleration demand detection means 161A. When the brake switch 15A is turned on, the deceleration demand detection means 161A outputs a deceleration demand signal to the deceleration demand time control unit 161B.

At the deceleration demand time control unit 161B, the target throttle opening rate at that time and a prescribed throttle opening rate, which has been set in advance, are compared (step 61E). When the target throttle opening rate is greater than the prescribed throttle opening rate, a predetermined throttle opening rate is adopted as the target throttle opening rate (step 61F) and this opening rate is then transmitted to the acceleration control unit 161C.

In this manner, the acceleration control unit 161C closes the throttle valve 6 to the predetermined throttle opening rate.

Since the predetermined throttle opening rate is set at such an opening rate as permitting safe drive even at the time of failure of the accelerator position sensor, it is still possible to drive at a safe speed even when the accelerator position sensor 15A fails.

Incidentally, the deceleration demand detection by the deceleration demand detection means 161A can be carried out in accordance with the following standards for judgment.

(1) Vehicle body deceleration computed based on the speed of each wheel.

(2) Vehicle body deceleration obtained from the G sensor.

(3) Change in the brake hydraulic pressure.

Instead of limiting the opening rate of the throttle valve 6 to the predetermined throttle opening rate, the deceleration demand time control unit 161B may be allowed to satisfy a deceleration demand in the following manner.

(1) The intake negative pressure is limited to limit the state of operation of the engine.

(2) A/N is limited to limit the state of operation of the engine.

(3) The fuel injection rate is limited to limit the state of operation of the engine.

In this manner, even at the time of failure of the accelerator pedal position sensor 15A or the like, the state of operation of the engine (the throttle valve opening rate) can be controlled in a safe state by the driver's intention of deceleration such as brake application whereby the driver can stop the vehicle after running at a safe speed.

Even if failure takes place on the accelerator pedal position sensor 15A or the like on a highway or the like, it is still possible to avoid sudden stoppage and hence to safely stop the vehicle without danger.

When the driver has made an acceleration demand during or after the movement to the predetermined throttle opening rate by a deceleration means such as a brake, the throttle valve is operated responsive to the acceleration demand from the predetermined opening rate. No substantial discomfort therefore takes place in the state of operation.

Use of a conventional means such as a brake switch as the deceleration demand detection means can bring about the above-described advantageous effects without cost increase.

Figure 29:
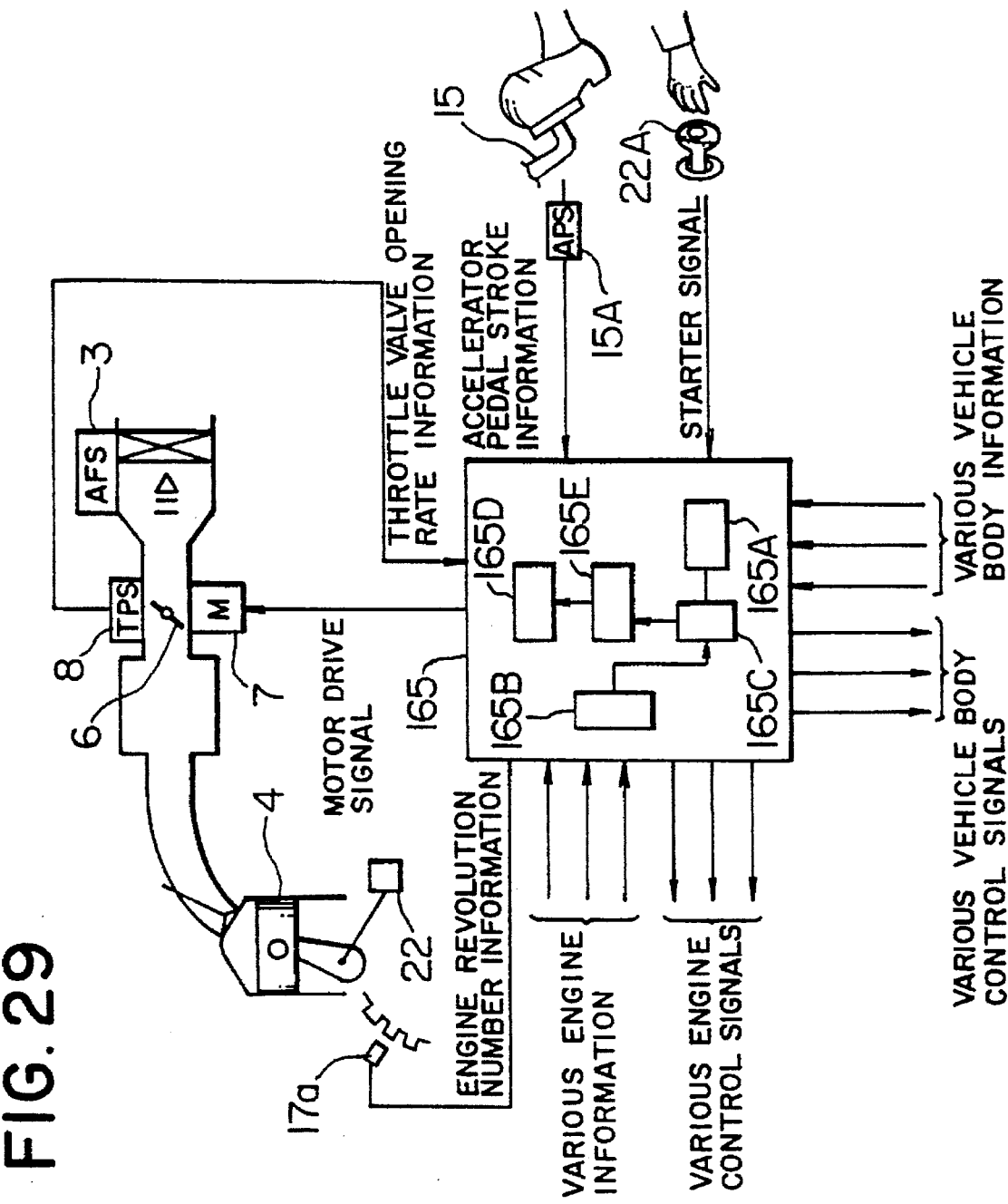

An engine-associated initialization inhibiting control unit 165 will next be described. As is shown in FIG. 29, the control unit 165 is inputted with an operation signal from a starter 22, which is actuated in association with an ignition switch 22A, and with information indicative of the state of operation of the engine, for example, with information on the engine revolution number.

The operation signal from the starter 22 is transmitted to a starter operation detection means 165A so that the state of operation of the starter 22 can be detected.

A detection signal is inputted to an engine operation detection means 165B from the engine revolution number sensor 17a, whereby the state of operation of the engine can be detected.

Further, a throttle valve control system 165D is also provided. The system 165D is equipped with various functions to perform controls such as autocruise and s designed to control the drive of the throttle valve 6 and the motor 7.

The throttle valve control system 165D is also provided with an initializing means 165E. This initializing means 165E outputs an initializing signal to the throttle valve control system 165D, whereby the throttle valve 6 is operated to the full close position or to the full open position to adjust its standard position or to confirm failure diagnosis of the throttle position sensor 8, the motor 7 and the like.

The initializing means 165E is provided with an initialization inhibiting means 165C, which outputs an initialization inhibiting signal to the initializing means 165E when execution of initialization is not preferred from the standpoint of the running performance of the vehicle.

Figure 30:
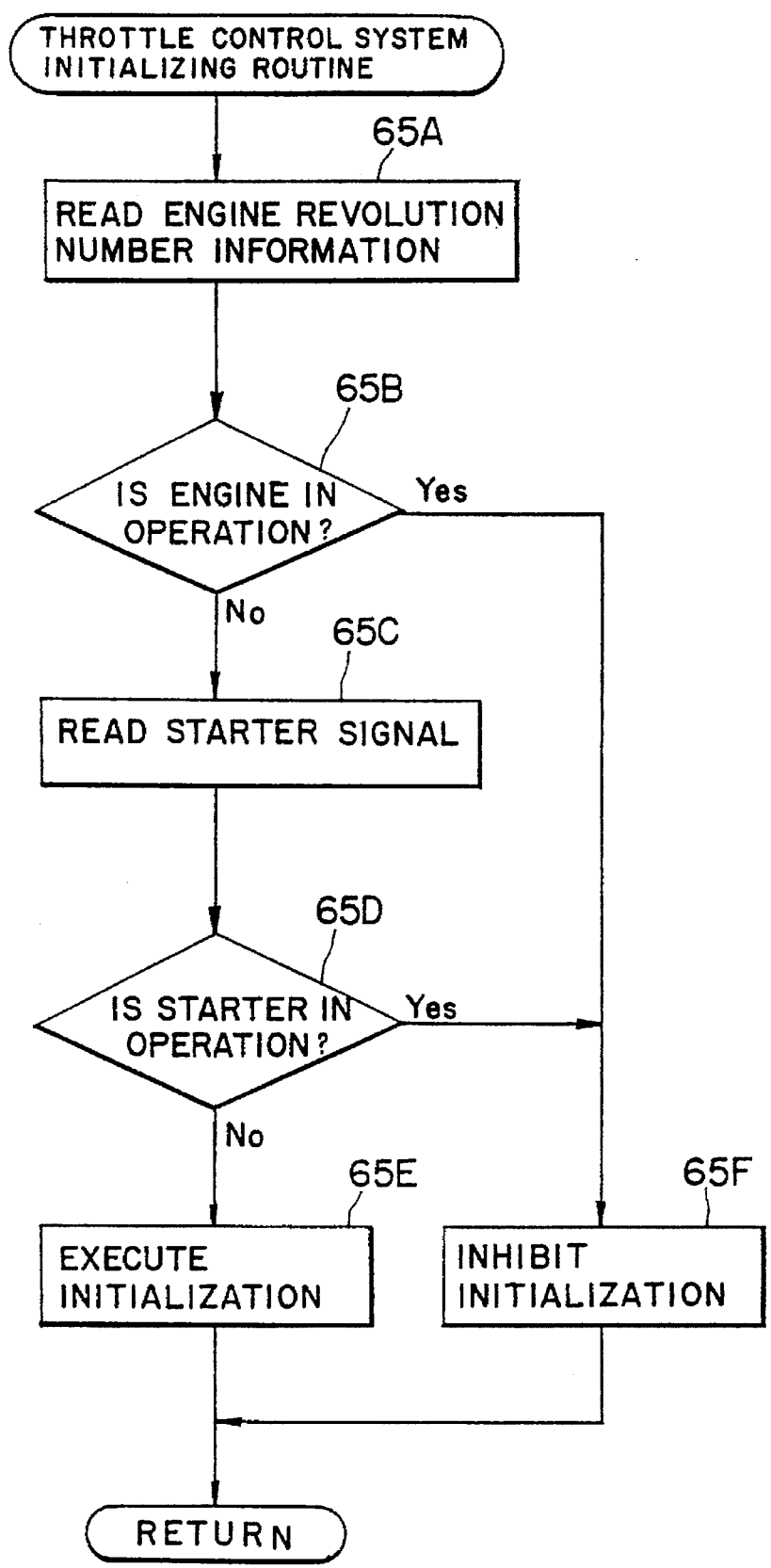

Owing to the construction described above, the engine-associated initialization inhibiting control unit 165 operates following the flow chart of FIG. 30.

Namely, a detection signal from the engine revolution number sensor 17a is inputted to the engine operation detection means 165B to read information on the revolution number of the engine (step 65A).

Then, it is judged if the engine revolution number Ne is equal to or greater than a predetermined value which has been set in advance (step 65B). If so, the engine is judged to be in operation so that an inhibition signal is transmitted from the initialization inhibiting means 165C to the initializing means 165E (step 65F).

Where the engine revolution number is smaller than the predetermined value, it is judged by the starter operation detection means 165A if the starter 22 is in operation (steps 65C,65D). If so, an inhibition signal is transmitted from the initialization inhibiting means 165C to the initializing means 165E (step 65F).

If the engine 4 is not judged to be in operation on the other hand (the No route of step 65B) and the starter 22 is not judged to be in operation (the No route of step 65D), no initialization inhibiting signal is transmitted so that initialization of the throttle valve control system 165D is executed by the initializing means 165E (step 65E).

For the execution of initialization, it is possible to add another condition, for example, the condition that sitting of a driver in the driver's seat should be detected after the door on the side of the driver's seat has been opened.

Initialization is therefore not executed while the engine or starter is in operation, thereby making it possible to avoid the phenomenon that the revolution number of the engine varies significantly although the driver is not operating the accelerator pedal 15.

In the case of a vehicle in which the voltage drop due to operation of the starter 22 is controlled small and the motor 7 for driving the throttle valve 6 and the throttle valve sensor 7 and ECU 14 can be operated without problem, initialization may be executed while the starter is in operation. In this case, the starter operation detection means 165A becomes unnecessary.

As has been described above, the initialization of the speed control unit is avoided when the engine or starter is in such a prescribed operation state, in other words, when the vehicle is driven. This has brought about the advantage that disturbance to various controls caused by the initialization can be prevented.

Figure 31:
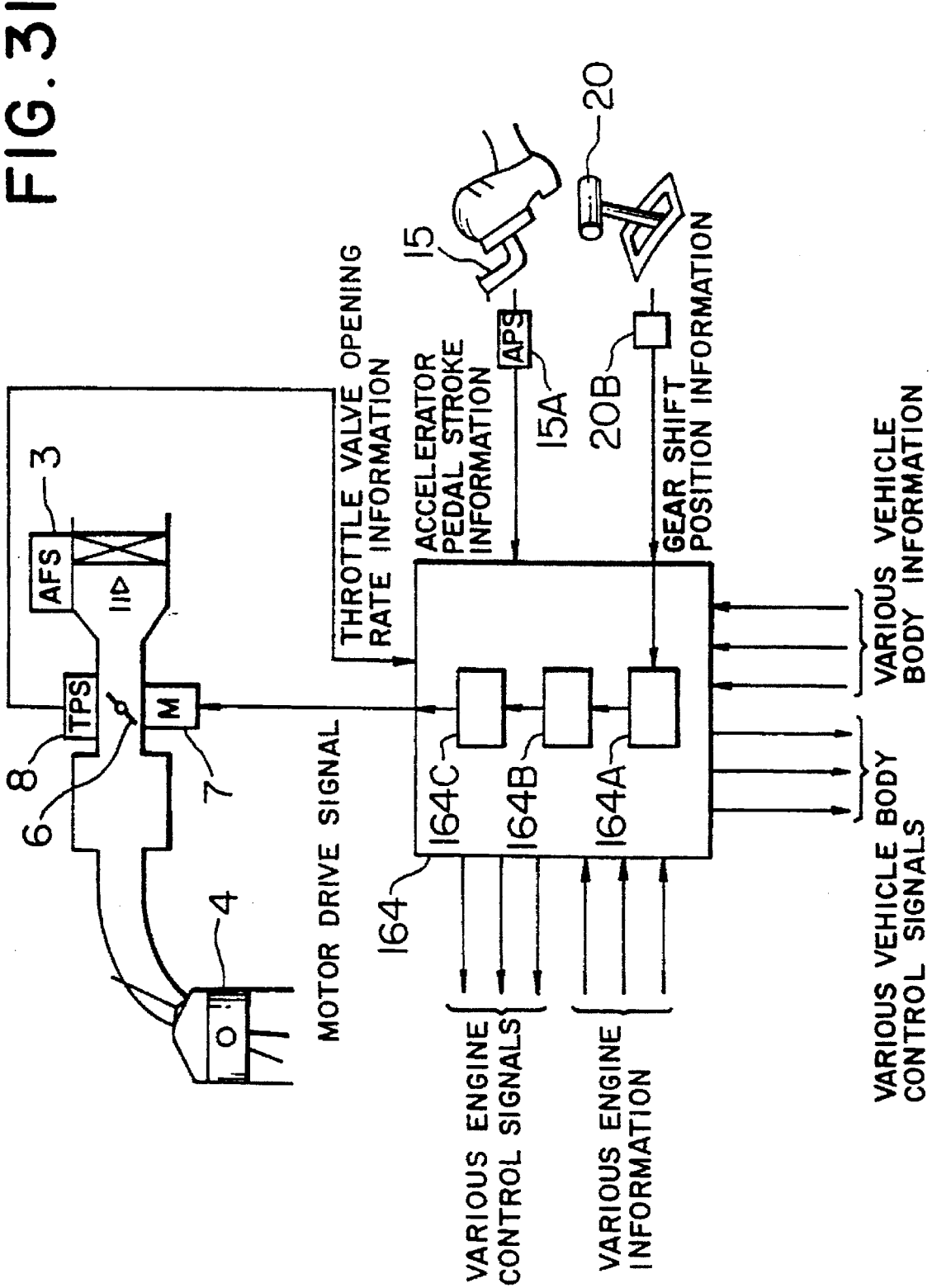

A description will next be made of a transmission-associated initialization inhibiting control unit 164. As is shown in FIG. 31, the control unit 164 is inputted with a stroke of the accelerator pedal 15 via the accelerator pedal position sensor (APS) 15A and also with a gear shift position of the transmission (A/T) 20 via the shift position detection sensor 20B.

The control unit 164 is provided with a throttle valve control system 164C, an initializing means 164B and an initialization inhibiting means 164A. The throttle valve drive system 164C and initializing means 164B are constructed in substantially the same manner as the throttle valve control system 165D and initializing means 165E described above.

The initialization inhibiting means 164A receives an output signal from the shift position detection sensor 20B of the automatic transmission 20. When the gear shift position is neither at the neutral position nor at the parking position which is such a gear shift position that the drive force of the engine is not transmitted to the wheels from the transmission, the initialization inhibiting means 164A outputs an inhibition signal to the initializing means 164B.

Owing to the construction described above, the transmission-associated initialization inhibiting control unit 164 operates following the flow chart shown in FIG. 32.

Namely, the gear shift position of the transmission 20 is detected by the shift position detection sensor 20B (step 64A) and is then transmitted to the initialization inhibiting means 164A.

By the initialization inhibiting means 164A, it is judged if the shift position is at N (neutral position) or P (parking position) (step 64B). If the gear shift position is neither at N position nor at P position, an initialization inhibiting signal is outputted to the initializing means 146B (step 64D).

As a consequence, the initialization of the throttle valve control system 164C is inhibited when the gear shift position is neither at N position nor at P position.

When the gear shift position is at N position or at P position, no inhibition signal is outputted so that the initialization of the throttle valve control system 164C is performed by the initializing means 164B (step 64C).

In the case of a manual transmission, the initialization of the throttle valve control system is inhibited when the gear shift position is not at the neutral position. The initialization is executed only at the neutral position.

It is hence possible to avoid the initialization of the speed control unit in a running state which is not desirous due to momentary cut-off of the power supply or the like. This has made it possible to prevent initialization-induced disturbance of various controls.

Figure 33:
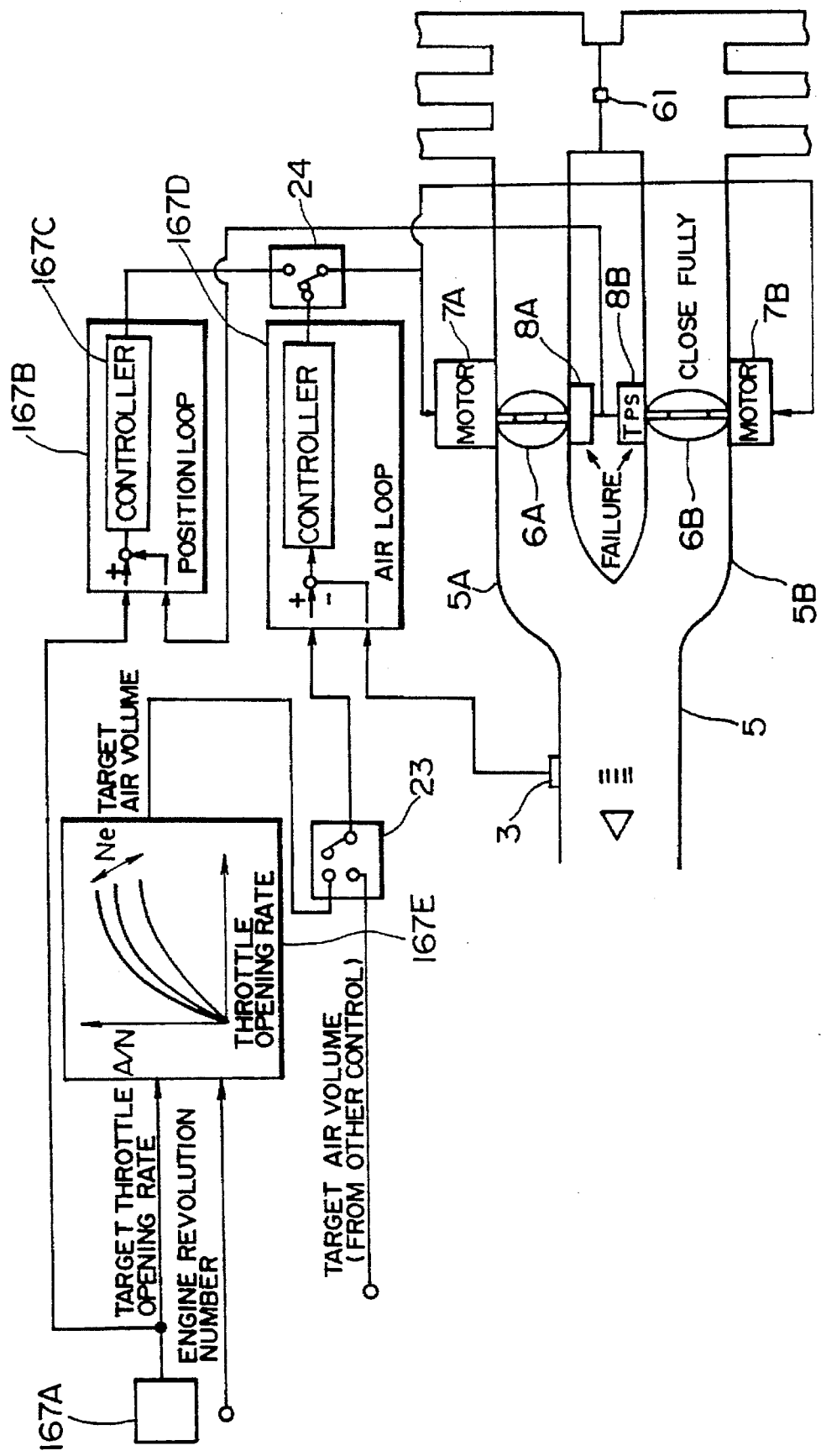
Figure 33:
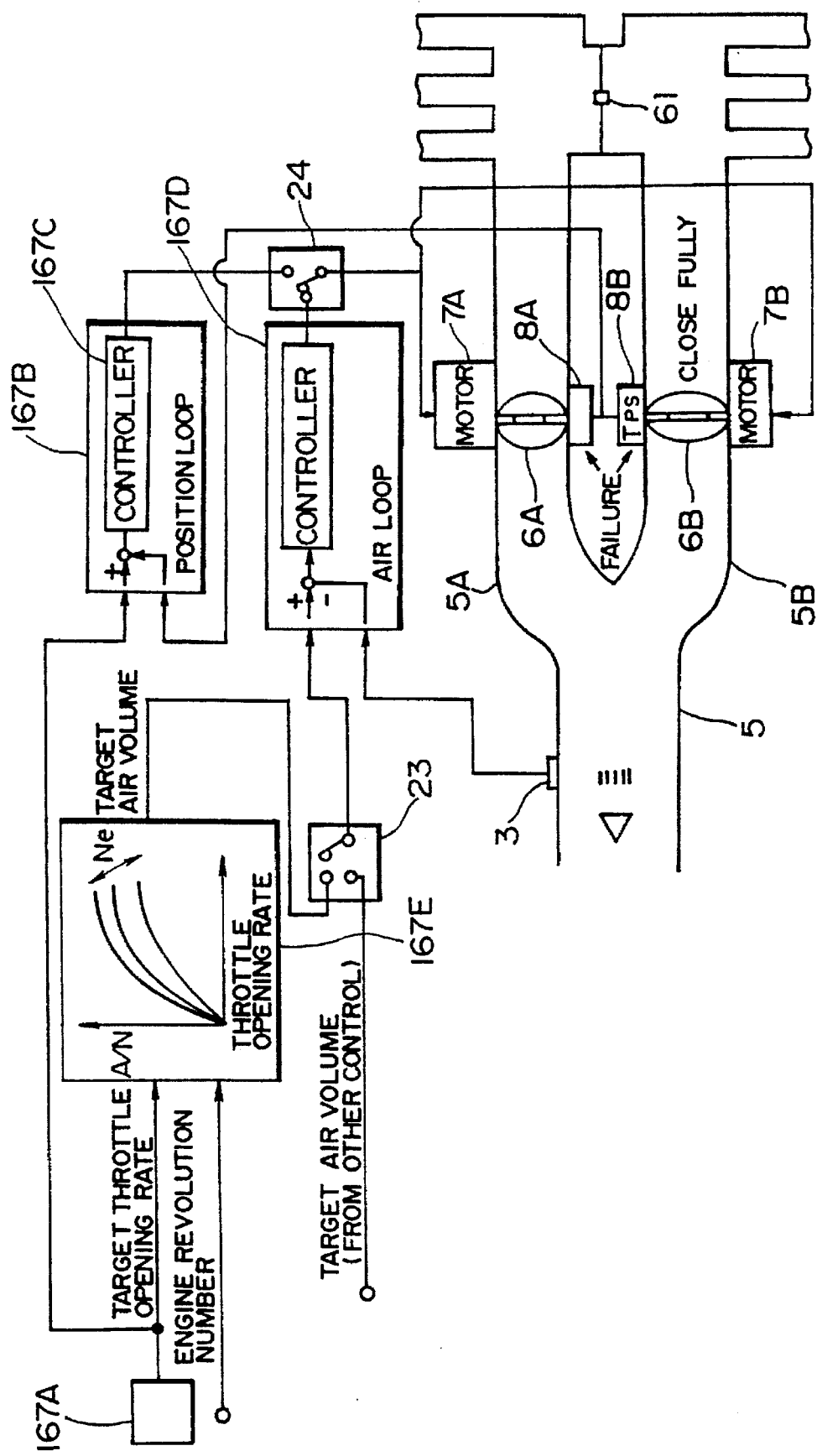

Next, a throttle valve sensor failure-time air control unit (hereinafter referred to as the "TV failure time, air control unit") 167 will be described. As is shown in FIG. 33, two intake passages 5A,5B provided in parallel to each other are provided with throttle valves 6A,6B, respectively. These throttle valves 6A,6B are driven, i.e., opened and closed by drive motors 7A,7B, respectively. The drive motors 7A,7B are in turn controlled by a throttle valve drive means 167B.

Incidentally, the intake passages 5A,5B are connected at their downstream sides to respective banks of a V6 engine. A communication valve 61 is arranged between downstream portions of the intake passages 5A,5B so that the intake passages 5A and 5B are communicated with each other when the communication valve 61 is opened.

The communication valve 61 is closed while the throttle valves 6A,6B are normal but is opened if any one of the throttle valves 6A,6B fails and closes up fully.

The throttle valve drive means 167B is designed to output a drive signal so that the throttle valves 6A,6B can be opened or closed to a target opening rate outputted from a target opening rate setting means 167A.

The target opening rate setting means 167A is formed by one of the other control units 151–168, said one control unit being capable of outputting a target throttle opening rate.

A controller is also provided as a failure detection means 167C. Failure of the motor 7A(7B) or throttle position sensor 8A(SB) is detected in the form of an abnormal output or the absence of any change in output for a predetermined time or longer, and a failure signal is then outputted to a converter means 167E and also to a failure-time air control means 167D.

The failure-time air control means 167D is provided with switches 23,24. Upon reception of a failure signal, these switches 23,24 are changed over so that the throttle valve 6A and motor 7A are switched from the target opening rate control to target air control.

Namely, the converter means 167E is equipped with a map which can correlate each throttle opening rate to an air volume per revolution of the engine A/N. By the converter means 167E, a target throttle opening rate is therefore converted to a target air volume while using the engine revolution number as a parameter.

The target air volume so converted is then inputted to the air control means 167D. To give the target air volume, the motor 7A is driven to open or close the throttle valve 6A.

The opening or closure of the throttle valve 6A is feedback controlled by using an output signal from the intake air sensor 3.

The air flow sensor 3 as an intake air sensor is arranged on an upstream side of the intake passage 5, which is before the intake passage 5 is bifurcated into the intake passage portion 5A and the intake passage portion 5B (for example, within an air cleaner), so that the intake air volume can still be measured even if any one of the intake passage portions 5A and 5B becomes no longer usable.

Owing to the construction described above, the TV failure time, air control unit 167 operates following the flow chart shown in FIG. 34.

If any one of the throttle valve sensors 8A,8B fails, control is conducted by the other unfailed sensor 8A(8B) so that both the throttle valves 6A,6B are driven over the same angle or only one 6A(6B) of the throttle valves is driven.

If both the throttle valve sensors 8A, SB are found to have failed by the failure detection means 167C (step 67C), the current to the motor 7B which serves to drive the throttle valve 6B on one side is cut off and the throttle valve 6B is driven to the full close position by a return spring attached to the throttle valve 6B (step 67B).

A failure signal is then outputted from the failure detection means 167C to the converter means 167E and also to the failure-time air control means 167D. This changes over the switches 23,24 so that the control system for the throttle valve 6A is switched to the system which runs through the converter means 167E and the failure-time air control means 167D (step 67C)>

By the converter means 167E, a target throttle opening rate is converted to a target air volume per revolution of the engine A/N while using as a parameter the engine revolution number Ne detected by the engine revolution number sensor 17a (step 67D).

The air control means 167D performs feedback control corresponding to the deviation of an air quantity actually measured by the intake air sensor (air flow sensor) 3 from the target air volume, whereby the motor 7A is driven to a desired extent in order to drive the throttle valve 6A toward the target air volume (step 67E).

In this case, the communication valve 61 should be kept open. owing to this, even if the throttle valve 6B is fully closed, intake air can still be fed to the other bank through the throttle valve 6A and the communication valve 61.

In place of the control means described above, control can also be performed in the following manner.

If both the throttle valve sensors 8A,8B have failed, the throttle valves 6A,6B are first driven to full closed position. Similarly to the procedure described above, switching to the air control mans 167D is performed. To achieve a target air volume, the motors 7A,7B are then driven to the same extent so that the throttle valves 6A,6B are opened to the same rate.

Then, using air volume information actually measured by the air flow sensor 3, the throttle valves 6A,6B are feedback controlled based on the air volume. In this case, the communication valve 61 can be kept closed.

By such a control means, compensation at the time of failure of the throttle valve sensor(s) can be effected in substantially the same manner as the means described above.

Even when both the throttle valve sensors 8A and 8B have failed, control of the throttle valves 6A,6B can still be precisely continued as described above.

Figure 39:
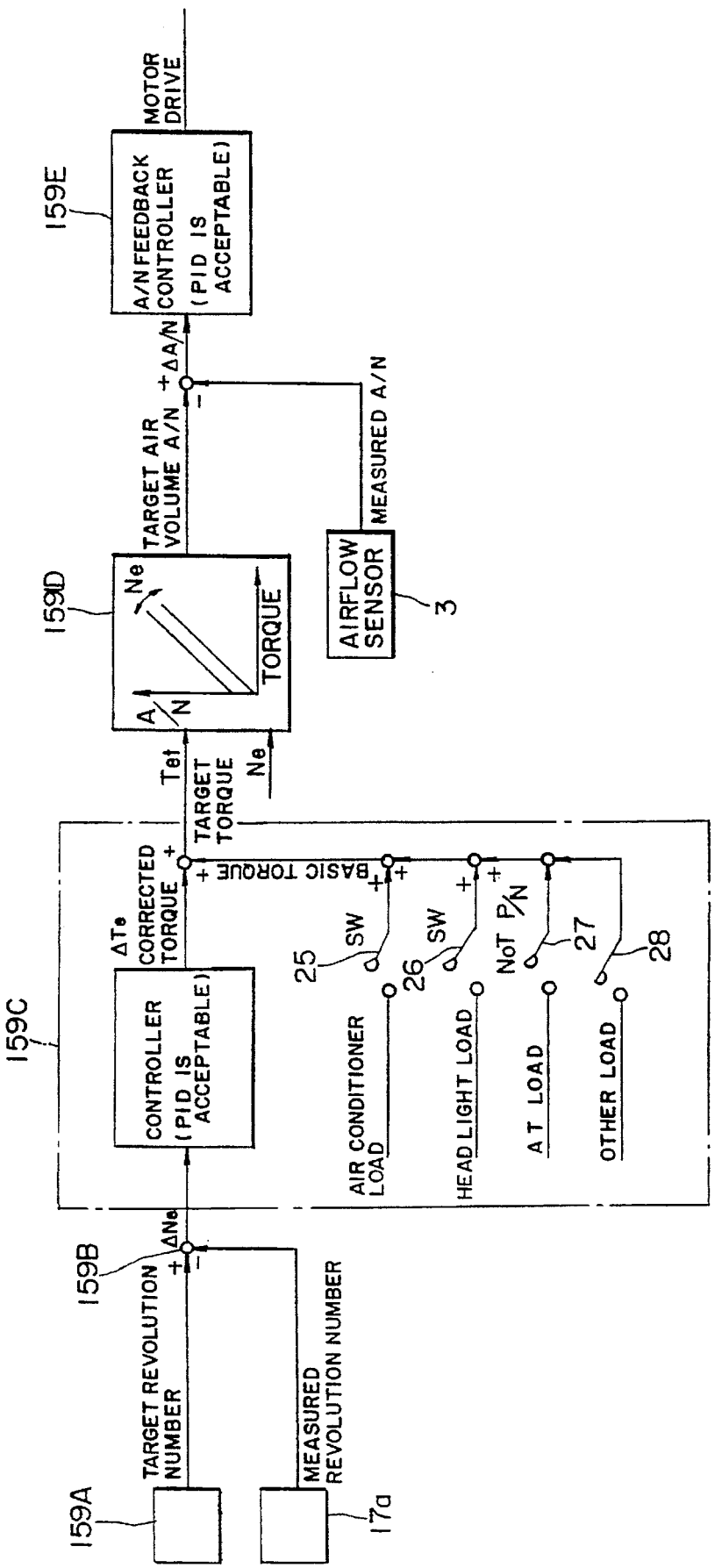

A description will next be made of an output torque adjusting revolution number control unit (hereinafter referred to as the "OTA revolution number control unit) 159. As is illustrated in FIG. 39, a target revolution number setting means 159A which serves to set a target revolution number is provided in order to perform control of the revolution number of the engine (especially during idling). Also provided is the engine revolution number sensor 17a as a revolution number detection means for detection the revolution number Ne of the engine.

An output from the engine revolution number sensor 17a and another output from the target revolution number setting means 159A are both inputted to a revolution number deviation detection means 159B formed of a subtractor. An output from the means 159B is inputted to an engine output torque computing unit 159C.

The engine output torque computing unit 159C is designed to compute an output torque required to achieve a target revolution number. It is designed to add a correction torque for the elimination of the deviation ΔNe in revolution number, said correction torque having been determined by PID from the proportional, integral and differential elements of the deviation ΔNe in revolution number, with an air conditioner load, a headlight load, an AT (automatic transmission) load and other loads by power steering and the like.

The air conditioner load, headlight load, AT load and other loads have been stored beforehand in ROM in terms of torques required therefor. When one or all of their actuation switches 25,26,27,28 are turned on, the torques required for the turned-on loads are read and added, and the overall torque of the required torques so turned on and the correction torque for the elimination of the deviation in revolution number are outputted together as a target engine output torque.

An A/N converter unit 159D with a map of correlation map between engine torque and A/N is also provided. The target engine output torque is inputted to the converter unit 159D so that its corresponding target A/N is outputted.

The target A/N is inputted to a feedback control unit 159E. This feedback control unit 159E feedbacks A/N actually measured and computed based on an output from the air flow sensor 3. The unit 159E eliminates the deviation of the measured A/N from the target A/N by PID control, whereby control is performed to achieve the target A/N.

Figure 40:
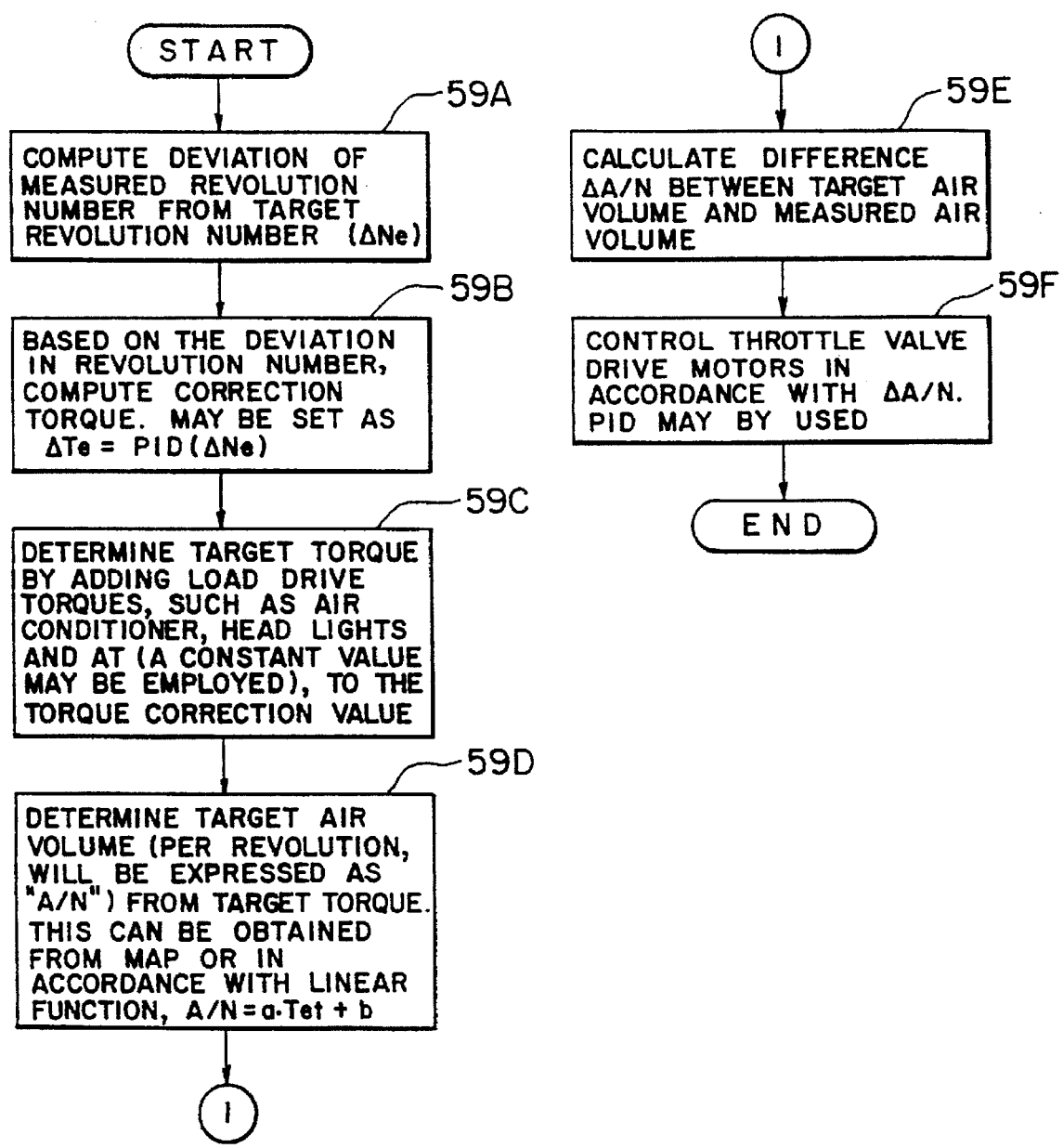

Owing to the construction described above, the OTA revolution number control unit 159 operates following the flow chart shown in FIG. 40.

Namely, the deviation ΔNe of an engine revolution number Ne detected by the revolution number detection means 17a from a target revolution number set by the target revolution number setting means 159A is computed by the revolution number deviation detection means 159B (step 59A). Next, a correction torque ΔTe is computed based on the revolution number deviation ΔNe (step 59B).

At the engine output torque computing unit 159C, load drive torques such as those required for air conditioner, headlights, automatic transmission and the like are read from the ROM and are then added to the correction torque ΔTe. As a result, a target torque has been computed (step 59C).

This target torque is converted to a target A/N by the A/N converter unit 159D and is then outputted (step 59D).

Upon the above conversion, the target A/N is obtained from the map of A/N and engine output torque. It can also be obtained in accordance with a first-degree formula like:

$$A/N = ate + b$$

The deviation ΔA/N of the measured A/N from the target A/N is determined (step 59E), and the throttle valve drive motor 7 is then controlled pursuant to ΔA/N (step 59F).

Figure 38A:
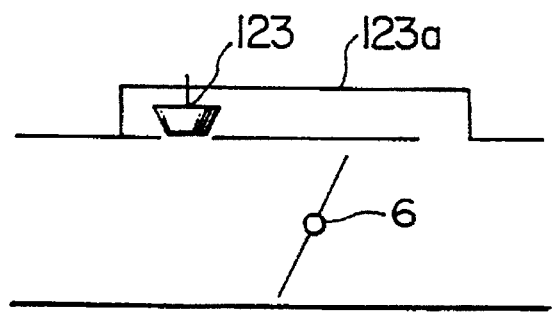
Figure 38B:
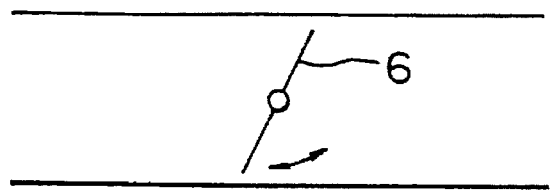

As has been described above and is also shown in FIG. 38(a), the present structure is not a means for feeding a deviation from a target revolution number back to the opening rate of an idling control valve 123 provided in a bypass passage 123a but, as is shown in FIG. 38(b), uses the means for directly controlling the intake air volume. Accordingly, even in the case of the throttle valve 6 whose diameter is large, no influence is given by the non-linearity between the area of the opening in the air flow passage and the drive of the actuator for the throttle valve 6. This makes it possible to use the large-diameter throttle valve 6 as a means for controlling the revolution number.

Further, the feedback control of the intake air volume can be incorporated in a minor loop, so that the response of the air intake system can be improved and the response and stability of the revolution number control can also be improved.

Since the volume of intake air is measured, it is possible to easily discover failure in the actuator for the throttle valve 6.

Figure 35:
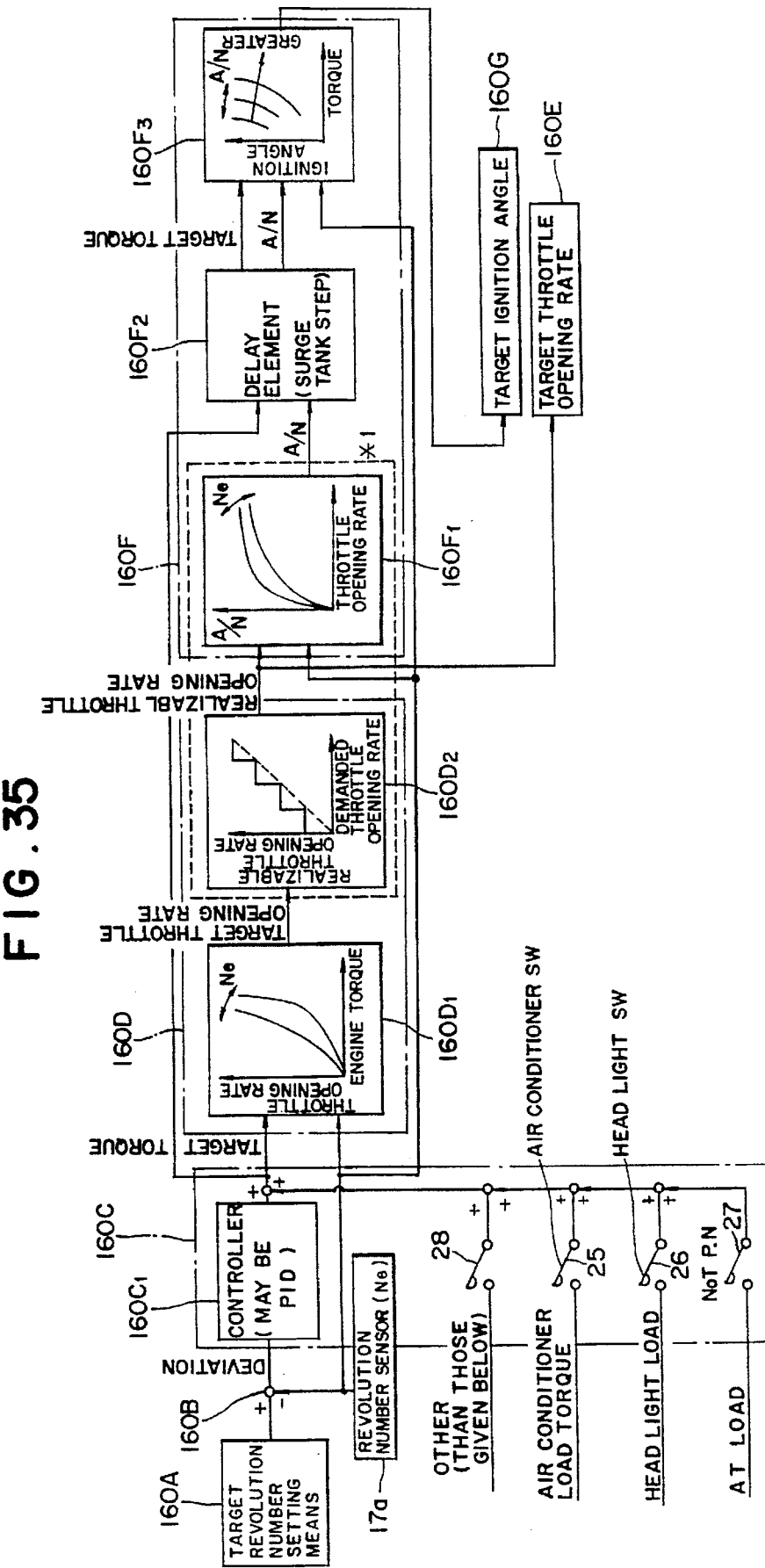

An ignition angle/throttle valve-combined revolution number control unit (hereinafter referred to as the "IA/TV-combined revolution number control unit") 160 will next be describe. As is illustrated in FIG. 35, the control unit 160 is provided with a target revolution number setting means 160A, which is adapted to set a target engine revolution number in order to control the revolution number of the engine (especially during idling).

In addition, the revolution number sensor 17a is also provided as the revolution number detection means for detecting the revolution number Ne of the engine.

An output from the revolution number sensor 17a and another output from the target revolution number setting means 160A are inputted to the revolution number deviation detection means 160B constructed of a subtractor. An output from the means 160B is inputted to an engine output torque computing unit 160C.

The engine output torque computing unit 160C is designed to compute an output torque required to achieve the target revolution number. A correction torque for the elimination of the deviation ΔNe in revolution number, said correction torque having been determined by PID from the proportional, integral and differential elements of the deviation ΔNe in revolution number. To the value so computed, an air conditioner load, a headlight load, an AT (automatic transmission) load, and other loads by power steering and the like are added.

The air conditioner load, headlight load, AT load and other loads have been stored beforehand in ROM in terms of torques required therefor. When one or all of their actuation switches 25,26,27,28 are turned on, the torques required for the turned-on loads are read and added, and the overall torque of the required torques so turned on and the correction torque for the elimination of the deviation in revolution number are outputted together as a target engine output torque.

A valve opening rate converter means 160D is also provided. This converter means 160D is equipped with a correlation map 160D$_1$ between engine torque and throttle opening rate. The target engine output torque is inputted to the converter unit 160D so that its corresponding target opening throttle rate is computed.

The target throttle opening rate is inputted to a realizable opening rate setting means 160D$_2$. By the means 160D$_2$, an opening rate realizable by the throttle valve 6 is determined corresponding to the target throttle opening rate and is outputted.

Namely, the throttle valve 6 and the motor 7 for driving the throttle valve 6 have a prescribed degree of resolution to permit efficient control over the wide range from full close to full open.

Figure 37:
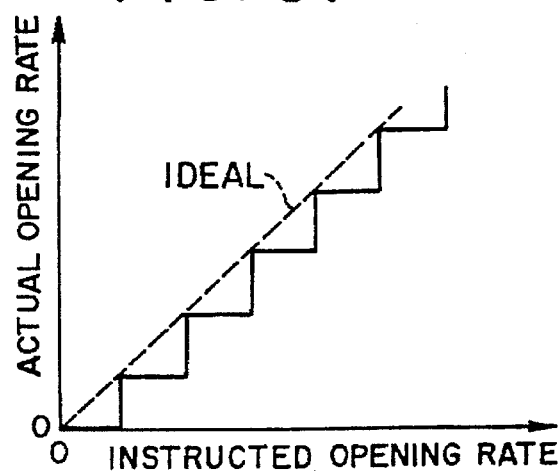

As is indicated by a dashed line in FIG. 37, it is ideal for the resolution characteristic to have a smooth characteristic over the entire range of opening rates. Even if they are constructed to have substantially smooth characteristic with sufficient resolution at intermediate opening rates, they have a stepwise characteristic in the range of small opening rates as shown by a solid line in the same drawing so that a limitation is imposed on feasible throttle opening rates.

Therefore, using the target throttle opening rate as a demand opening rate, throttle opening rates feasible for the demand opening rate are stored as a map. A realizable throttle opening rate determined by the map is outputted.

Namely, on a more open side than the inputted target throttle opening rate, a realizable throttle opening rate of a characteristic which is indicated by a solid line and is closest to the target throttle opening rate is determined as a realizable throttle opening rate.

This realizable throttle opening rate is then inputted to a throttle valve control unit 160E, whereby the throttle valve 6 is controlled to the realizable throttle opening by way of the drive motor 7.

Incidentally, an adjustment means 160F is connected to the valve opening rate converter unit 160D. This adjustment means 160F is equipped with a map $160F_1$ for converting a throttle opening rate to A/N, a delay element $160F_2$ with delay or the like by a surge tank taken into consideration, and an ignition angle determination means $160F_3$ having a correlation map between engine torque and ignition angle.

To the map $160F_1$, the realizable throttle opening rate and the engine revolution number Ne are inputted. The realizable throttle opening rate is converted to an A/N corresponding to the reliable opening rate while using the engine revolution number Ne as a parameter.

The delay element $160F_2$ is equipped with function for delaying the output timing of the target output torque and the A/N, which corresponds to the realizable opening rate, so that they can be synchronized with the actual engine operation timing.

The ignition angle determination means $F_3$ is equipped with the correlation between target output torques and ignition angles in the form of a map in which A/N is used as a parameter. From the target output torque and the A/N corresponding to the realizable opening rate, a target ignition angle is determined and outputted.

The target ignition angle is inputted to an ignition angle adjustment means 160G so that desired ignition angle retard control can be performed.

Figure 36:
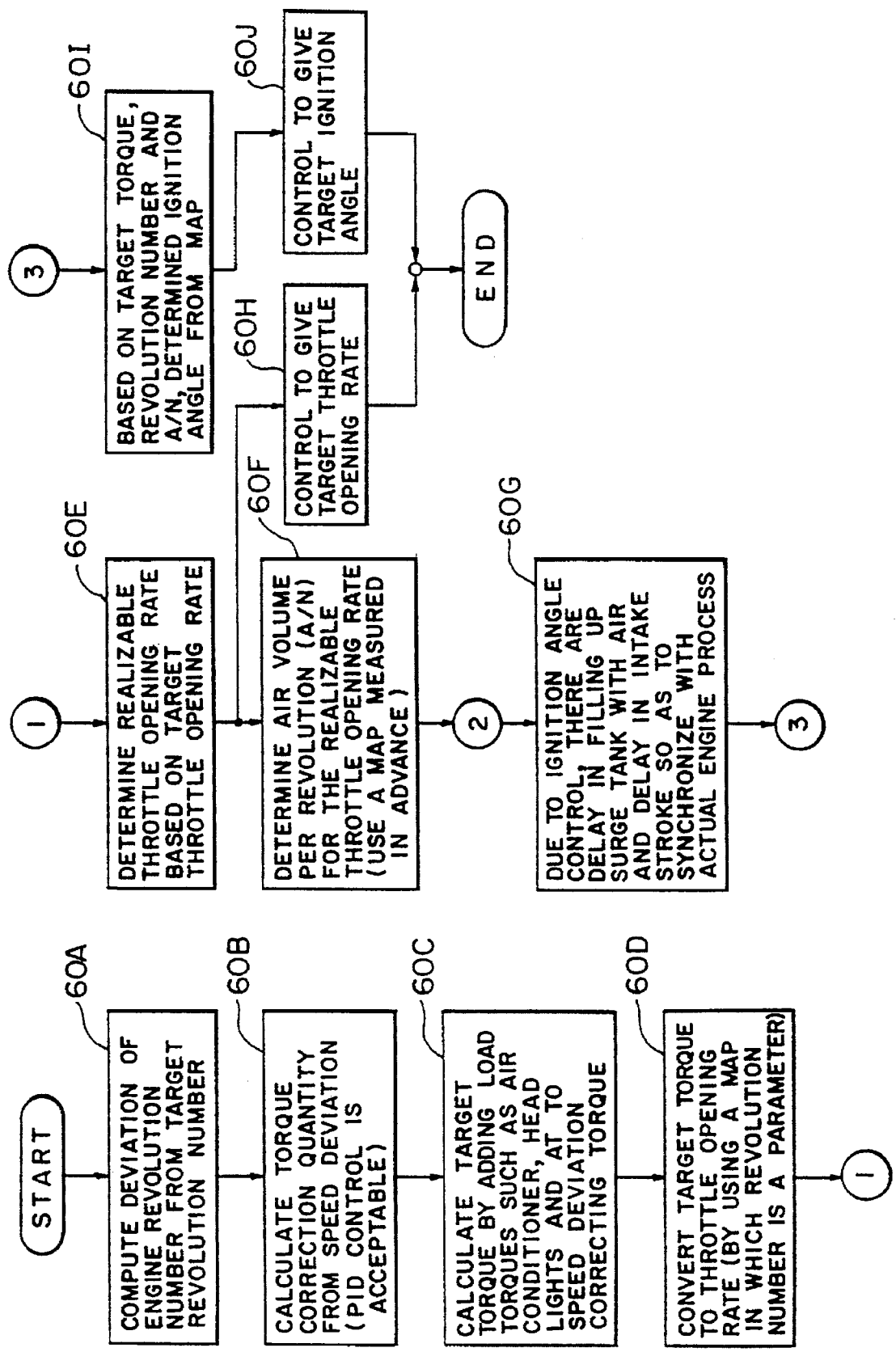

Owing to the construction described above, the IA/TV-combined revolution number control unit 160 operates following the chart shown in FIG. 36.

Namely, at the revolution number deviation detection means 160B, the deviation of the actually-measured engine output number Ne outputted from the revolution number detection means 17a from the target revolution number set by the target revolution number setting means 160A is computed (step 60A).

To eliminate the speed deviation so computed, a torque correction quantity as a control quantity in the PID control is computed by an engine output torque computing unit $160C_1$ (step 60B).

Next, at the engine output torque computing unit 160C, the required torques corresponding to the turndown switches 25,26,27,28 out of air conditioner load torque, headlight load torque, AT (automatic transmission) load torque and other load torques are added further and a target output torque is computed (step 60C).

The target output torque is converted to a target throttle opening rate in accordance with the map $160D_1$ by the valve opening rate converter 160D (step 60D).

Upon this conversion, one of the map characteristics each of which uses an engine revolution number as a parameter is chosen in the light of the engine revolution number Ne actually measured, and the conversion is then conducted.

The target throttle opening rate so computed is converted by the realizable opening rate setting means $160D_2$ to a realizable throttle opening rate which is closest to the target throttle opening rate on a more open side than the target throttle opening rate (step 60E).

The realizable throttle opening rate is inputted to the throttle valve control unit 160E, by which the throttle valve 6 is driven to the realizable throttle opening rate (step 60H).

In addition, the realizable throttle opening rate is converted to an air volume per revolution of the engine (A/N) by the map $160F_1$ in the adjustment means 160F (step 60F).

The ignition angle is then controlled by the air volume (A/N) and the target engine torque from the engine output torque computing unit 160C. To have it synchronized with the actual engine process, the delay in filling the surge tank with air is correlated to the delay in the intake stroke by the delay element $160F_2$, whereby the output of the target engine torque and A/N to the ignition angle determination means $160F_3$ is delayed (step 60G).

Based on the target engine torque and A/N inputted with a delay to the ignition angle determination means $160F_3$ and the map incorporated in the means $160F_3$, said A/N corresponding to the realizable opening rate, a more delayed retard ignition angle is determined (step 60I). This retard ignition angle is inputted to the ignition angle adjustment means 160G.

At the ignition angle adjustment means 160G, the ignition angle of the engine 4 is controlled to have it regarded to the ignition angle so determined (step 60J), whereby a surplus engine output torque expected to be produced due to the control of the throttle opening rate to the feasible throttle opening rate on the more open side than the demanded throttle opening rate is eliminated by the ignition angle retard and the engine output torque is subjected to fine adjustment.

Incidentally, an actually measured value may be used between the steps ① and ② in FIG. 36.

As the target throttle opening rate, the target throttle opening rate of the map 160D can be used as it is. No substantial influence is given to the effects of the control even if the control is conducted in this manner.

Further, the surplus engine output torque may also be adjusted by adjusting the air/fuel ratio toward the lean side instead of adjusting it by retarding the ignition angle. In this case, the above ignition angle determination means is replaced by an air/fuel ratio determination means which has as a map the relation of air/fuel ratios (A/F) to target torques and receives the target torque, A/N and engine revolution number. Based on an output from the air/fuel ratio determination means, the air/fuel ratio is rendered leaner.

In this manner, precise revolution number control can also be effected by using the throttle valve having coarse resolution instead of providing a small-diameter valve for the control of idling. As a result, parts such as an idle control valve are obviated, leading to a reduction in the number of parts and also to a reduction in cost.

Figure 41:
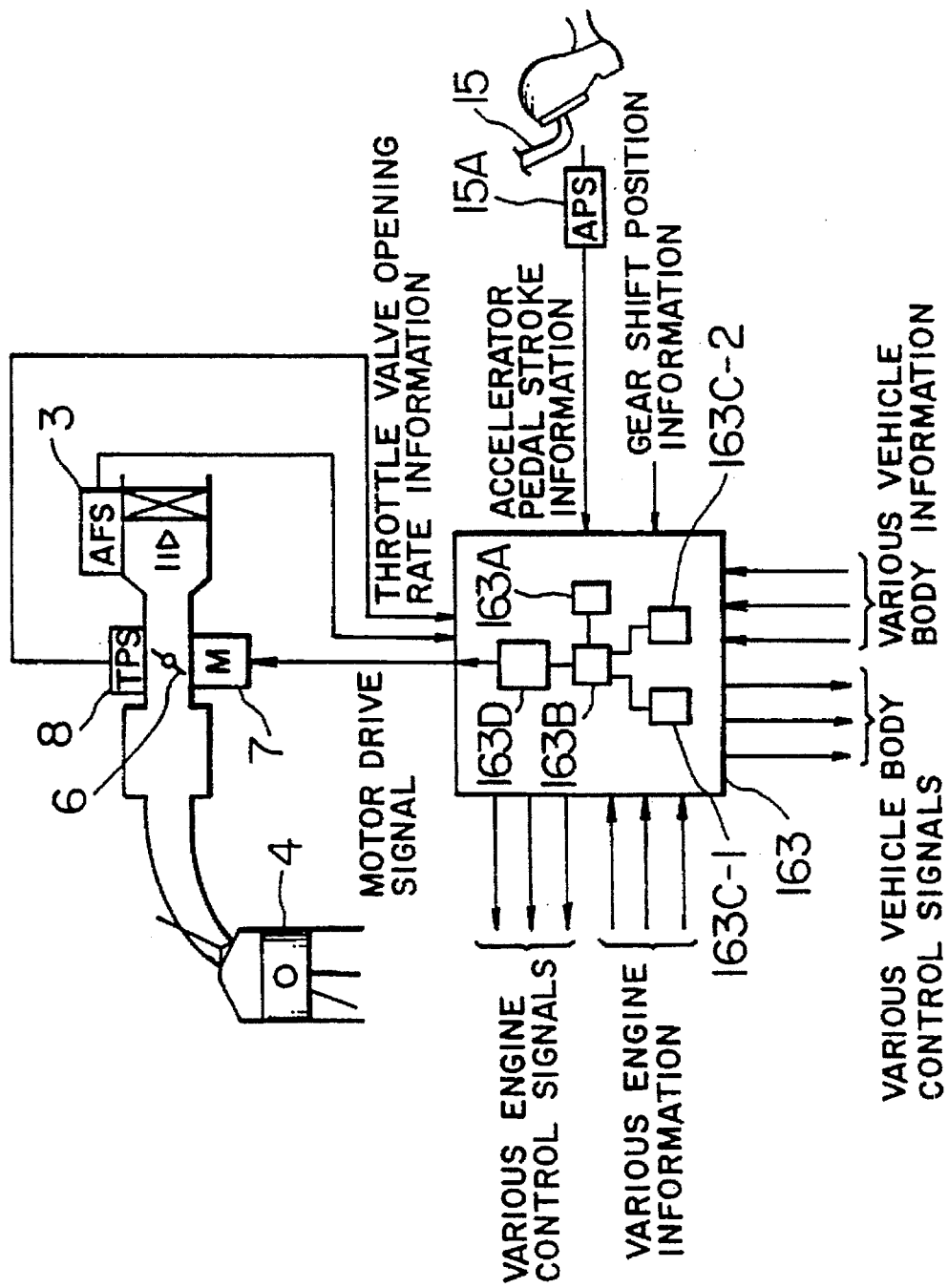
Figure 42:
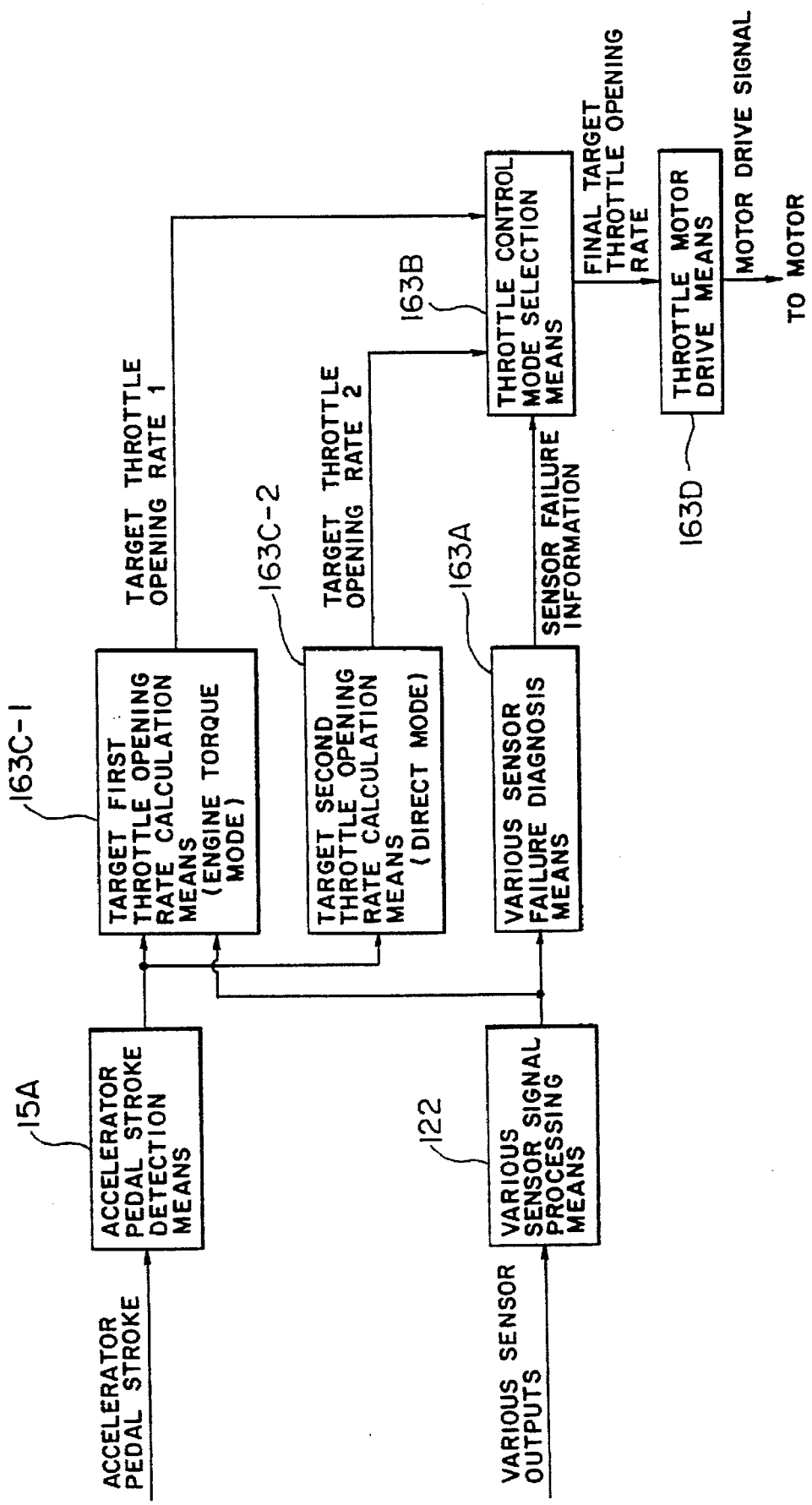

A description will next be made of a control mode change-over control unit 163. As is depicted in FIGS. 41 and 42, the control unit 163 is first provided with a target first throttle opening rate calculation means (target opening rate setting means for first throttle) 163C-1 and a second target throttle opening rate calculation means (target opening rate setting means for second throttle) 163C-1.

The target first throttle opening rate calculation means 163C-1 outputs a first target opening rate signal to a throttle valve control means (throttle motor drive means) 163D on the basis of an output signal from the accelerator pedal position sensor 15A and an output signal received (via a processor 122) from an operation state detection means which is composed of plural sensors (for example, the air flow sensor 3, the engine revolution number sensor 17a, the gear shift position detection sensor 20B, etc.) in order to detect the state of operation of the engine 4 or transmission 20 mounted on the vehicle. The target second throttle opening rate calculation means 163C-2 outputs, based on an output signal from the accelerator pedal position sensor 15A, a second target opening signal (a signal for the direct mode) to the throttle valve control means (throttle motor derive means) 163D. Namely, in the control according to the first target opening rate signal from the target first throttle opening rate calculation means 163C-1, the throttle valve 6 does not move as operated through the accelerator pedal 15 but moves corresponding to the engine torque. In the control performed under the second target opening rate signal from the target second throttle opening rate signal, the throttle valve 6 moves as operated by the accelerator pedal 15.

Accordingly, the first target opening rate signal is called an "engine torque mode target opening rate signal", and control pursuant to the engine torque mode target opening rate signal is called a "direct mode target opening rate signal".

Also provided is a failure detection means (various sensor failure diagnosis means) 163A for detecting failure of at least one of the various sensors in the operation state detection means, for example, by detecting the absence of any change for a predetermined time or longer or any abnormal value in sensor detection signals. Also provided is a change-over control means (throttle control mode selector means) 163B which, upon receipt of a failure signal from the failure detection means 163A, outputs a second target opening rate signal from the target second throttle opening rate setting means 163C-2, said second target opening rate signal having been obtained based solely on detection signals from the accelerator pedal position sensor 15A, to the throttle valve control means 163D.

Figure 43:
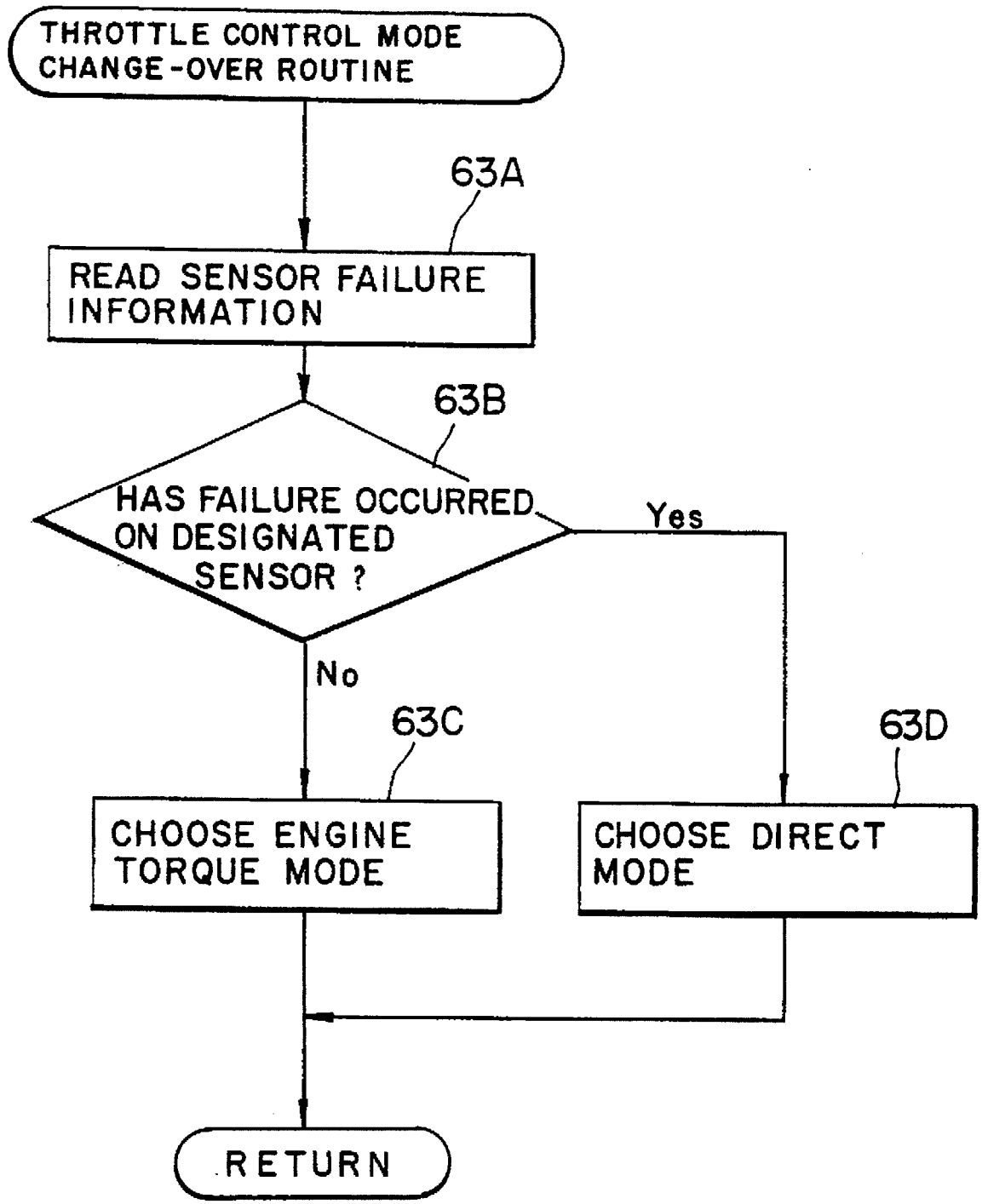

Owing to the construction described above, the control mode change-over control unit 163 operates following the flow chart shown in FIG. 43.

Based on outputs from the various sensors, the failure detection means 163A detects failure (step 63A). It is next judged if designated sensors (for example, the air flow sensor 3, engine revolution number sensor 17a and gear shift position detection sensor 20B, etc. described above) have failed (step 63B). It is then judged if the control of the engine torque mode should be suspended.

If the judgment is "No", a target opening rate for the engine torque mode is chosen is selected (step 63C) and the throttle valve is then performed by the engine torque control mode while using the target opening rate as a final target throttle opening rate.

If the judgment is "Yes" in step 63B, the control by the engine torque mode should not be continued. Thus, a target throttle opening rate for the direct mode is chosen by the change-over control means 163B (step 63D) to perform control toward this opening rate as a target. As a result, the throttle valve 6 is opened or closed responsive to a stroke of the accelerator pedal 5 under situations not affected by output signals from the other sensors, whereby control substantially similar to the throttle open/close operation of the wire link type is performed.

Incidentally, failures which require change-over by the above-mentioned change-over control means 163B may be limited to failures of any of the air flow sensor, engine revolution number detection sensor and A/T gear shift position detection sensor. As an alternative, they may include failures of all the sensors other than the accelerator pedal position sensor 15A.

Even if any one of various sensors employed in the engine torque mode control has failed, running by the operation of the accelerator pedal 15 can still be conducted surely so that the steerability of the vehicle is not deteriorated or sudden stop does not occur by suspension of control.

The above system can be installed by simply modifying the software alone as needed, so that the advantageous effects described above can be obtained without substantial cost increase.

Figure 44:
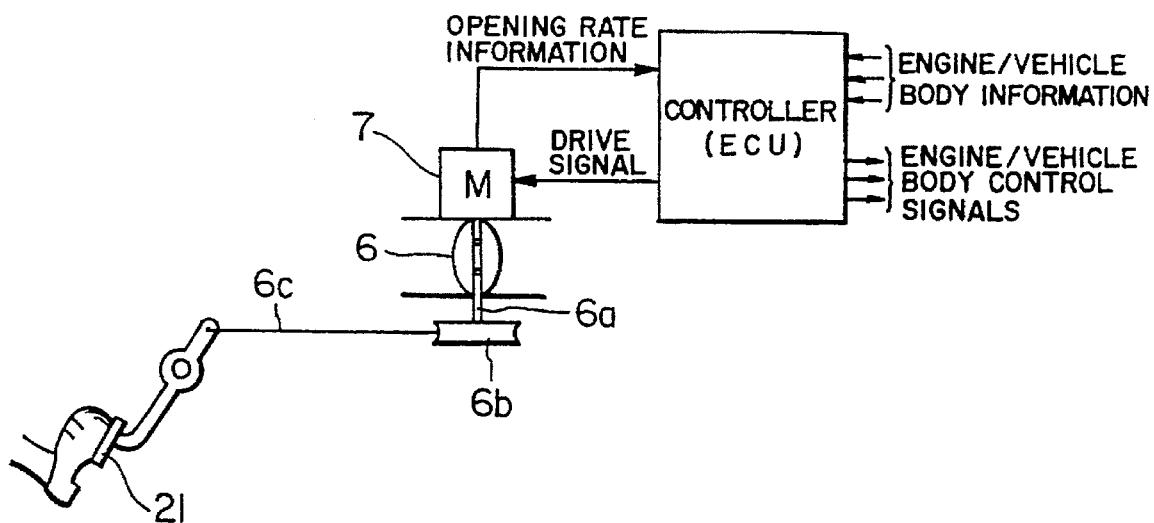
Figure 45:
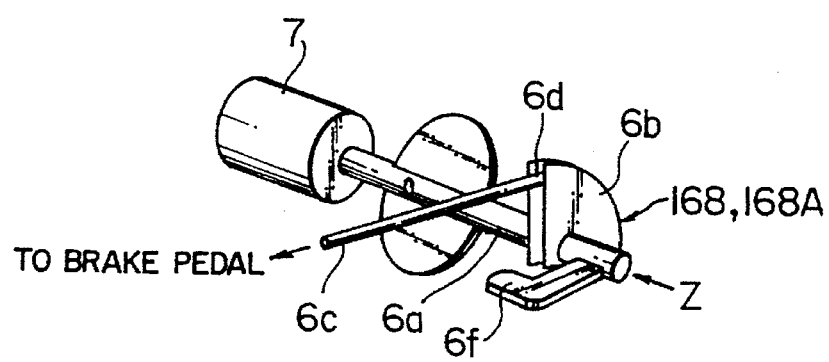

A description will next be made of a throttle valve closure forcing means 168A for a throttle closure forcing system 168. As is depicted in FIG. 44-46, a sectorial member (a loose-fitted lever member) 6b is pivotally loose fitted on a throttle shaft 6a of the throttle valve 6. This sectorial member 6b is linked to the brake pedal 21 via a cable 6c which forms a link mechanism.

The sectorial member 6b defines a slot 6b in an arcuate outer periphery thereof. The cable 6c extends along the slot 6d and is secured at a free end thereof in a hole 6e formed in an end portion of the sectorial member 6b.

Further, a stopper (fixing lever member) 6f is secured on the throttle shaft 6a so that the stopper 6f is turned together with the sectorial member 6b to a predetermined position (the full close position of the throttle valve) as the sectorial member 6b turns.

The throttle valve 6 is constructed such that it is driven responsive to desired control by the motor provided additionally.

Namely, the throttle valve closure forcing means 168A is constructed of the sectorial member 6b as a loose-fitted lever member—said sectorial member 6b being loose-fitted on the throttle shaft 6a of the throttle valve 6 and being turnable in association with a braking action o the brake pedal 21—and the stopper 6f secured as a fixed lever member on the throttle shaft 6a of the throttle valve 6. When the sectorial member 6b is turned, the stopper 6f engages the sectorial member 6b so that the throttle valve 6 is forced to close.

Owing to the above construction, the throttle valve 6 is generally closed or opened as desired by the motor 7. As a result, the stopper 6f is driven between the full close position shown in FIG. 46(a), which is a view taken in the direction indicated by arrow Z in FIG. 45, and the full open position shown in FIG. 46(b) as the throttle valve 6 is operated.

Figure 46A:
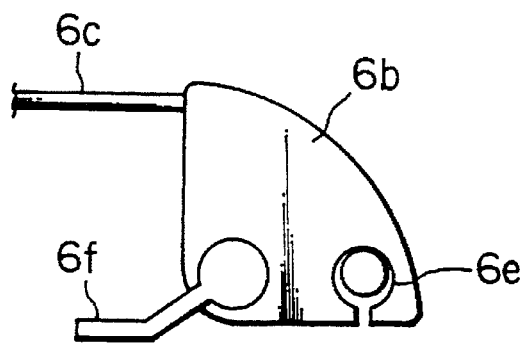
Figure 46B:
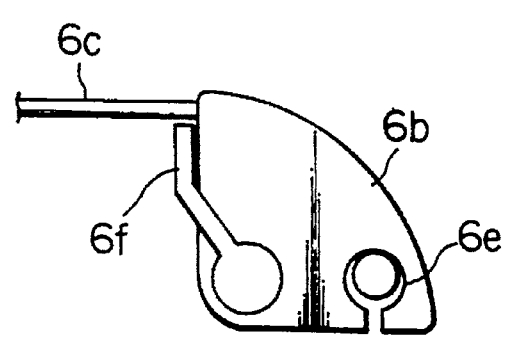
Figure 46C:
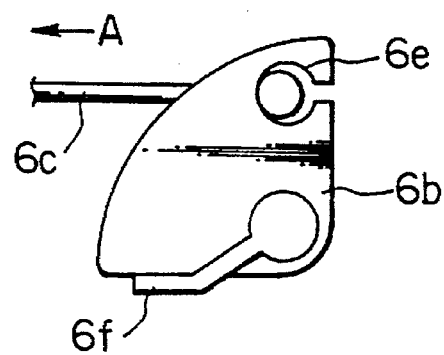

When the brake pedal 21 is treadled over or beyond a predetermined stroke, the cable 6c is pulled in the direction indicated by arrow A in FIG. 46(c) so that the sectorial member 6b is also driven by way of the cable 6c and reaches the position depicted in FIG. 46(c).

Since the stopper 6f is driven at the same time, the throttle valve 6 assumes the full close position.

As has been described above, when it is desired to close the throttle valve 6, for example, at the time of failure of at least one of the control means, the throttle valve 6 can be brought into the full close position by treadling the brake pedal 21 over a predetermined stroke.

The relationship between the sectorial member 6a and the stopper 6f should be set such that the throttle valve closure forcing means 168A is not actuated when the brake pedal is treadled lightly but is actuated for the first time to reduce the throttle opening rate to zero when the brake pedal is treadled strongly.

When the throttle valve 6 is controlled in a right way, the opening and closure of the throttle valve can be effected without any problem in a state as shown in FIGS. 46(a) and 46(b).

In the structure described above, the throttle valve 6 is forced to close or open by way of the cable 6c connected to the brake pedal 21. The throttle valve 6 can also be closed or opened by a drive means which, instead of the cable 6c, uses a change in the brake hydraulic pressure, said change taking place when the brake is applied, or a change in the intake negative pressure.

Closure of the throttle valve is carried out by such a means as described above. Whichever means is employed, the closure is not closure by way of an electrical control means but mechanical drive is forcedly effected. The electrical control system can be surely supplemented.

In this manner, the operation of the throttle valve 6 is not restrained usually so that the function of the DBW control is not limited. By treadling the brake pedal, the throttle valve is forcedly driven and closed whereby the automotive vehicle can be stopped safely. Further, the system is a simple mechanism not associated with electrical operation so that the reliability is improved and the system can be installed at a low cost.

In the present embodiment, each of the intake passages communicating to the two banks of the V6 engine is provided with the throttle valve open/close driven by the motor. Needless to say, the present invention can also be applied to a straight engine in which a single motor-driven throttle valve is provided in a single intake passage. To arrange a single throttle valve in a single intake passage, it is unnecessary to provide the TV failure time, air control unit 167. If an embodiment with a single intake passage and a single throttle valve disposed therein is described with reference to drawings, the description will be similar to the description of the foregoing embodiment. Its description is therefore omitted herein.

What is claimed is:

1. A drive-by-wire vehicle engine output control system for controlling an output of an engine in accordance with a degree of depression of an accelerator pedal by a driver and a mode of operation of a vehicle, comprising:

a vehicle speed detection means for detecting a running speed of the vehicle;

Engine output adjusting means for adjusting the output of the engine;

target engine output setting means for setting, based on the running speed detected by said vehicle speed detection means, a first target value of engine output torque as a target being required to maintain the running speed of the vehicle at a predetermined speed irrespective of depression of said accelerator pedal;

acceleration demand engine output setting means for setting a second target value of engine output torque as an acceleration demand engine output torque, said second target value being required to accelerate the vehicle in accordance with the degree of depression of the accelerator pedal when the accelerator pedal is depressed;

selector means for comparing the target engine output torque set by said target engine output setting means with the acceleration demand engine output torque set by said acceleration demand engine output setting means obtain a greater engine output torque therefrom, and selecting said greater engine output torque as a target engine output torque;

target control quantity setting means for setting a target control quantity for said engine output adjusting means, said target control quantity being required to bring the output torque of the engine close to the target engine output torque selected by said selector means; and control means for controlling said engine output adjusting means in accordance with the target control quantity set by said target quantity setting means.

2. The system of claim 1, wherein said selector means compares the target autocruise engine output set by said target engine output setting means with the acceleration demanding engine output set by said acceleration demand engine output setting means and, when one of the engine outputs is greater than the other by a deviation of at least a predetermined value, selecting said greater engine output as a target engine output.

3. The system of claim 1, further comprising:

output detection means for detecting an actual output of the engine in the course of the execution of the autocruising, wherein said selector means compares, instead of the target autocruise engine output, the actual engine output detected by said output detection means with the acceleration demanding engine output while the target autocruise engine output is selected as the target engine output.

4. The system of claim 1, wherein said acceleration demand engine output setting means sets the acceleration demanding engine output on the basis of the running speed of the vehicle detected by said vehicle speed detection means and the degree of depression of the accelerator pedal.

5. The system of claim 1, wherein said target engine output setting means comprises:

target vehicle speed setting means for setting a target vehicle speed upon the autocruising;

speed correction torque setting means for determining the deviation of the running speed of the vehicle detected by said vehicle speed detection means from the target vehicle speed set by the target vehicle speed setting means and, based on the deviation, setting a speed correction torque as a correction quantity for a torque to be transmitted via a drive axle of the vehicle, said correction quantity being required to eliminate the deviation;

drive axle torque detection means for detecting an actual drive torque transmitted via the drive axle;

running load torque detection means for detecting, based on the actual torque transmitted via the drive axle and detected by said drive axle torque detection means, a running load torque corresponding to a running load during running of the vehicle; and target autocruise output setting means for setting a target autocruise engine output on the basis of the speed correction torque set by said speed correction torque setting means and the running load torque detected by said running load torque detection means.

6. The system of claim 5, wherein said running load torque detection means further comprises an acceleration torque detection means for detecting acceleration torque applied upon actual acceleration of the vehicle, whereby the running load torque is detected based on the actual torque transmitted via the drive axle and detected by said drive axle torque detection means and the acceleration torque detected by said acceleration torque detection means.

7. The system of claim 6, wherein said running load torque detection means detects the running load torque by subtracting the acceleration torque detected by said acceleration torque detection means from the actual torque transmitted via the drive axle and detected by said drive axle torque detection means.

8. The system of claim 6, wherein said acceleration torque detection means comprises:

acceleration detection means for detecting a running acceleration of the vehicle; and an acceleration torque computing unit for computing the acceleration torque on the basis of the running acceleration detected by the acceleration detection means.

9. The system of claim 5, wherein said target autocruise output setting means sums the speed correction torque set by said speed correction torque setting means and the running load torque detected by said running load torque detection means, converts the resulting sum to the target autocruise engine output and then outputs the target autocruise engine output.

10. The system of claim 5, wherein said speed correction torque setting means comprises:

a PI control unit for determining the deviation of the running speed of the vehicle detected by said vehicle speed detection means from the target vehicle speed set by said vehicle speed setting means and setting a speed correction torque as a torque correction quantity for the drive axle of the vehicle, said torque correction quantity being required to eliminate the deviation; and a speed correction torque limiter for limiting, within a predetermined range, the speed correction torque set by said PI control unit.

11. The system of claim 1, further comprising:

permissible output change setting means for setting a permissible output change value for the engine; and control quantity limiting means for limiting; on the basis of the permissible output change value set by the permissible output change setting means, the target control quantity set by said target control quantity setting means.

12. The system of claim 11, wherein said permissible torque change setting means converts the preset permissible value of a torque change at the drive axle of the vehicle to the permissible output change value on the basis of a current gear shift position of a transmission.

13. The system of claim 11, wherein the target control quantity setting means converts the target engine output, which has been selected by said selector means, to a target air volume—which is the volume of intake air per revolution of the engine required to actually obtain an engine output equal to the target engine output selected by said selector means—and then outputs the target air volume as the engine control quantity.

14. The system of claim 13, further comprising:

converter means for converting the permissible output change value, which has been set by said permissible output change setting means, to a permissible air volume change per revolution of the engine, whereby said control quantity limiting means controls the target air volume, which has been set by the target control quantity setting means, on the basis of the permissible air volume change obtained as a result of conversion by said converter means.

15. The system of claim 14, wherein said control quantity limiting means comprises:

intake air volume detection means for detecting the volume of intake air actually taken in the engine per revolution of the engine, and an air volume change limiter for limiting the deviation of the actual intake air volume detected by said intake air volume detection means from the target air volume set by the target control quantity setting means to a level not greater than the permissible air volume change obtained as a result of conversion by said converter means and then outputting the thus-limited deviation as a target air change quantity, whereby the engine control quantity required to make a change of the actual intake air volume per revolution of the engine equal to the target air change value is set based on the target air change value outputted from said air volume change limiter.

16. The system of claim 15, wherein said control quantity limiting means outputs, as the engine control quantity, a final target air volume obtained by summing the target air change value outputted from said air volume change limiter and the actual intake air volume detected by said intake air volume detection means.

17. The system of claim 11, wherein said system controls the output of the engine via a throttle valve of the engine and said target control quantity setting means sets, as the engine control quantity, a target opening rate of the throttle valve required to actually obtain an engine output equal to the target engine output selected by said selector means.

18. The system of claim 17, further comprising:

converter means for converting the permissible output change value, which has been set by said permissible output change setting means, to a permissible air volume change per revolution of the engine, wherein said control quantity limiting means comprises:

a throttle opening rate-air volume conversion unit for converting the target opening rate, which has been set by said target control quantity setting means, to a target air volume which is an intake air volume per revolution of the engine;

an air volume change limiter for limiting the target air volume, which has been obtained as a result of conversion by said throttle opening rate-air volume conversion unit, on the basis of the permissible air volume change obtained as a result of conversion by said converter means; and an air volume-throttle opening rate conversion unit for setting, as a final target opening rate, an opening rate of the throttle valve required to make the actual intake air volume per revolution of engine equal to the target air volume limited by said air volume change limiter.

19. The system of claim 18, wherein said control quantity limiting means further comprises an intake air volume detection means for detecting the volume of intake air actually taken in the engine per revolution of the engine, the air volume change limiter limits the deviation of the actual intake air volume detected by said intake air volume detection means from the target air volume obtained as a result of conversion by said throttle opening rate-air volume conversion unit to a value not greater than the permissible air volume change obtained as a result of conversion by said converter means, and said air volume-throttle opening rate conversion unit determines a final target air volume by summing the target air change value outputted from said air volume change limiter and the actual intake air volume detected by said intake air volume detection means, thereby setting, based on the final target air volume, the final opening rate of the throttle valve required to make the volume of intake air taken in the engine per revolution of the engine equal to the final target air volume.

20. The system of claim 17, further comprising:

converter means for converting the permissible output change value, which has been set by said permissible output change setting means, to a permissible fuel volume change per revolution of the engine;

wherein said control quantity limiting means limits the target opening rate, which has been set by said target control quantity setting means, on the basis of the permissible fuel volume change obtained as a result of conversion by said converter means, whereby any change in the output of the engine is controlled equal to or smaller than the permissible output change value.

21. A drive-by-wire vehicle engine output control system for controlling an output of an engine in accordance with a degree of depression of an accelerator pedal by a driver and a mode of operation of a vehicle, comprising:

Engine output adjusting means for adjusting the output of the engine;

vehicle speed detection means for detecting a running speed of the vehicle;

target vehicle speed setting means for setting a target vehicle speed upon autocruising in which the running speed of the vehicle is maintained at a predetermined speed;

speed correction torque setting means for determining a deviation of the running speed of the vehicle detected by said vehicle speed detection means from the target vehicle speed set by the target vehicle speed setting means and, based on the deviation, setting a speed correction torque as a correction quantity for a torque to be transmitted via a drive axle of the vehicle, said correction quantity being required to eliminate the deviation;

drive axle torque detection means for detecting an actual torque transmitted via the drive axle;

running load torque detection means for detecting, based on the actual torque transmitted via the drive axle and detected by said drive axle torque detection means, a running load torque which acts as running resistance on the vehicle during running of the vehicle;

target autocruise output setting means for setting a target autocruise engine output as a target value of the engine output, said target value being required to bring the running speed of the vehicle close to the target vehicle speed set by said target vehicle speed setting means on the basis of the speed correction torque set by said speed correction torque setting means and the running load torque detected by said running load torque detection means;

target control quantity setting means for setting a target control quantity for said engine output adjusting means, said target control quantity being required to bring the output of the engine close to the target autocruise engine output set by said target autocruise output setting means; and control means for controlling said engine output adjusting means in accordance with the throttle control quantity set by said target control quantity setting means.

22. The system of claim 21, wherein said running load torque detection means further comprises acceleration torque detection means for detecting an acceleration torque applied upon actual acceleration of the vehicle, whereby the running load torque is detected based on the actual torque transmitted via the drive axle and detected by said drive axle torque detection means and the acceleration torque detected by said acceleration torque detection means.

23. The system of claim 22, wherein said running load torque detection means detects the running load torque by subtracting the acceleration torque detected by said acceleration torque detection means from the torque transmitted via the drive axle and detected by said drive axle torque detection means.

24. The system of claim 21, wherein the acceleration torque detection means comprises:

acceleration detection means for detecting a running acceleration of the vehicle; and acceleration torque computing unit for computing the acceleration torque on the basis of the running acceleration detected by the acceleration detection means.

25. The system of claim 21, wherein said target autocruise output setting means sums the speed correction torque set by said speed correction torque setting means and the running load torque detected by said running load torque detection means, converts the resulting sum to the target autocruise engine output and then outputs the target autocruise engine output.

26. The system of claim 21, wherein said speed correction torque setting means comprises:

a PI control unit for determining the deviation of the running speed of the vehicle detected by said vehicle speed detection means from the target vehicle speed set by said vehicle speed setting means and setting a speed correction torque as a torque correction quantity for the drive axle of the vehicle, said torque correction quantity being required to eliminate the deviation; and a speed correction torque limiter for limiting, within a predetermined range, the speed correction torque set by said PI control unit.

27. A drive-by-wire vehicle engine output control system for controlling an output of an engine in accordance with a degree of depression of an accelerator pedal by a driver and a mode of operation of a vehicle, comprising:

Engine output adjusting means for adjusting the output of the engine;

vehicle speed detection means for detecting a running speed of the vehicle;

target engine output setting means for setting, based on the running speed detected by said vehicle speed detection means, a first target value of engine output as a target autocruise engine output, said first target value being required to maintain the running speed of the vehicle at a predetermined speed;

permissible output change setting means for setting a permissible range of output changes for the engine; and control means for controlling said engine output adjusting means in accordance with the permissible range of output set by said permissible output change setting means and the target autocruise engine output set by said target engine output setting means, whereby an output of the engine is adjusted within the permissible range of output changes to bring the output of the engine close to the target autocruise engine output.

28. The system of claim 27, wherein said permissible output change setting means converts the preset permissible value of a torque change at the drive axle of the vehicle to the permissible output change value on the basis of a current gear shift position of a transmission.

29. The system of claim 27, wherein the target control quantity setting means converts the target autocruise engine output, which has been set by said target engine output setting means, to a target air volume—which is the volume of intake air per revolution of the engine required to actually obtain an engine output equal to the target autocruise engine output set by said target engine output setting means—and then outputs the target air volume as the engine control quantity.

30. The system of claim 29, further comprising:

converter means for converting the permissible output change value, which has been set by said permissible torque change setting means, to a permissible air volume change per revolution of the engine, whereby said control quantity limiting means controls the target air volume, which has been set by the target control quantity setting means, on the basis of the permissible air volume change obtained as a result of conversion by the converter means.

31. The system of claim 30, wherein said control quantity limiting means comprises:

intake air volume detection means for detecting the volume of intake air actually taken in the engine per revolution of the engine, and an air volume change limiter for limiting the deviation of the actual intake air volume detected by said intake air volume detection means from the target air volume set by the target control quantity setting means to a level not greater than the permissible air volume change obtained as a result of conversion by the converter means and then outputting the thus-limited deviation as a target air change quantity, whereby the engine control quantity required to make a change of the actual intake air volume per revolution of the engine equal to the target air change value is set based on the target air change value outputted from said air volume change limiter.

32. The system of claim 31, wherein said control quantity limiting means outputs, as the engine control quantity, a final target air volume obtained by summing the target air change value outputted from said air quantity change limiter and the actual intake air volume detected by said intake air volume detection means.

33. The system of claim 27, wherein said system controls the output of the engine via a throttle valve of the engine and said target control quantity setting means sets, as the engine control quantity, a target opening rate of the throttle valve required to actually obtain an engine output equal to the target autocruise engine output set by said engine output setting means.

34. The system of claim 33, further comprising:

converter means for converting the permissible output change value, which has been set by said permissible output change setting means, to a permissible air volume change per revolution of the engine, wherein said control quantity limiting means comprises:

a throttle opening rate-air volume conversion unit for converting the target opening rate, which has been set by said target control quantity setting means, to a target air volume which is an intake air volume per revolution of the engine;

an air volume change limiter for limiting the target air volume, which has been obtained as a result of conversion by said throttle opening rate-air volume conversion unit, on the basis of the permissible air volume change obtained as a result of conversion by said converter means; and an air volume-throttle opening rate conversion unit for setting, as a final target opening rate, an opening rate of the throttle valve required to make the actual intake air volume per revolution of engine equal to the target air volume limited by said air volume change limiter.

35. The system of claim 34, wherein said control quantity limiting means further comprises intake air volume detection means for detecting the volume of intake air actually taken in the engine per revolution of the engine, the air volume change limiter limits the deviation of the actual intake air volume detected by said intake air volume detection means from the target air volume obtained as a result of conversion by said throttle opening rate-air volume conversion unit to a value not greater than the permissible air volume change obtained as a result of conversion by said converter means, and said air volume-throttle opening rate conversion unit determines a final target air volume by summing the target air change value outputted from said air volume change limiter and the actual intake air volume detected by said intake air volume detection means, thereby setting, based on the final target air volume, the final opening rate of the throttle valve required to make the volume of intake air taken in the engine per revolution of the engine equal to the final target air volume.

* * * * *